US011961410B1

(12) United States Patent
Lin et al.

(10) Patent No.: US 11,961,410 B1
(45) Date of Patent: Apr. 16, 2024

(54) SYSTEMS AND METHODS TO MEASURE AND AFFECT FOCUS AND ENGAGEMENT

(71) Applicant: Amazon Technologies, Inc., Seattle, WA (US)

(72) Inventors: Kevin Shude Lin, Seattle, WA (US); Johan Christer Liedgren, Seattle, WA (US); Ana Sande do Vale Pinto da Silva, Seattle, WA (US); Wasiq Bokhari, Kingston, WA (US); Hilliard Bruce Siegel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 982 days.

(21) Appl. No.: 16/365,131

(22) Filed: Mar. 26, 2019

Related U.S. Application Data

(60) Provisional application No. 62/690,871, filed on Jun. 27, 2018, provisional application No. 62/690,526, (Continued)

(51) Int. Cl.
*G09B 19/00* (2006.01)
*G06N 20/00* (2019.01)
*G06V 40/20* (2022.01)
*H04N 5/262* (2006.01)
*G06F 3/01* (2006.01)

(52) U.S. Cl.
CPC ............. *G09B 19/00* (2013.01); *G06N 20/00* (2019.01); *G06V 40/20* (2022.01); *H04N 5/2621* (2013.01); *G06F 3/017* (2013.01)

(58) Field of Classification Search
None
See application file for complete search history.

(56) References Cited

U.S. PATENT DOCUMENTS

2009/0295738 A1* 12/2009 Chiang ............ H04M 1/72403
715/702
2012/0105324 A1* 5/2012 Lee ........................ G06F 3/005
345/157
(Continued)

OTHER PUBLICATIONS

Pavlus, John, "Errol Morris's Secret Weapon for Unsettling Interviews: The Interrotron," published Sep. 30, 2016, URL: https://www.fastcompany.com/1663105/errol-morriss-secret-weapon-for-unsettling-interviews-the-interrotron, downloaded on Jul. 11, 2018, 13 pages.

*Primary Examiner* — James B Hull
(74) *Attorney, Agent, or Firm* — Athorus, PLLC

(57) ABSTRACT

Systems and methods to measure and affect focus, engagement, and presence of users may include measuring a variety of aspects of users engaged in particular activities. Individual user characteristics or preferences and attributes of activities may be taken into account to determine levels of focus for particular users and activities. A variety of sensors may detect aspects of users engaged in activities to measure levels of focus. In addition, a variety of output devices may initiate actions to affect levels of focus of users engaged in activities. Further, a variety of processing algorithms, including machine learning models, may be trained to identify desired levels of focus, to calculate current levels of focus, and to select actions to change or boost levels of focus. In this manner, activities undertaken by users, as well as interactions between multiple users, may be made more engaging, efficient, and productive.

21 Claims, 15 Drawing Sheets

Related U.S. Application Data filed on Jun. 27, 2018, provisional application No. 62/690,531, filed on Jun. 27, 2018, provisional application No. 62/690,522, filed on Jun. 27, 2018.

(56) References Cited

U.S. PATENT DOCUMENTS

| | | | |
|---|---|---|---|
| 2017/0243509 A1* | 8/2017 | Gharibi Loron | G09B 19/00 |
| 2018/0326999 A1* | 11/2018 | Hershkovitz | G06V 40/20 |
| 2018/0364810 A1* | 12/2018 | Parshionikar | G06F 3/013 |
| 2019/0377755 A1* | 12/2019 | Chiang | G06V 40/171 |

* cited by examiner

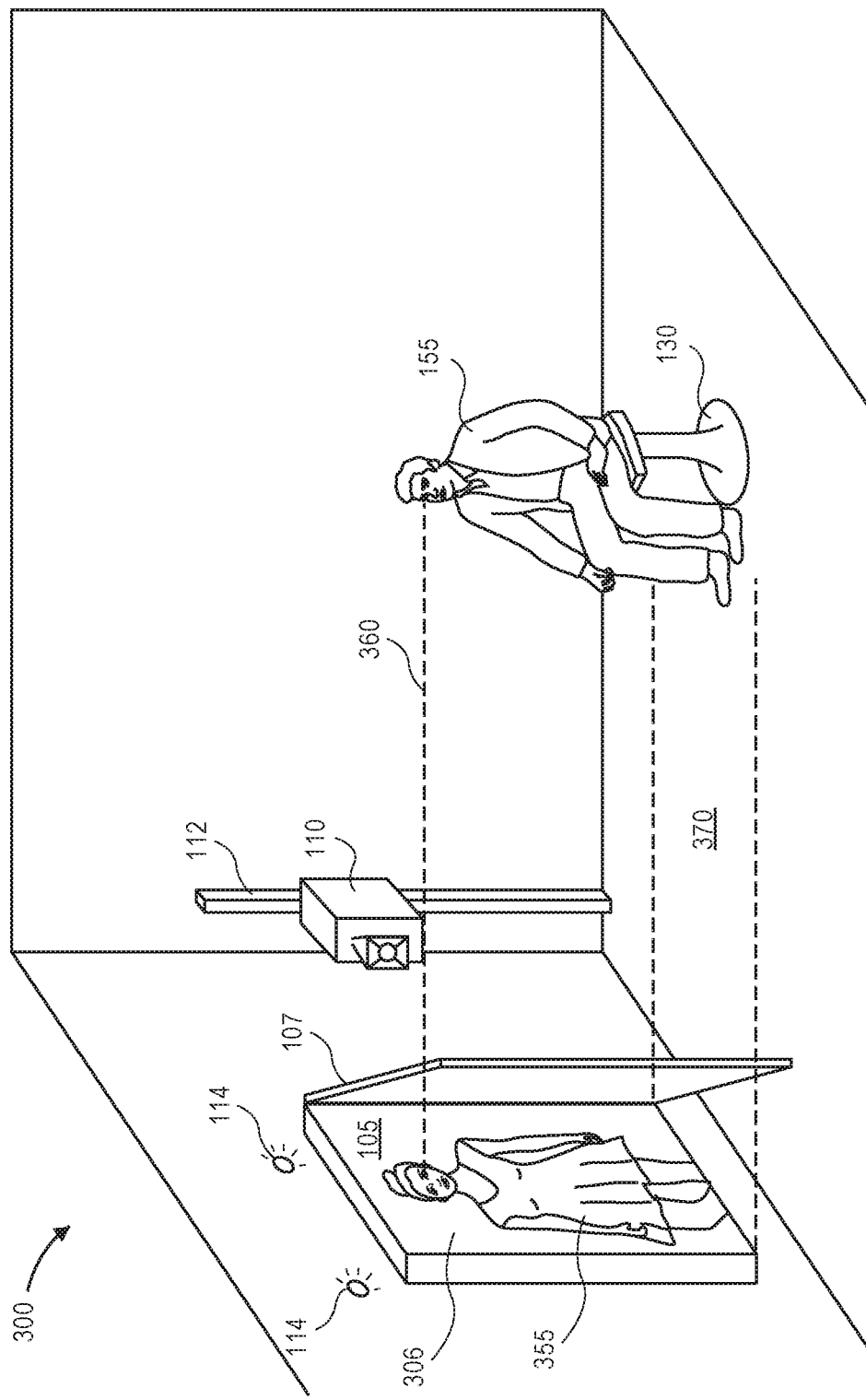

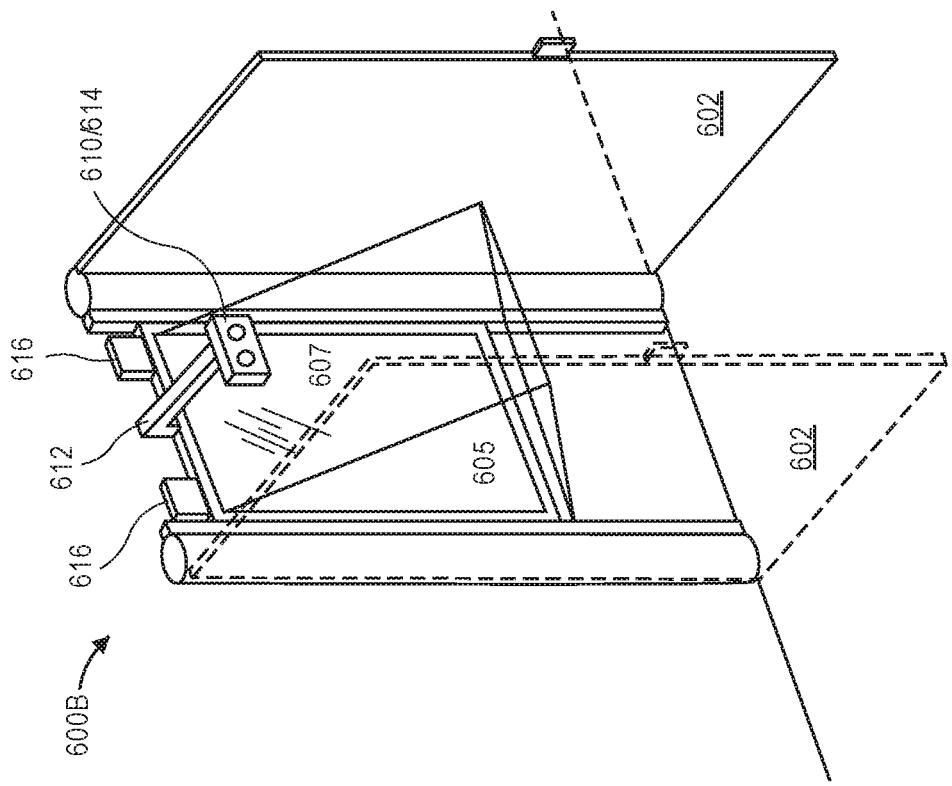
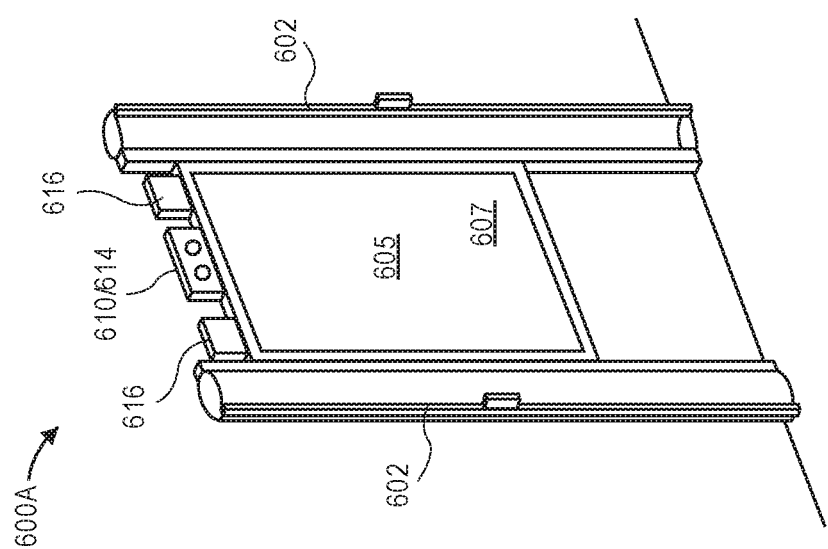
FIG. 6B
FIG. 6A

SYSTEMS AND METHODS TO MEASURE AND AFFECT FOCUS AND ENGAGEMENT

CROSS-REFERENCE TO RELATED APPLICATIONS

This application claims priority to U.S. Application No. 62/690,531, filed Jun. 27, 2018, claims priority to U.S. Application No. 62/690,526, filed Jun. 27, 2018, claims priority to U.S. Application No. 62/690,522, filed Jun. 27, 2018, and claims priority to U.S. Application No. 62/690,871, filed Jun. 27, 2018, each of which is incorporated herein by reference in its entirety.

BACKGROUND

Various activities or tasks may require different levels of focus or engagement for successful completion of such activities or tasks, such as individual study tasks or collaborative meetings. However, due to myriad factors related to users, environments, and activities, it may be difficult to ensure that such activities or tasks are undertaken with the appropriate levels of focus or engagement. Accordingly, there is a need for systems and methods to both measure levels of focus or engagement and also affect or change such levels of focus or engagement to ensure successful completion of such activities or tasks. In addition, there is a need for systems and methods that provide dedicated spaces for focus or engagement and also encourage mutual and effective interactions between multiple participants of such activities or tasks.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3A is a schematic diagram of example aspects of an example focus space, according to an implementation.

FIGS. 6A and 6B are schematic diagrams of another example focus space, according to an implementation.

Figure 1:
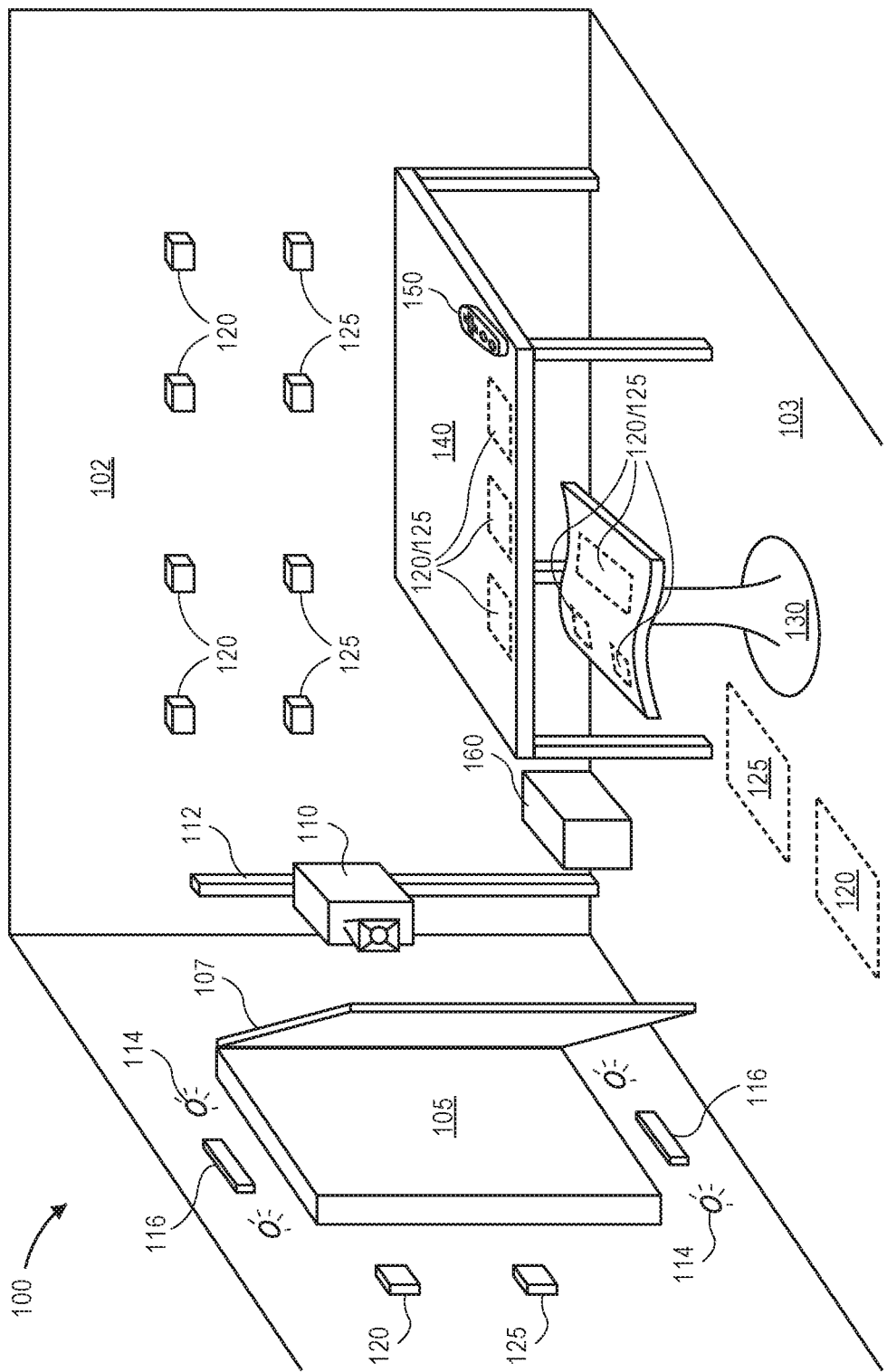
FIG. 1 is a schematic diagram of an example focus space, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods described herein may relate to environments, e.g., focus spaces, configured to promote focus, engagement, or presence (collectively referred to herein as "focus") of one or more users participating in an activity within such environments. For example, in collaborative settings, the focus spaces may be configured to promote mutual presence and/or mutual eye gaze between multiple users who may be physically remote from each other in different focus spaces but digitally connected to each other via a network. Systems and methods described herein may also relate to detecting aspects of users, activities, or environments within such focus spaces, and changing or adjusting aspects of users, activities, or environments. For example, various aspects related to the components, devices, or environments within focus spaces may be changed or adjusted based on user preferences, characteristics, or habits.

In example embodiments, an example focus space may include a plurality of walls, a floor, and a ceiling. The example focus space may be a substantially closed environment or space, and the plurality of walls, the floor, and the ceiling may be formed of light absorbing or dark materials and/or sound dampening materials. In this manner, the substantially closed, dark, and/or quiet focus space may promote focus of a user participating in an activity therein.

The example focus space may include a display device, a filter device, and an imaging device to facilitate visual communication via a network with users of other focus spaces. For example, the display device and the filter device may be configured to present a display of one or more users in other focus spaces that is visible to a user within the focus space. In addition, the imaging device and the filter device may be configured to capture imaging data of the user within the focus space that can be transmitted and displayed for one or more users in other focus spaces. Likewise, the example focus space may include audio input/output devices to facilitate audio communication via a network with users of other focus spaces such that audio data of the user within the focus space can be captured, transmitted and emitted for one or more users in other focus spaces, and audio data of one or more users in other focus spaces can be captured, transmitted and emitted for the user within the focus space.

The display of one or more users via the display device may be configured to create mutual presence between the user within the focus space and one or more users of other focus spaces. For example, mutual eye gaze between the user within the focus space and one or more users of other focus spaces may be created by adjustment of the display device, the filter device, and/or the imaging device. In addition, mutual presence between the user within the focus space and one or more users of other focus spaces may be created by displaying the one or more users via the display device with a size, lighting, background, or other characteristics that simulate or emulate aspects associated with the user within the focus space. Further, mutual presence between the user within the focus space and one or more users of other focus spaces may be created by persistently displaying the one or more users via the display device. Moreover, mutual presence between the user within the focus space and one or more users of other focus spaces may be created by maintaining a lane of presence free of obstructions between the user and the display of the one or more users via the display device.

The example focus space may also include illumination elements that may be configured to create portrait lighting of the user within the focus space. In addition, the focus space may include various components, devices, or elements such as a chair, a table, a controller, a collaboration device, or a user device. Further, the focus space may include various sensors and various output devices to detect and change or adjust aspects of the users, activities, or environments of the focus spaces. In example embodiments, one or more aspects of the focus space can be adjusted based on an identification of the user and/or activity within the focus space and associated preferences, characteristics, or habits of the identified user.

In other example embodiments, the example focus space may be a temporary or pop-up focus space. For example, one or more of the plurality of walls and/or the ceiling may be extendible or retractable to dynamically expand or stow the focus space as desired. In addition, one or more of the display device, the filter device, and/or the imaging device may also be extendible or retractable to dynamically expand or stow the focus space as desired. In this manner, a temporary, pop-up embodiment of the example focus space may be placed or installed within an environment, expanded when in use, and stowed when not in use, in which the example focus space may promote focus of the user, as well as create mutual presence and mutual eye gaze between connected users.

In further example embodiments, the example focus space may comprise a digital focus space associated with a computing device, such as a cellular telephone, a smartphone, a connected or smart home device, a tablet computing device, a laptop computing device, or other portable computing device. Various aspects of a display device associated with the digital focus space may be digitally adjusted to simulate or emulate aspects, such as a size, lighting, background, or other characteristics, associated with a user of the digital focus space. In this manner, a digital embodiment of the example focus space may be used within any environment, in which the example focus space may promote focus of the user, as well as create mutual presence and mutual eye gaze between connected users.

In still further example embodiments, the various example focus spaces may be placed, installed, or used within various environments, such as buildings, homes, businesses, retail establishments, offices, conference rooms, phone booths, vehicles, trailers, dedicated pods comprising one or more focus spaces, or other environments. Further, the various example focus spaces may be utilized to promote focus for individual activities by providing substantially closed, dark, and/or quiet spaces that may further simulate other environments, such as libraries or cafés, and/or the various example focus spaces may be utilized to promote focus for collaborative activities by providing substantially closed, dark, and/or quiet spaces that may further create mutual presence and/or mutual eye gaze for more effective interactions between multiple users connected via a network.

Systems and methods described herein may also relate to measuring levels of focus, engagement, or presence (collectively referred to herein as "focus") of one or more users participating in an activity within an environment. Systems and methods described herein may also relate to affecting or changing levels of focus, engagement, or presence of one or more users participating in an activity within an environment.

In example embodiments, one or more users may participate in an activity within a particular environment, e.g., a focus space. For example, the focus space may include a plurality of sensors to detect aspects of the users, activity, or environment in order to measure levels of focus. In addition, the focus space may include a plurality of output devices to affect aspects of the users, activity, or environment in order to change levels of focus. Further, a plurality of users may participate in a collaborative activity from disparate environments, e.g., a first user in a first focus space, and a second user in a second, different focus space, in which the first and second focus spaces may be in communication with each other via a network or other communication connection.

In further example embodiments, the plurality of sensors may include imaging or optical sensors, audio sensors, pressure or contact sensors, temperature sensors, pulse detection sensors, breath analysis sensors, environment sensors, radiofrequency identification (RFID) or near-field communication (NFC) sensors, or other types of sensors. For example, the plurality of sensors, individually or in combination, may detect aspects of the users such as body positions, hand movements, facial expressions, eye movements, breathing patterns, heartrates or pulses, body temperatures, or breath compositions. In addition, the plurality of sensors, individually or in combination, may detect aspects of speech of the users such as speed, cadence, tone, tenor, timbre, pitch, volume, inflection, choice of language or words, or content. Further, the plurality of sensors, individually or in combination, may detect aspects of the users such as identities, schedules, user characteristics, user preferences, or user habits. Moreover, the plurality of sensors, individually or in combination, may detect aspects of the environment such as temperature, humidity, pressure, air quality, air composition, ambient light, ambient noise, weather, season, time of day, or geographic location.

In further example embodiments, the plurality of output devices may include visual output devices, audio output devices, actuators or devices associated with the focus space, temperature or environment control devices, olfactory output devices, or user devices. For example, the plurality of output devices, individually or in combination, may affect aspects of the users such as body positions, hand movements, gaze location, facial expressions, eye movements, breathing patterns, heartrates or pulses, body temperatures, or breath compositions. In addition, the plurality of output devices, individually or in combination, may affect aspects of speech of the users such as speed, cadence, tone, tenor, timbre, pitch, volume, inflection, choice of language or words, or content. Further, the plurality of output devices, individually or in combination, may affect aspects of the environment such as temperature, humidity, pressure, air quality, air composition, ambient light, or ambient noise.

In example embodiments, information associated with users, information associated with activities, aspects detected by the plurality of sensors, actions initiated via the plurality of output devices, and/or feedback from users may be used to train one or more machine learning models to determine focus scores and/or focus targets or thresholds (or target focus scores), or difference targets or thresholds, associated with users, activities, detected aspects, initiated actions, or combinations thereof, and/or to train one or more machine learning models to identify or select one or more actions or outputs to be initiated via the plurality of output devices to affect focus scores. For example, the information associated with users may include identities, schedules, user characteristics, user preferences, or user habits. In addition, the information associated with activities may include types, purposes, goals, times, durations, or numbers of participants. Further, feedback from users may include ratings, rankings, comments, or other types of feedback related to users, activities, detected aspects, initiated actions, or combinations thereof.

In example embodiments, focus may be described as engagement by one or more users in a task or activity, attentiveness to an object, person, task, and/or activity, or other intentional center of interest of one or more users. Further, during various activities or during one or more portions of activities, focus may switch or change between multiple objects, people, and/or tasks. For example, for a first type of individual activity by a first user, the one or more machine learning models may determine a first focus score for the first user and a first focus target associated with the first type of individual activity. In contrast, for a second type of individual activity by the first user, the one or more machine learning models may determine a second focus score for the first user and a second focus target associated with the second type of individual activity. Various other combinations of focus scores and focus targets may also be determined based least in part on the users, activities, environments, or combinations thereof.

In addition, for a first type of group activity by a third user and a fourth user, the one or more machine learning models may determine a third focus score for the third user, a fourth focus score for the fourth user, a third focus target for the third user, a fourth focus target for the fourth user, and a first difference target or threshold between the third and fourth users. In contrast, for a second type of group activity by the third user and a fifth user, the one or more machine learning models may determine a sixth focus score for the third user, a fifth focus score for the fifth user, a sixth focus target for the third user, a fifth focus target for the fifth user, and a second difference target or threshold between the third and fifth users. Various other combinations of focus scores and focus targets or thresholds may also be determined based least in part on the users, activities, environments, or combinations thereof.

By the systems and methods described herein, activities undertaken by one or more users, individual or collaboratively, may be measured to determine levels of focus by the users, and actions may be initiated to affect the levels of focus by the users. Further, actions may also be initiated to affect levels of focus by the users prior to participating in the activities, and/or subsequent to participating in the activities.

In this manner, activities undertaken by users, including collaborative activities between multiple users, may be made more engaging, efficient, effective, and/or productive.

Systems and methods described herein may further relate to environments, e.g., focus spaces, configured to promote focus, engagement, or presence (collectively referred to herein as "focus") of one or more users participating in an activity within such environments. For example, in collaborative settings, the focus spaces may be configured to promote mutual presence and/or mutual eye gaze between multiple users who may be physically remote from each other in different focus spaces but digitally connected to each other via a network. In addition, the imaging data that is exchanged between different focuses spaces to produce the mutual presence, which may be high-resolution data (e.g., 4 k or 8 k data), may be augmented to enhance certain aspects, such as the user's face, and deemphasize other aspects, thereby reducing potential distractions. For example, one or more light blurring filters or pixelation techniques may be applied to portions of the imaging data to soften or slightly blur portions of the imaging data to remove or deemphasize potentially distracting information (e.g., wrinkles on a person's shirt, objects in the background, papers on a desk).

Systems and methods described herein may also relate to detecting aspects of users, activities, or environments within such focus spaces, and changing or adjusting aspects of users, activities, or environments. For example, various aspects related to the components, devices, or environments within focus spaces may be changed or adjusted based on user preferences, characteristics, gestures, or habits. For example, primary features, secondary features, and/or background may be determined based on the identity of one or more of the users, the activity to be performed in the focus space, etc. For example, if the activity is a business meeting, the primary features may be determined to be the face of each user and secondary features may be determined to be any detectable papers or other objects on a desk that is represented in the imaging data. In such an example, for imaging data that is transmitted between the focus spaces to produce the mutual presence, the respective positions of the primary feature and any secondary features may be determined, and the imaging data may be augmented by deemphasizing the secondary features such that information contained on the papers or other objects cannot be discerned from the augmented imaging data. Likewise, the background may also be deemphasized such that only the portion of the augmented imaging data corresponding to the primary feature remains unchanged, thereby emphasizing the user's face and deemphasizing or reducing other potentially distracting information.

In still other implementations, user gestures may be detected to alter the augmentation of portions of the imaging data. For example, a user may gesture to remove the deemphasis of the portion of imaging data representing a marker board so that two users participating in a mutual presence can both view information included on the marker board. In such an example, the gesture is detected, and the blurring filter or pixelation technique is removed from that portion of the imaging data so that the imaging data representative of the marker board, for example, is transmitted unchanged.

In addition, because the imaging data and the resulting display of the users may be very high resolution, portions of the imaging data and thus, the resulting display of the user, may be deemphasized to remove or reduce potential distractions to encourage focus or direct eye gaze between users. For example, with current high-resolution imaging, every wrinkle in a shirt, loose thread, or object in a background is visible. This information may be distracting from the mutual presence. Likewise, some information captured in the imaging data, such as papers that contain confidential information, may not be intended for sharing via the mutual presence with the other user. To reduce these potential distractions and potential for the unintended exchange of some information, the high-resolution imaging data may be augmented to deemphasize certain portions of the imaging data while other portions, such as the user's face, remains unchanged.

FIG. 1 is a schematic diagram of an example focus space 100, according to an implementation.

The example focus space 100 may include a plurality of walls 102, a floor 103, and a ceiling or roof (not shown). The example focus space 100 may include a substantially closed, controlled environment within the walls 102, floor 103, and ceiling in order to promote levels of focus by users of the focus space 100. For example, the walls 102, floor 103, and ceiling may include a neutral color, or a dark or black color. In addition, the walls 102, floor 103, and ceiling may be formed of materials to reduce light reflections and/or to reduce sound reflections or reverberations. In example embodiments, the walls 102, floor 103, and ceiling may be formed at least partially of heavy fabrics or other sound dampening materials of a dark or black color to reduce light and sound reflections.

In further example embodiments, the example focus space 100 may comprise a substantially closed, dark, and/or quiet space within which one or more users may participate in various types of activities. In addition to being relatively closed, isolated, and/or soundproof, the technical or technological aspects of the example focus space 100 may be relatively invisible so as to not be noticeable to users of the space. In this manner, for collaborative activities, a user of the example focus space 100 may perceive that s/he is physically present with one or more other users within the space, even if such other users are actually physically remote in different focus spaces and digitally connected to the user in the focus space via a network.

In addition, the example focus space 100 may include a display device 105, a filter device 107, an imaging device 110, an imaging device adjustment system 112, one or more illumination elements 114, and/or one or more audio input/output devices 116. The display device 105 may comprise a high definition display screen or monitor, e.g., a 720p, 1080p, 4 k, 8 k, high definition organic light emitting diode (OLED), light emitting diode (LED), or liquid crystal display (LCD) monitor with a size of approximately 45 inches, approximately 55 inches, or greater. In addition, the display device 105 may be sized such that a user displayed thereon may be shown substantially in actual or life size. For example, a user displayed on the display device 105 may be sized so as to appear to be physically present within the focus space 100.

In example embodiments, the filter device 107 may comprise a partially reflective, partially transmissive surface, such as a half-silvered mirror, that may be placed at an angle with respect to the display device 105. From the perspective of a user within the focus space 100, e.g., a user seated on chair 130 and facing the display device 105, the half-silvered mirror may appear to be substantially transparent, e.g., act as a window or glass, because the illumination level of the display device 105 on a first side of the half-silvered mirror may be relatively greater than the illumination level of the focus space 100 around the user seated on chair 130 on a second side of the half-silvered mirror, e.g., on a side of the half-silvered mirror opposite the display device 105.

The imaging device 110 may comprise a high power, high resolution, large sensor camera or imaging device that may be able to capture high quality images in settings or environments with low illumination. In addition, the imaging device 110 may comprise one or more types of optical or imaging sensors or devices, such as infrared sensors, depth sensors, or other types of sensors or imaging devices. For example, the imaging device 110 may be placed on one side of the display device 105 and oriented to point towards the filter device 107 that may be placed at an angle in front of the display device 105. In the example embodiment shown in FIG. 1, the imaging device 110 may be placed on the right side of the display device 105 with a direction of a field of view oriented at approximately 90 degrees to a viewing direction of the display device 105. In addition, the half-silvered mirror may be placed at an angle of approximately 45 degrees relative to each of the display device 105 and the imaging device 110. Although FIG. 1 shows a particular directional arrangement of the imaging device 110 and the filter device 107 relative to the display device 105, other arrangements of the imaging device 110 and the filter device 107 may also be used, such as an overhead imaging device and filter device arrangement, or an underside imaging device and filter device arrangement.

In example embodiments, the imaging device 110 and half-silvered mirror may be configured and oriented to capture images of a user within the focus space, e.g., a user seated in chair 130. For example, from the perspective of the imaging device 110, the half-silvered mirror may appear to be substantially reflective, e.g., act as a mirror, because the illumination level of the focus space 100 around the user seated on chair 130 on a first side of the half-silvered mirror may be relatively greater than the illumination level of the focus space 100 in a direction of a field of view of the imaging device 110 on a second side of the half-silvered mirror, e.g., on a side of the half-silvered mirror opposite the imaging device 110.

By the combination and arrangement of the display device 105, the filter device 107, and the imaging device 110, one or more images of a user in a different physical location, e.g., in a different focus space in communication with the focus space 100, may be displayed via the display device 105 so as to appear to be physically present in the focus space 100. In addition, one or more images of the user within the focus space 100, e.g., a user seated on chair 130, may be captured via the imaging device 110 and the filter device 107 and recorded, processed, augmented, and/or transmitted for display or presentation to the user in the different physical location, e.g., so as to appear to be physically present in the different focus space in communication with the focus space 100. Further, in order to receive and transmit images or video of users between connected focus spaces, the network bandwidth may be approximately 1.5 MB/second for one-way video transmission or streaming, or approximately 3.0 MB/second for two-way video transmission or streaming. Other network bandwidth values or ranges may also be used to support communication between focus spaces connected via a network.

In further example embodiments, the imaging device 110 may be mounted or connected to an imaging device adjustment system 112. The imaging device adjustment system 112 may allow vertical, horizontal, and/or angular movement or adjustment of the imaging device 110 in order to capture one or more images of the user within the focus space 100 in which the user is substantially centered and/or prominent within the captured one or more images. For example, the imaging device adjustment system 112 may alter a vertical, horizontal, and/or angular orientation of the imaging device 110 based on a height, a seated height, a standing position, or a seated position of the user within the focus space 100. Moreover, in further example embodiments, the filter device 107 may also be adjustable, e.g., via a filter device adjustment system (not shown), in order to facilitate capture of one or more images of the user within the focus space 100 by the imaging device 110.

In other example embodiments, the filter device 107 may comprise other types of filter or pass-through devices that can facilitate capture of images of users within focus spaces via an imaging device, and also facilitate presentation or display of images of other users via a display device to users within focus spaces. For example, the filter device 107 may comprise one or more polarized screens or filters that may facilitate capture of images via an imaging device, and/or may facilitate display of images via a display device. In some examples, a first polarized screen may be associated with an imaging device such that only light associated with a user within the focus space may pass through the first polarized screen and be captured via the imaging device, and/or a second polarized screen may be associated with a display device such that only light emitted from the display device may pass through the second polarized screen and thus be visible to a user viewing the display device. In addition, the filter device 107 may comprise one or more active screen or filter devices that may be selectively actuated or controlled, e.g., by a processor or controller, to facilitate capture of images via an imaging device, and/or to facilitate display of images via a display device. In some examples, a first active filter device may be associated with an imaging device such that only light associated with a user within the focus space may pass through the first active filter device and be captured via the imaging device, and/or a second active filter device may be associated with a display device such that only light emitted from the display device may pass through the second active filter device and thus be visible to a user viewing the display device. In other examples, one or more of the various types of filter devices may be arranged together with imaging devices and/or display devices in various configurations to facilitate capture and/or display of images as described herein.

The one or more illumination elements 114 may comprise light bulbs, light emitting diodes (LEDs), visible light emitting elements, infrared light emitting elements, or other types of illumination elements. For example, the illumination elements 114 may be configured to provide portrait or studio lighting of the user within the focus space 100. Portrait lighting may generally emphasize a user, in particular a face or head area of a user, while deemphasizing other parts or portions of the user, the environment, and/or the background. In example embodiments, the use of portrait lighting may increase focus and engagement between users in different, connected focus spaces by emphasizing the face or head area of the user, in particular the eyes of the user, and not drawing attention to other parts or portions of the user, the environment, and/or the background. Examples of portrait lighting techniques may include split lighting, loop lighting, Rembrandt lighting, paramount or butterfly lighting, profile or rim lighting, broad lighting, short lighting, other types of portrait lighting, or combinations thereof.

In addition, the illumination elements 114 may also be adjustable, e.g., via illumination element adjustment systems (not shown), in order to maintain portrait or studio lighting of the user within the focus space 100 as the user moves within the focus space 100. Further, although the illumination elements 114 are shown in FIG. 1 at particular locations in the focus space 100, any other number or arrangement of illumination elements may be used within the focus space 100 to illuminate the user and facilitate capture of one or more images of the user, as well as to provide a desired ambient lighting of other portions or devices within the focus space 100.

In addition, as discussed further below, the imaging data may be augmented at the focus space to further deemphasize certain aspects represented in the imaging data without altering other aspects. Like the portrait lighting, the augmented imaging data may deemphasize, through use of a blurring filter or pixelation technique, background information, leaving the face and/or head region of the user represented in the imaging data unchanged.

The one or more audio input/output devices 116 may comprise microphones, speakers, audio sensors, audio emitters, or other types of audio input/output devices. For example, the audio input/output devices 116 may be configured to capture audio, e.g., speech of the user or other sounds, within the focus space 100 for recording, processing, and/or transmission to other users in different focus spaces in communication with the focus space 100. In addition, the audio input/output devices 116 may also be configured to emit audio, e.g., speech of other users or other sounds from different focus spaces, for the user within the focus space 100. Further, the audio input/output devices 116 may also be adjustable, e.g., via audio input/output device adjustment systems (not shown), in order to capture desired audio of and/or emit desired audio for the user within the focus space 100. Moreover, although the audio input/output devices 116 are shown in FIG. 1 at particular locations in the focus space 100, any other number or arrangement of audio input/output devices may be used within the focus space 100 to capture and/or emit audio within the focus space 100.

The focus space 100 may also include one or more sensors 120, one or more output devices 125, a chair 130, a table 140, a controller 150, one or more collaboration devices (not shown), and/or one or more user devices (not shown). In some example embodiments, the sensors 120 and/or output devices 125 may be incorporated into, attached to, or comprised in one or more portions of the focus space or one or more devices within the focus space. For example, the sensors 120 and/or output devices 125 may be attached to or comprised in the walls 102, the floor 103, the chair 130, the table 140, the controller 150, the collaboration devices, and/or the user devices. In further example embodiments, the sensors 120 and output devices 125 may be combined into integral units that may both detect aspects of the focus space and also change or adjust aspects of and/or initiate actions or outputs within the focus space.

The sensors 120 may include a variety of types of sensors to detect aspects of the user, the activity, and/or the environment that may relate to levels of focus and/or may relate to mutual presence, mutual eye gaze, and/or user customization. For example, the sensors 120 may include imaging or optical sensors, audio sensors, pressure or contact sensors, temperature sensors, pulse detection sensors, breath analysis sensors, environment sensors, radiofrequency identification (RFID) or near field communication (NFC) sensors, or other types of sensors. Although the sensors 120 are shown in FIG. 1 at particular locations in the focus space 100, any other number or arrangement of sensors may be used within the focus space 100 to detect aspects of the user, the activity, and/or the environment within the focus space 100.

In example embodiments, the sensors 120 may detect body positions, hand movements, and/or facial expressions of the user within the focus space 100. For example, the sensors 120 may include imaging or optical sensors, pressure or contact sensors, or other types of sensors to detect body positions, hand movements, and/or facial expressions.

Body positions may comprise sitting upright, sitting on an edge of the chair, slouching, leaning forward, leaning back, a closed body position, arms crossed, an open body position, arms relaxed, standing, pacing, bouncing, sitting on an edge of the table, syncing or mimicking body positions, or other body positions. The various body positions may be detected using imaging or optical sensors, pressure or contact sensors in the walls, floor, chair, or table, or other types of sensors.

Hand movements may comprise gestures, signs, fidgeting, playing with hair, pens, papers, or other objects, closed fists, tense fingers, relaxed fingers, syncing or mimicking hand movements, or other hand movements. The various hand movements may be detected using imaging or optical sensors, pressure or contact sensors in the chair, table, controller, collaboration devices, or user devices, or other types of sensors.

Facial expressions may comprise real smiles, fake or forced smiles, frowns, pursed lips, relaxed lips, furrowed brows, raised brows, relaxed brows, clenched jaws, relaxed jaws, closed eyes, open eyes, eye contact, eye movements, syncing or mimicking facial expressions, other expressions indicating various emotions, or other facial expressions. The various facial expressions may be detected using imaging or optical sensors. In addition, sentiment analysis may be performed on detected features or aspects of body positions, hand movements, and/or facial expressions in order to understand mood, emotions, or other sentiments derived from detected aspects of users.

In further example embodiments, the sensors 120 may detect heartrates or pulses, breathing patterns, and/or breath compositions of the user within the focus space 100. For example, the sensors 120 may include imaging or optical sensors, audio sensors, pressure or contact sensors, temperature sensors, pulse detection sensors, breath analysis sensors, or other types of sensors to detect heartrates or pulses, breathing patterns, and/or breath compositions.

Heartrates or pulses may comprise steady pulses, unsteady or erratic pulses, rising pulses, slowing pulses, syncing or mimicking heartrates or pulses, indicators of heartrates or pulses such as flushed skin, pale skin, skin color, skin temperature, perspiration, capillary motion within eyes, or other indicators of heartrates or pulses. The heartrates or pulses, or indicators of heartrates or pulses, may be detected using imaging or optical sensors, infrared sensors to detect temperatures, audio sensors tuned to detect heartrates or pulses, pressure or contact sensors in the chair, table, controller, collaboration devices, or user devices, temperature sensors in the chair, table, controller, collaboration devices, or user devices, pulse oximeter sensors in the chair, table, controller, collaboration devices, or user devices, or other types of sensors.

Breathing patterns may comprise steady breathing, unsteady or erratic breathing, accelerated breathing, slowing breathing, syncing or mimicking breathing patterns, indicators of breathing patterns such as flushed skin, pale skin, skin color, skin temperature, perspiration, capillary motion within eyes, or other indicators of breathing patterns. The breathing patterns, or indicators of breathing patterns, may be detected using imaging or optical sensors, infrared sensors to detect temperatures, audio sensors tuned to detect breathing patterns, pressure or contact sensors in the chair, table, controller, collaboration devices, or user devices, temperature sensors in the chair, table, controller, collaboration devices, or user devices, or other types of sensors.

Breath compositions may comprise indicators of hydration, dehydration, caffeine, sugars, other chemicals, body temperature, oxygen levels, carbon dioxide levels, indicators of fatigue or stress, or other indicators of breath compositions. The breath compositions, or indicators of breath compositions, may be detected using imaging or optical sensors, infrared sensors to detect temperatures, temperature sensors in the chair, table, controller, collaboration devices, or user devices, breath or chemical analysis sensors in the chair, table, controller, collaboration devices, or user devices, or other types of sensors.

In further example embodiments, the sensors 120 may detect aspects of speech of the user or other sounds within the focus space 100. For example, the sensors 120 may include audio sensors, or other types of sensors to detect aspects of speech or other sounds.

Aspects of speech or other sounds may comprise speed, cadence, tone, tenor, timbre, pitch, volume, inflection, content, choice of language or words, syncing or mimicking speech, or other aspects of speech or other sounds. The aspects of speech or other sounds may be detected using audio sensors within the focus space, audio sensors in the chair, table, controller, collaboration devices, or user devices, or other types of sensors.

In further example embodiments, the sensors 120 may detect aspects of the user, the environment, or the activity within the focus space 100. For example, the sensors 120 may include imaging or optical sensors, audio sensors, pressure or contact sensors, temperature sensors, environment sensors, RFID or NFC sensors, or other types of sensors to detect aspects of user, the environment, and/or the activity.

Aspects of the user may comprise an identity, a schedule, a user characteristic, a user preference, a user habit, or other aspects of the user. The aspects of the user may be detected using imaging or optical sensors for user and/or facial recognition, audio sensors for user and/or voice recognition, pressure or contact sensors such as fingerprint identification in the chair, table, controller, collaboration devices, or user devices for user identification, RFID or NFC sensors for user identification via RFID tags or NFC devices associated with the user, or other types of sensors. Further, the various user identification methods may be used with reference to stored user data to identify associated schedules, activities, emails, contacts, characteristics, preferences, habits, or other stored aspects of the user.

Aspects of the environment may comprise temperature, humidity, pressure, air quality, air composition, ambient light, ambient noise, weather, season, time of day, geographic location, or other aspects of the environment. The aspects of the environment may be detected using imaging or optical sensors to detect ambient light, weather, or other environmental aspects, audio sensors to detect ambient noise, weather, or other environmental aspects, temperature sensors, hygrometric sensors, barometric sensors, altimetric sensors, air quality sensors, other environment sensors, global positioning system (GPS) or other location sensors, or other types of sensors.

Aspects of the activity may comprise a type, a purpose, a goal, a time, a duration, a number of participants, or other aspects of the activity. For example, the activity may comprise an individual activity, such as a study activity, a reading activity, a writing activity, a research activity, or any other type of individual activity. In addition, the activity may comprise a group or collaborative activity, such as an interview, a meeting, a brainstorming session, a regularly occurring (e.g., daily or weekly) meeting, a special purpose meeting, a presentation, a speech, or any other type of group or collaborative activity. The aspects of the activity may be detected using imaging or optical sensors for user and/or facial recognition, audio sensors for user and/or voice recognition, pressure or contact sensors such as fingerprint identification in the chair, table, controller, collaboration devices, or user devices for user identification, RFID or NFC sensors for user identification via RFID tags or NFC devices associated with the user, or other types of sensors. Further, the various user identification methods may be used with reference to stored user data to identify associated schedules and activities, including various aspects of such activities.

Furthermore, the various body positions, hand movements, facial expressions, heartrates or pulses, breathing patterns, breath compositions, aspects of speech or other sounds, aspects of the user, aspects of the environments, and/or aspects of the activity, individually or in combination with other detected aspects, may be detected and/or adjusted as they relate to varying levels of focus and/or mutual presence, mutual eye gaze, and/or user customization. For example, sitting upright with relaxed arms, a slight smile, a steady heartrate and breathing pattern, and smooth speech at a medium to loud volume may indicate a high level of focus for a particular activity, and/or body positions, hand movements, facial expressions, aspects of speech, other detected aspects, changes thereto, and/or any combinations thereof may be detected and/or adjusted as they relate to mutual presence and/or mutual eye gaze for a particular activity. In contrast, leaning back with closed arms, closed eyes, a lowered heartrate and breathing pattern, and uneven speech at a low volume may indicate a low level of focus for a particular activity. In addition, body positions, hand movements, facial expressions, aspects of speech or other sounds, aspects of the environment, other detected aspects, changes thereto, and/or any combinations thereof may be detected and/or adjusted as they relate to user customization for a particular activity. Various other combinations of any of the detected aspects may relate to various other levels of focus and/or mutual presence, mutual eye gaze, and/or user customization based at least in part on aspects of the particular users and/or aspects of the particular activities and environments.

The output devices 125 may include a variety of types of output devices to initiate actions or outputs and affect, change, or adjust aspects of the user, the activity, and/or the environment that may relate to levels of focus and/or mutual presence, mutual eye gaze, and/or user customization. For example, the output devices 125 may include visual output devices, audio output devices, actuators or devices associated with the focus space, temperature or environment control devices, olfactory output devices, collaboration devices, user devices, or other types of output devices. Although the output devices 125 are shown in FIG. 1 at particular locations in the focus space 100, any other number or arrangement of output devices may be used within the focus space 100 to affect aspects of the user, the activity, and/or the environment within the focus space 100.

In example embodiments, the visual output devices may include the display device 105, the illumination elements 114, collaboration devices, user devices, or other types of output devices. For example, the visual output devices such as the display device 105 or other displays, screens, or monitors of collaboration devices or user devices may change brightness, contrast, focus, zoom, resolution, color, saturation, background, filter, content, or other aspects of the visual output devices. In addition, the visual output devices such as the illumination elements 114 may change brightness, intensity, focus, color, filter, illumination direction, illumination frequency or pulsing, or other aspects of the visual output devices.

In further example embodiments, the audio output devices may include audio input/output devices 116 such as microphones, speakers, collaboration devices, user devices, or other types of output devices. For example, the audio output devices such as the speakers or other speakers of collaboration devices or user devices may change speed, cadence, tone, tenor, timbre, pitch, volume, inflection, or other aspects of speech or other sounds, and/or may output music of various types or genres, major chords, minor chords, consonant sounds, dissonant sounds, white noise, nature sounds, notifications, warnings, alerts, or other changes to aspects of music or sounds.

In further example embodiments, the actuators or devices associated with the focus space may include actuators such as servos, solenoids, motors, or other actuators in the walls, floor, chair, table, or controller, collaboration devices, user devices, or other types of output devices. For example, the actuators associated with the focus space may emit vibrations, motions, or other haptic feedback at various frequencies, amplitudes, sequences, or other characteristics of haptic output devices.

In further example embodiments, the temperature or environment control devices may include output devices such as thermostats, fans, air conditioners, heaters, humidifiers, dehumidifiers, or other environment control devices in the walls, floor, chair, or table, or other types of output devices. For example, the temperature or environment control devices may affect the temperature, humidity, pressure, air quality, air composition, ambient light, ambient noise, or other aspects of the environment within the focus space.

In further example embodiments, the olfactory output devices may include output devices that are configured to emit particular scents or smells, natural or synthetic, or other types of output devices. For example, the olfactory output devices may emit scents or smells associated with nature, flowers, trees, coffees, teas, various drinks, various foods, incense, or various other types of scents or smells within the focus space.

In further example embodiments, the collaboration devices may comprise shared devices such as digital whiteboards, digital screens, or other types of collaboration devices, each of which may include various sensors and/or various input/output devices. In addition, the user devices may comprise cellular telephones, smartphones, personal digital assistants, tablet computing devices, laptop computing devices, wearable computing devices, or various other types of user computing devices, each of which may include various sensors and/or various input/output devices.

In further example embodiments, the collaboration devices and/or user devices may provide notifications, directions, information about users or activities, or other types of information or guidance to the user prior to entering the focus space, during an activity within the focus space, and/or after exiting the focus space. For example, notifications or suggestions prior to entering the focus space may include alerts related to an activity start time, directions to a refreshment area or restroom, directions to the focus space, suggested exercises to change focus level, information about the activity, information about other users, information or notices related to sensors, actuators, and/or processing performed within the focus space to promote greater focus, information relating to features that will be emphasized or deemphasized in the augmented imaging data that is generated and shared with another focus space, indication of gestures that may be used to alter or adjust the augmentation of portions of the imaging data, or other information to prepare the user for the activity. In addition, notifications or suggestions during the activity within the focus space may include alerts related to an agenda of the activity, alerts related to an activity end time, directions to a refreshment area or restroom, suggested exercises, breaks, or pauses to change or adjust mutual presence, mutual eye gaze, and/or levels of focus, information about the activity, information about other users, or other information to guide the user or users during the activity. Further, notifications or suggestions after exiting the focus space may include meeting notes, transcription, or summary, alerts related to follow-up items, alerts related to a next activity start time, directions to a refreshment area or restroom, directions to a next focus space, suggested exercises to change focus level, information about the next activity, information about other users, information or notices related to sensors, actuators, and/or processing performed within the next focus space to promote greater focus, or other information related to completion of the activity and/or related to preparation for a next activity.

Furthermore, the various actions or outputs initiated by the various output devices, individually or in combination with other actions or outputs, may change or adjust aspects that may relate to levels of focus and/or mutual presence, mutual eye gaze, and/or user customization. For example, changes to the visual output provided by the display device, other visual output devices, and/or the illumination elements, changes to the audio output provided by the speakers, and/or changes to the haptic output provided by the chair, table, controller, collaboration devices, and/or user devices may change or maintain aspects that may relate to levels of focus and/or mutual presence, mutual eye gaze, and/or user customization. In addition, changes to the environment provided by the environment control devices and/or changes to scents or smells within the focus space provided by the olfactory output devices may change or maintain aspects that may relate to levels of focus and/or mutual presence, mutual eye gaze, and/or user customization. Further, information or notifications provided by the collaboration devices and/or user devices may change or maintain aspects that may relate to levels of focus and/or mutual presence, mutual eye gaze, and/or user customization. Various other combinations of any of the actions or outputs may affect aspects that may relate to levels of focus and/or mutual presence, mutual eye gaze, and/or user customization based at least in part on aspects of the particular users and/or aspects of the particular activities.

In other example embodiments, instead of or in addition to changing or affecting aspects that may relate to mutual presence and/or mutual eye gaze of a user and/or activity within a focus space, the various sensors may detect aspects of users, activities, and/or environments, and the various output devices may change or adjust aspects of the users, activities, and/or environments based at least in part on user preferences, characteristics, habits, or other aspects of users. For example, a user of a focus space may be identified by various methods, such as facial recognition, voice recognition, RFID tag or NFC device identification, GPS or other location identification, or other identification methods. In addition, a user of a focus space may be identified based on stored schedules associated with a focus space. Then, with reference to stored information associated with an identified user, various aspects of the focus space may be changed or adjusted for the identified user. Further, the stored information associated with identified users may be recorded, processed, and/or learned over the course of one or more activities engaged in by the user within one or more focus spaces.

In example embodiments, the stored information associated with identified users that may be processed and learned by the systems and methods described herein may include aspects of visual output devices such as sizing, brightness, contrast, backgrounds, colors, lighting, or other visual characteristics, aspects of audio output devices such as pitch, timbre, volume, or other audio characteristics, aspects of actuators associated with portions or devices of the focus space such as seat position, seat height, seat angle, table position, table height, controller functions or configurations, collaboration or user device functions or configurations, haptic feedback, or other actuator characteristics, aspects of temperature or environment control devices such as temperature, humidity, air quality, ambient noise, or other environment characteristics, and/or aspects of olfactory output devices such as types, intensities, frequencies, or combinations of scents, or other olfactory characteristics.

The chair 130 may comprise a chair, stool, bench, or any other type of chair or seat for the user of the focus space 100. In addition, the chair 130 may comprise one or more sensors 120 and/or one or more output devices 125. As described herein, the sensors 120 may comprise pressure or contact sensors, temperature sensors, pulse detection sensors, RFID or NFC sensors, or other types of sensors. In addition, as described herein, the output devices 125 may comprise actuators such as servos, solenoids, motors, or other actuators to provide haptic feedback, temperature control devices such as fans, heaters, or coolers, or other types of output devices.

The table 140 may comprise a table, desk, workspace, stand, or any other type of table or workspace for the user of the focus space 100. In addition, the table 140 may comprise one or more collaboration devices such as shared digital whiteboards, shared digital screens, or other types of collaboration devices. Further, the table 140 may comprise one or more sensors 120 and/or one or more output devices 125. As described herein, the sensors 120 may comprise imaging or optical sensors, audio sensors, pressure or contact sensors, temperature sensors, pulse detection sensors, breath analysis sensors, environment sensors, RFID or NFC sensors, or other types of sensors. In addition, as described herein, the output devices 125 may comprise visual output devices, audio output devices, actuators such as servos, solenoids, motors, or other actuators to provide haptic feedback, temperature control devices such as fans, heaters, or coolers, olfactory output devices, or other types of output devices.

The controller 150 may comprise a remote controller, handheld device, pointer device, a portion or peripheral associated with a collaboration device, wearable device, user computing device, or any other type of controller, handheld device, or wearable device. In addition, the controller 150 may comprise one or more sensors 120 and/or one or more output devices 125. As described herein, the sensors 120 may comprise imaging or optical sensors, audio sensors, pressure or contact sensors, temperature sensors, pulse detection sensors, breath analysis sensors, environment sensors, RFID or NFC sensors, or other types of sensors. In addition, as described herein, the output devices 125 may comprise visual output devices, audio output devices, actuators such as servos, solenoids, motors, or other actuators to provide haptic feedback, temperature control devices such as fans, heaters, or coolers, olfactory output devices, or other types of output devices.

The focus space 100 may also include one or more processors 160, and the processors 160 may include one or more memories. In addition, the processors 160 may be in communication with any and all of the other elements described herein that may be present within the focus space 100. For example, the processors 160 may be in communication with the display device 105, the filter device 107, the imaging device 110, the imaging device adjustment system 112, the illumination elements 114, the audio input/output devices 116, and/or other adjustment systems. In addition, the processors 160 may be in communication with the sensors 120, the output devices 125, the chair 130, the table 140, the controller 150, the collaboration devices, and/or the user devices.

In example embodiments, the processors 160 may receive one or more images, or video, captured by the imaging device 110 of a first user within the focus space 100, and may save, record, process, and/or transmit the captured images or video. For example, the captured images or video may be transmitted to a second user, e.g., to a second focus space within which the second user is collaborating with the first user. Likewise, the processors 160 may receive images or video captured by a second imaging device of the second user within the second focus space, and may present or display the received images or video via the display device 105 for presentation to the first user within the focus space 100.

In addition, the processors 160 may receive audio captured by the audio input/output devices 116 of a first user within the focus space 100, and may save, record, process, and/or transmit the captured audio. For example, the captured audio may be transmitted to a second user, e.g., to a second focus space within which the second user is collaborating with the first user. Likewise, the processors 160 may receive audio captured by second audio input/output devices of the second user within the second focus space, and may emit the received audio via the audio input/output devices 116 for presentation to the first user within the focus space 100.

In further example embodiments, the processors 160 may receive data or information related to aspects detected by the sensors 120 of the focus space 100. Based on the detected aspects by the sensors 120 of the first user, the activity, and/or the environment, the processors 160 may change or adjust one or more aspects associated with the first user, the activity, and/or the environment by initiating one or more actions via various output devices 125. Further, based on the detected aspects by the sensors 120 of the first user, the activity, and/or the environment, the processors 160 may determine a first focus target associated with the first user, the activity, and/or the environment, and a first current focus score of the first user within the focus space. In addition, based at least in part on the first focus target and the first current focus score of the user, and/or a variation between the first focus target and the first current focus score, the processors 160 may initiate one or more actions via various output devices 125 to affect the first current focus score of the first user within the focus space.

In addition, the processors 160 may receive data or information related to aspects detected by the sensors of a second focus space within which a second user is collaborating with the first user. Based on the detected aspects by the sensors of the second user, the activity, and/or the environment, the processors 160 may change or adjust one or more aspects associated with the second user, the activity, and/or the environment by initiating one or more actions via various output devices associated with the second focus space. Further, based on the detected aspects by the sensors of the second user, the activity, and/or the environment, the processors 160 may determine a second focus target associated with the second user, the activity, and/or the environment, and a second current focus score of the second user within the second focus space. In addition, based at least in part on the second focus target and the second current focus score of the second user, and/or a variation between the second focus target and the second current focus score, the processors 160 may initiate one or more actions via various output devices 125 to affect the second current focus score of the second user within the second focus space.

Moreover, in addition to changing or maintaining current focus scores of users relative to respective focus targets, in the context of collaborative activities involving a plurality of users, the processors 160 may also determine a difference target or threshold associated with the plurality of users, the activity, and/or the environment. Then, the processors 160 may compare current focus scores of the plurality of users relative to each other to determine a difference. Further, based at least in part on the difference between the current focus scores of the plurality of users and the difference target or threshold, and/or a variation between the difference and the difference target or threshold, the processors 160 may initiate one or more actions via various output devices 125 in order to change or maintain the difference between any two focus scores of respective users relative to the difference target or threshold. In this manner, the focus scores of a plurality of users may be maintained at approximately desired levels relative to each other during a collaborative activity, in addition to maintaining the focus scores of the plurality of users relative to respective focus targets for each user, or relative to a collaborative focus target for the plurality of users engaged in the collaborative activity as a whole.

Figure 2:
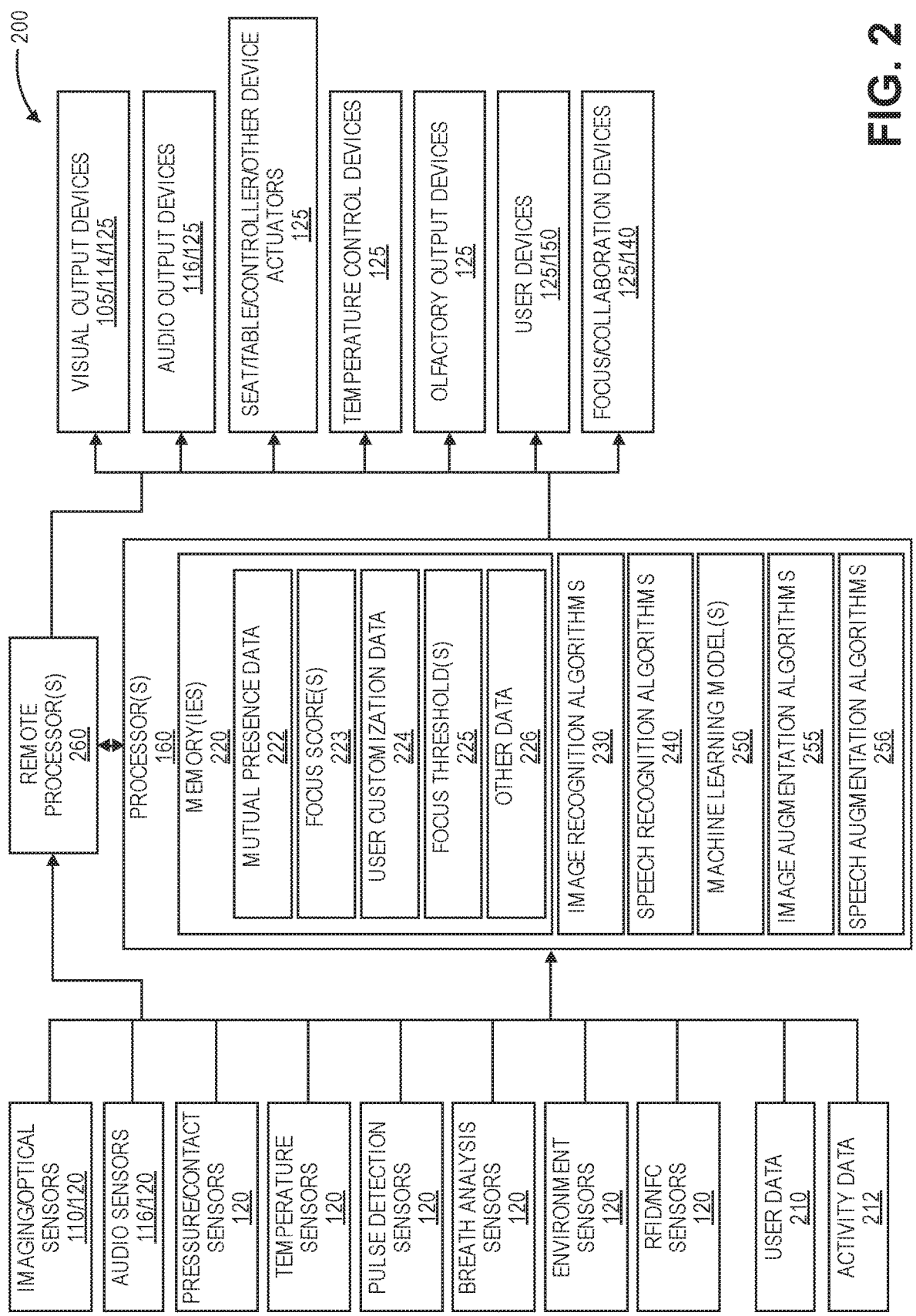
FIG. 2 is a block diagram of an example system architecture associated with an example focus space, according to an implementation.

FIG. 2 is a block diagram of an example system architecture 200 associated with an example focus space, according to an implementation.

The example system architecture 200 may include one or more processors 160. In addition, the processors 160 may be in communication with and/or receive data from various sensors 110, 116, 120, and/or may receive other data or inputs, such as user data 210, activity data 212, or other data. As described herein, the various sensors 110, 116, 120 may include imaging or optical sensors, depth sensors, audio sensors, pressure or contact sensors, temperature sensors, heartrate or pulse detection sensors, breath analysis sensors, environment sensors, RFID or NFC sensors, or other types of sensors. The various sensors 110, 116, 120 may detect aspects of the user, the activity, and/or the environment associated with the focus space 100, and data or information associated with the detected aspects may be provided to the processors 160.

Further, the processors 160 may also be in communication with and/or transmit data to various output devices 105, 114, 116, 125, 140, 150, and/or may transmit other data, information, or outputs to other computing devices, such as user devices 125, 150, focus or collaboration devices 125, 140, or other computing devices. As described herein, the various output devices 105, 114, 116, 125, 140, 150 may include visual output devices, audio output devices, actuators associated with portions or devices within the focus space, temperature or environment control devices, olfactory output devices, user devices, focus or collaboration devices, or other types of output devices. The various output devices 105, 114, 116, 125, 140, 150 may be instructed by the processors 160 to initiate various actions or outputs to affect the user, the activity, and/or the environment associated with the focus space 100, and other data, information, or outputs may be presented or displayed to the user via various computing devices.

Further, the example system architecture 200 may also include one or more remote processors 260. The remote processors 260 may also be in communication with and/or receive data from the various sensors 110, 116, 120, and/or may receive other data or inputs, such as user data 210, activity data 212, or other data. In addition, the remote processors 260 may also be in communication with and/or transmit data to the various output devices 105, 114, 116, 125, 140, 150, and/or may transmit other data, information, or outputs to other computing devices, such as user devices 125, 150, focus or collaboration devices 125, 140, or other computing devices.

In example embodiments, the processors 160 may be locally associated with the focus space 100, and the remote processors 260 may be physically remote from the focus space 100 while maintaining communication via a network with the focus space 100, as well as with different focus spaces at different locations. Further, the remote processors 260 may include any and all of the components and functionality described herein with respect to the processors 160. In this manner, the various processes, methods, operations, and functionality performed by the processors 160 may be distributed between the processors 160 and the remote processors 260 in various combinations.

The distribution of the various processes, methods, operations, and functionality between the processors 160 and the remote processors 260 may be determined as a function of a variety of factors, including type or quantity of data, type of processing, available processing power, current or expected processing load, current or expected network bandwidth, current or expected network latency, or other factors related to processing and communication by and between the processors 160 and remote processors 260.

For example, in example embodiments in which the network latency is relatively high, a greater proportion of processing may be performed locally by the processors 160 in order to avoid processing delays due to the relatively high network latency. In other example embodiments in which the network latency is relatively low, a greater proportion of processing may be performed remotely by the remote processors 260 when such processing delays may be minimal or negligible due to the relatively low network latency. In addition, processing of large amounts of data, e.g., video data and/or augmenting imaging data, may be performed locally by the processors 160 to avoid limitations and delays due to network bandwidth and network latency required to transmit and receive such large amounts of data to and from the remote processors 260. Further, if the remote processors 260 currently have a high processing load, then processing of data associated with the focus space 100 may be performed locally by the processors 160, or vice versa. Various other factors or combinations of factors may also affect the distribution of processing and operations between the processors 160 and remote processors 260 at any particular time.

The processors 160 and/or remote processors 260 may be any suitable type or category of processors, such as graphics processing units (GPUs), central processing units (CPUs), other types of processors, or combinations thereof. The processors 160 and/or remote processors 260 may be designed and/or configured to perform the processes, methods, operations, and functionality described herein. For example, as shown in FIG. 2, the processors 160 and/or remote processors 260 may include one or more image recognition algorithms 230, one or more speech recognition algorithms 240, one or more machine learning models 250, one or more image augmentation algorithms 255, and/or one or more speech augmentation algorithms 256. In addition, the processors 160 and/or remote processors 260 may also include various other algorithms or models to performs various other processes, methods, operations, and functionality described herein related to any of the detected aspects by various sensors and/or any of the various actions or outputs via the various output devices.

Further, the processors 160 and/or remote processors 260 may include one or more memories 220 in which various data items may be stored. For example, the memories 220 may include focus scores 223 of users and/or activities within the focus space, which may include past focus scores, learned focus scores, current focus scores, or other types of focus scores. In addition, the memories 220 may also include focus targets or thresholds 225 of users and/or activities within the focus space, which may include focus targets associated with individual users and/or activities, focus targets associated with collaborating users and/or activities, difference targets or thresholds associated with collaborating users and/or activities, or other types of focus or difference targets or thresholds.

The focus scores 223 and/or focus targets or thresholds 225 may be determined using one or more of the image recognition algorithms 230, speech recognition algorithms 240, and/or machine learning models 250, as further described herein. Furthermore, the memories 220 may also include various other data 226, which may include data or information associated with the various sensors, data received from the various sensors, user data, schedules, characteristics, preferences, habits, or other stored aspects of users, activity data, types, purposes, goals, times, durations, numbers of participants, or other stored aspects of activities, various outputs or results of processing or operations of the image recognition algorithms, speech recognition algorithms, machine learning models, or other algorithms or models, data or information associated with the various output devices, instructions transmitted to or to be transmitted to the various output devices, and/or various other data items associated with the processes, methods, operations, and functionality described herein.

For example, the memories 220 may include mutual presence data 222 of users and/or activities within the focus space, which may include visual or optical imaging data, depth imaging data, infrared imaging data, other types of imaging data, lighting data, audio data, depth data, focal length data, sizing data, eye gaze data, imaging device adjustment data, filter device adjustment data, display device adjustment data, background data, illumination element adjustment data, audio output device adjustment data, or other data associated with creating and/or maintaining mutual presence and/or mutual eye gaze between connected users in different focus spaces.

In addition, the memories 220 may also include user customization data 224 of users and/or activities within the focus space, which may include user identification data, facial recognition data, voice recognition data, RFID tag or NFC device data, user preferences, user characteristics, user habits, user calendars, user emails, user contacts, user devices data, user location data, activity data, activity calendars, visual output device adjustment data, audio output device adjustment data, actuator adjustment data, environment adjustment data, olfactory output device adjustment data, collaboration or user device adjustment data, or other data associated with customizing or adjusting aspects of the focus space for particular users.

The mutual presence data 222 and/or user customization data 224 may be determined using one or more of the image recognition algorithms 230, speech recognition algorithms 240, machine learning models 250, one or more image augmentation algorithms 255, and/or one or more speech augmentation algorithms 256, as further described herein. Furthermore, the memories 220 may also include various other data 226, which may include data or information associated with the various sensors, data received from the various sensors, user data or other stored aspects of users, activity data or other stored aspects of activities, various outputs or results of processing or operations of the image recognition algorithms, speech recognition algorithms, machine learning models, or other algorithms or models, data or information associated with the various output devices, instructions transmitted to or to be transmitted to the various output devices, and/or various other data items associated with the processes, methods, operations, and functionality described herein.

In example embodiments, the image recognition algorithms 230 may comprise various types of image recognition or machine vision algorithms or models that may receive imaging data, e.g., one or more images and/or video files or streams, from one or more imaging devices and process such received imaging data in order to recognize one or more features expressed in the imaging data that may relate to body positions, hand movements, facial expressions, eye movements, heartrates or pulses, breathing patterns, or other visual indicators of focus, and/or may relate to mutual presence, mutual eye gaze, user customization, and/or other optical, depth, or other visual features. Information and/or data regarding features expressed in imaging data, including colors, textures, depths, or outlines of the features, may be extracted from the data in any number of ways. For example, colors of pixels, or of groups of pixels, in imaging data may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features expressed in imaging data may be identified using one or more computer-based methods, such as by identifying changes in intensities within regions or sectors of the imaging data, or by defining areas of imaging data corresponding to specific surfaces, edges, lines, shapes, or other features.

Furthermore, edges, contours, outlines, colors, textures, silhouettes, shapes, features, or other characteristics of objects, or portions of objects, expressed in imaging data may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes, features, or other characteristics of objects or portions thereof) within the imaging data, and in a manner that minimizes noise and disruptions and does not create false transitions. Some algorithms or techniques that may be utilized in order to recognize one or more features expressed in the imaging data that may relate to body positions, hand movements, facial expressions, eye movements, heartrates or pulses, breathing patterns, or other visual indicators of focus, and/or may relate to mutual presence, mutual eye gaze, user customization, image augmentation, and/or other optical, depth, or other visual features in imaging data may include, but are not limited to, Canny edge detectors or algorithms; Sobel operators, algorithms or filters; Kayyali operators; Roberts edge detection algorithms; Prewitt operators; Frei-Chen methods; or any other algorithms, models, or techniques including machine learning algorithms or techniques that may be known to those of ordinary skill in the pertinent arts.

Once the features or characteristics of objects or portions thereof have been recognized in the imaging data, such features or characteristics of the objects or portions thereof may be matched against known or learned information regarding edges, contours, outlines, colors, textures, silhouettes, shapes, or other known or learned features or characteristics expressed in the imaging data that may relate to body positions, hand movements, facial expressions, eye movements, heartrates or pulses, breathing patterns, or other visual indicators of focus, and/or may relate to mutual presence, mutual eye gaze, user customization, and/or other optical, depth, or other visual features, which may be stored in one or more data stores or memories. In this regard, features or characteristics of objects or portions thereof may be recognized and/or classified based at least in part on the extent to which the features or characteristics identified in the imaging data corresponds to one or more of the known or learned features or characteristics expressed in the imaging data that may relate to body positions, hand movements, facial expressions, eye movements, heartrates or pulses, breathing patterns, or other visual indicators of focus, and/or may relate to mutual presence, mutual eye gaze, user customization, and/or other optical, depth, or other visual features.

In example embodiments, the speech recognition algorithms 240 may comprise various types of speech recognition or sound recognition algorithms or models that may receive audio data, e.g., one or more audio files and/or streams, from one or more audio input devices and process such received audio data in order to recognize one or more aspects of speech or sounds expressed in the audio data that may relate to speed, cadence, tone, tenor, timbre, pitch, volume, inflection, content, choice of language or words, syncing or mimicking speech, other aspects of speech or other sounds, or other audio indicators of focus and/or audio features that may relate to mutual presence and/or user customization.

In some example embodiments, audio data may be decomposed into one or more constituent parts using a Fourier transformation or decomposition, such as a cepstrum analysis. For example, audio data may be decomposed based on one or more continuous transforms (e.g., Laplace transforms, Mellin transforms, Hartley transforms) or discrete transforms, or any other relevant algorithm or technique for recognizing aspects of sounds within audio data based on their respective characteristics. In other example embodiments, the audio data may be processed to identify characteristics of such sounds, including but not limited to speed, cadence, tone, tenor, timbre, pitch, volume, inflection, content, choice of language or words, syncing or mimicking speech, other aspects of speech or other sounds, or other audio indicators of focus and/or audio features that may relate to mutual presence and/or user customization. Further, one or more natural language processing engines or techniques may evaluate audio data and/or characteristics of sounds and mine any text, words, phrases or phonemes therefrom. Whether the speech or other sounds are related to any audio indicators of focus and/or audio features for mutual presence and/or user customization may be determined, at least in part, by comparing such text, words, phrases or phonemes to known or learned information related to audio indicators of focus and/or audio features for mutual presence and/or user customization, which may be stored in a database, memories, or other data stores.

Audio data may be classified or weighted in any number of ways based at least in part on any one or more of the recognized aspects of such speech or other sounds. For example, in some example embodiments, sounds may be classified or weighted based on their content or choice of language or words. In other example embodiments, sounds may be classified or weighted based on any speeds, cadences, pitches, tones, volumes, inflections, or other characteristics with which such words are spoken, or any other characteristics of such words. In addition, any algorithms or techniques for recognizing phonemes, words or patterns within speech, e.g., for recognizing isolated or connected words, or continuous or spontaneous speech, may be utilized in accordance with the present disclosure. For example, in some example embodiments, the systems and methods disclosed herein may be configured to recognize speech according to acoustic phonetic approaches, pattern recognition approaches, template-based approaches, stochastic modeling, dynamic time warping, vector quantization, or artificial intelligence or other knowledge-based approaches implemented using one or more machine learning algorithms or techniques.

Furthermore, any strategies for detecting, recognizing or classifying sounds or characteristics of sounds, e.g., according to one or more machine learning algorithms or techniques, including but not limited to nearest neighbor methods or analyses, artificial neural networks, conditional random fields, factorization methods or techniques, K-means clustering analyses or techniques, similarity measures such as log likelihood similarities or cosine similarities, latent Dirichlet allocations or other topic models, or latent semantic analyses, may be utilized in accordance with the present disclosure. Using any of the foregoing algorithms or techniques, or any other algorithms or techniques, characteristics of speech or other sounds within audio data may be determined that may relate to mutual presence and/or user customization.

In the example embodiments, the image augmentation algorithms 255 may include various image processing algorithms or machine learning algorithms to alter or augment images or a series of images in imaging data. In some embodiments, the image augmentation algorithms may receive data from the image recognition algorithms 230 indicating the position of different features detected in the imaging data and apply or assign different filtering, blurring, or pixelating techniques to portions of the imaging data based on the positions of those features. For example, the image recognition algorithm 230 may indicate the position of a head feature of a user represented in the imaging data, and the position of a body feature of the user. The image augmentation algorithm 255 may utilize that information to assign a first filter, such as a light blurring filter to the position of the body feature, which is an example of a secondary feature, and assign a second filter, such as a second light blurring filter, to other portions of the imaging data that are not indicated as the head feature or body feature (e.g., the remaining portions of the imaging data are treated as background). The imaging data may then be processed by the image augmentation algorithms 255 to produce augmented imaging data in which the body feature is deemphasized a first amount, the background is deemphasized a second amount, and the head feature remains unchanged.

As discussed further below, different features, such as primary features, secondary features, and the background may be determined by the image augmentation algorithms 255 based on, for example, one or more of identities of users, activities, etc., and different filters, blurring, or pixelation techniques applied to those different features to produce the augmented imaging data. By deemphasizing portions of the imaging data, potentially distracting aspects may be removed or deemphasized in the imaging data, thereby enhancing the mutual presence and focus between users. In addition, deemphasizing portions that may include information (e.g., papers, documents, whiteboards) that are not intended for sharing, reduces the other user's ability to discern that information from the received and presented imaging data.

In the example embodiments, the speech augmentation algorithms 256 may include various speech processing algorithms or translation algorithms that translate recognized speech into a different language. Any number or variety of speech translation algorithms, machine translation, machine learning translation algorithms, etc., may be used alone or in combination to translate recognized speech into a different language. For example, the speech augmentation algorithms 256 may operate in conjunction with the speech recognition algorithms 240 to translate determined speech spoken by a first user at a first focus location into a different language that is understandable to a second user at a second focus location. In some implementations, recognized speech may be stored in memory or a buffer at the focus space and blocks or recognized segments translated from one language to another to form augmented speech that is transmitted to a second focus location.

In some implementations, the speech augmentation algorithms 256 may also coordinate with the image augmentation algorithms 255 and the image augmentation algorithms 255 may augment portions of the imaging data, such as the user's mouth, so that the movement will correspond with the translated speech. For example, the image augmentation algorithm may utilize computer-generated imagery ("CGI") to alter the image data corresponding to the user's mouth so that the movement of the mouth corresponds with the translated speech. As part of the CGI, mouth movements or positions for different words, tones, intonations, etc., may be maintained in a data store and utilized to generate the CGI of the user's mouth. In such an example, the imaging data and the speech data may be buffered or stored until the augmentation of both have been completed. After the speech has been translated by the speech augmentation algorithms 256 and the imaging data augmented by the image augmentation algorithms 255, the augmented speech data and augmented imaging data may be synchronized and transmitted.

Although FIG. 2 shows image recognition algorithms 230, speech recognition algorithms 240, image augmentation algorithms 255, and speech augmentation algorithms 256, various other types of algorithms (not shown) may also be included as part of the example system architecture 200 in order to receive and process detected aspects by the various sensors other than imaging data or audio data. For example, other processing algorithms, such as machine learning algorithms or techniques or other types of algorithms or techniques described herein, may be used to process data received from pressure or contact sensors, temperature sensors, heartrate or pulse detection sensors, breath analysis sensors, environment sensors, or RFID or NFC sensors, as well as to process user data, activity data, or any other data. In example embodiments, the processing algorithms may process the detected aspects in order to identify, recognize, or classify various aspects of the user, activity, and/or the environment that may relate to various indicators of focus and/or mutual presence, mutual eye gaze, and/or user customization.

In example embodiments, the machine learning models 250 may comprise various types of machine learning algorithms, techniques, or models that may receive various data, e.g., detected aspects from the various sensors, data or inputs such as user data, activity data, and/or other data, and/or results or outputs from various processing algorithms such as image recognition algorithms, speech recognition algorithms, and/or other processing algorithms, and process such received data in order to determine one or more focus scores and/or focus targets or thresholds associated with users, activities, and/or environments, as well as to determine one or more actions or outputs to initiate via various output devices, in order to affect focus scores associated with users, activities, and/or environments, and/or to create, change, and/or maintain mutual presence and/or mutual eye gaze between connected users of different focus spaces, and/or to change or adjust customization of focus spaces via various output devices for particular users. Example machine learning models 250 may comprise artificial neural networks, deep neural networks, or any other machine learning algorithms, techniques, or models.

Machine learning models or tools, such as artificial neural networks, have been utilized to identify relations between respective elements of apparently unrelated sets of data. An artificial neural network is a parallel distributed computing processor comprised of individual units that may collectively learn and store experimental knowledge, and make such knowledge available for use in one or more applications. Such a network may simulate the non-linear mental performance of the many neurons of the human brain in multiple layers by acquiring knowledge from an environment through one or more flexible learning processes, determining the strengths of the respective connections between such neurons, and utilizing such strengths when storing acquired knowledge. Like the human brain, an artificial neural network may use any number of neurons in any number of layers, including an input layer, an output layer, and one or more intervening hidden layers. In view of their versatility, and their inherent mimicking of the human brain, machine learning tools including not only artificial neural networks but also nearest neighbor methods or analyses, factorization methods or techniques, K-means clustering analyses or techniques, similarity measures such as log likelihood similarities or cosine similarities, latent Dirichlet allocations or other topic models, or latent semantic analyses, have been utilized in various data processing applications.

Artificial neural networks may be trained to map inputted data to desired outputs by adjusting the strengths of the connections between one or more neurons, which are sometimes called synaptic weights. An artificial neural network may have any number of layers, including an input layer, an output layer, and any number of intervening hidden layers. Each of the neurons in a layer within a neural network may receive an input and generate an output in accordance with an activation or energy function, with parameters corresponding to the various strengths or synaptic weights. Likewise, each of the neurons within a network may be understood to have different activation or energy functions; in this regard, such a network may be dubbed a heterogeneous neural network. In some neural networks, at least one of the activation or energy functions may take the form of a sigmoid function, wherein an output thereof may have a range of zero to one, or 0 to 1. In other neural networks, at least one of the activation or energy functions may take the form of a hyperbolic tangent function, wherein an output thereof may have a range of negative one to positive one, or −1 to +1. Further, the training of a neural network according to an identity function results in the redefinition or adjustment of the strengths or weights of such connections between neurons in the various layers of the neural network, in order to provide an output that most closely approximates or associates with the input to the maximum practicable extent.

Artificial neural networks may typically be characterized as either feedforward neural networks or recurrent neural networks, and may be fully or partially connected. In a feedforward neural network, e.g., a convolutional neural network, information specifically flows in one direction from an input layer to an output layer, while in a recurrent neural network, at least one feedback loop returns information regarding the difference between the actual output and the targeted output for training purposes. Additionally, in a fully connected neural network architecture, each of the neurons in one of the layers is connected to all of the neurons in a subsequent layer. By contrast, in a sparsely connected neural network architecture, the number of activations of each of the neurons is limited, such as by a sparsity parameter.

Moreover, the training of a neural network is typically characterized as supervised or unsupervised. In supervised learning, a training set comprises at least one input and at least one target output for the input. Thus, the neural network is trained to identify the target output, to within an acceptable level of error. In unsupervised learning of an identity function, such as that which is typically performed by a sparse autoencoder, target output of the training set is the input, and the neural network is trained to recognize the input as such. Sparse autoencoders employ backpropagation in order to train the autoencoders to recognize an approximation of an identity function for an input, or to otherwise approximate the input. Such backpropagation algorithms may operate according to methods of steepest descent, conjugate gradient methods, or other like methods or techniques, in accordance with the systems and methods of the present disclosure. Those of ordinary skill in the pertinent art would recognize that any algorithm or method may be used to train one or more layers of a neural network. Likewise, any algorithm or method may be used to determine and minimize the error in an output of such a network. Additionally, those of ordinary skill in the pertinent art would further recognize that the various layers of a neural network may be trained collectively, such as in a sparse autoencoder, or individually, such that each output from one hidden layer of the neural network acts as an input to a subsequent hidden layer.

In example embodiments, the machine learning models 250 may be trained using detected aspects from the various sensors of users, activities, and/or environments, data or inputs such as user data, activity data, and/or other data, and/or results or outputs from various processing algorithms such as image recognition algorithms, speech recognition algorithms, and/or other processing algorithms, as well as actions or outputs initiated via various output devices, and/or feedback from users related to activities engaged in within the focus space. The feedback from users may include ratings, rankings, comments, or other types of feedback related to users, activities, detected aspects, initiated actions, or combinations thereof, which feedback may be provided during or after completion of various activities within the focus space. By such training, the machine learning models 250 may be trained to determine focus scores and/or focus targets or thresholds for users, activities, environments, and various combinations thereof. In addition, the machine learning models 250 may also be trained to identify or select actions or outputs to be initiated via various output devices to affect focus scores for users, activities, environments, and various combinations thereof. Further, by such training, the machine learning models 250 may be trained to create, change, and/or maintain mutual presence and/or mutual eye gaze between connected users of different focus spaces, and/or to change or adjust customization of focus spaces via various output devices for particular users.

In example embodiments, different combinations of the various detected or known aspects of users, activities, and/or environments may be learned by the machine learning models to create, change, and/or maintain mutual presence and/or mutual eye gaze within focus spaces. In addition, different aspects of mutual presence and/or mutual eye gaze may be learned as appropriate for various combinations of users, activities, and/or environments. For example, a first combination of lighting, focus, body sizing, background, and/or other aspects may be learned as appropriate for collaborative meetings of approximately five or more users, whereas a second combination of lighting, focus, body sizing, background, and/or other aspects may be learned as appropriate for collaborative meetings of only two users.

In further example embodiments, different combinations of the various detected or known aspects of users, activities, and/or environments may be learned by the machine learning models to change and/or adjust user customization within focus spaces. In addition, different aspects of user customization may be learned as appropriate for various combinations of users, activities, and/or environments. For example, a first combination of gestures, primary features, secondary features, temperature, lighting, seat height, display brightness, background, audio volume, and/or other aspects may be learned as appropriate for a first user participating in a first activity, whereas a second combination of gestures, primary features, secondary features, temperature, lighting, seat height, display brightness, background, audio volume, and/or other aspects may be learned as appropriate for a second user participating in a second activity, or for the first user participating in a third activity.

Accordingly, each particular combination of a user, an activity, and an environment may be associated with particular aspects related to mutual presence, mutual eye gaze, and/or user customization learned by the machine learning models for the particular combination. In addition, particular actions or outputs via various output devices may also be learned by the machine learning models to change or adjust aspects related to mutual presence, mutual eye gaze, and/or user customization for the particular combination.

For example, for an individual activity engaged in by a user, e.g., a reading activity by a first user, the machine learning models 250 may be trained to identify various individual detected aspects, e.g., body position, facial expression, heartrate, breathing pattern, room temperature, and/or ambient sound, of the user, activity, and/or environment as indicators of focus. Further, the machine learning models 250 may also be trained to identify various combinations of detected aspects of the user, activity, and/or environment as indicators of focus for the first user engaged in the first (reading) activity.

In addition, for another individual activity engaged in by a user, e.g., a presentation practice activity by a second user, the machine learning models 250 may be trained to identify various individual detected aspects, e.g., body position, hand movements, use of user device, heartrate, room temperature, aspects of speech, and/or ambient light, of the user, activity, and/or environment as indicators of focus. Further, the machine learning models 250 may also be trained to identify various combinations of detected aspects of the user, activity, and/or environment as indicators of focus for the second user engaged in the second (presentation) activity.

Moreover, different combinations of the various detected aspects of users may be learned by the machine learning models as different indicators of focus. For example, although a particular detected body position may indicate a high level of focus, the same detected body position in combination with particular detected hand movements or facial expressions may indicate a different level of focus. Likewise, although a particular detected heartrate may indicate a low level of focus, the same detected heartrate in combination with particular detected body positions or aspects of speech may indicate a different level of focus. Various other combinations of detected aspects may also be learned by the machine learning models to indicate various levels of focus.

Furthermore, various aspects of the users, activities, and/or environments may affect the learned indicators of focus. In example embodiments, particular users may have different characteristics, preferences, habits, or combinations thereof that will affect the determination of focus scores and/or focus targets or thresholds for each user, as well as the identification or selection of actions or outputs via various output devices to affect focus scores for each user. For example, one facial expression may indicate a high level of focus for a first user but a low level of focus for a second user. Likewise, one body position may indicate a high level of focus for a first user but a low level of focus for a second user. Similarly, one hand movement may indicate a high level of focus for a first user but a low level of focus for a second user. In addition, one pulse or breathing pattern may indicate a high level of focus for a first user but a low level of focus for a second user. Further, one aspect of speech, e.g., volume or cadence, may indicate a high level of focus for a first user but a low level of focus for a second user. In addition, other information associated with users, such as preferences, schedules, routines, or other practices or habits, may affect the learned indicators of focus associated with such users. Various combinations of user aspects may also be learned by the machine learning models to indicate various levels of focus, as well as to inform selection of actions or outputs via various output devices to affect focus scores for each user.

In other example embodiments, individual aspects of the activities or combinations thereof may affect the learned indicators of focus and/or may affect the determination of focus scores and/or focus targets or thresholds for each activity, as well as the identification or selection of actions or outputs via various output devices to affect focus scores for each activity. For example, one detected aspect of a user may indicate a high level of focus for a first type of activity, e.g., a study activity, but a low level of focus for a second type of activity, e.g., a group presentation. Likewise, one detected aspect of a user may indicate a high level of focus for a purpose or goal of a first activity, e.g., a brainstorming activity, but a low level of focus for a purpose or goal of a second activity, e.g., a meeting to reach a consensus. Similarly, one detected aspect of a user may indicate a high level of focus for a first activity at a first time, e.g., a morning review meeting, but a low level of focus for a second activity at a second time, e.g., an evening follow-up discussion. In addition, one detected aspect of a user may indicate a high level of focus for a number of participants of a first activity, e.g., a team building activity, but a low level of focus for a number of participants of a second activity, e.g., a one-on-one interview session. Various combinations of activity aspects may also be learned by the machine learning models to indicate various levels of focus, as well as to inform selection of actions or outputs via various output devices to affect focus scores for each activity.

In further example embodiments, individual aspects of the environment or combinations thereof may affect the learned indicators of focus and/or may affect the determination of focus scores and/or focus targets or thresholds for each environment, as well as the identification or selection of actions or outputs via various output devices to affect focus scores for each environment. For example, a particular time of day for a first type of activity may result in a higher level of focus than a different time of day for the first type of activity. Likewise, a particular temperature, humidity, and/or air quality for a first type of activity may result in a higher level of focus than a different temperature, humidity, and/or air quality for the first type of activity. Similarly, a particular ambient light and/or ambient noise for a first type of activity may result in a higher level of focus than a different ambient light and/or ambient noise for the first type of activity. In addition, a particular weather and/or season for a first type of activity may result in a higher level of focus than a different weather and/or season for the first type of activity. Various combinations of environment aspects may also be learned by the machine learning models to indicate various levels of focus, as well as to inform selection of actions or outputs via various output devices to affect focus scores for each environment.

Accordingly, each particular combination of a user, an activity, and an environment may be associated with a particular focus target or threshold (and/or a particular difference target or threshold for a collaborative activity) learned by the machine learning models for the particular combination. In addition, the detected aspects of the particular user may also be learned by the machine learning models to calculate current focus scores for the particular combination. For example, a particular user may generally have higher focus scores when engaged in morning interviews on rainy days over morning team meetings on such rainy days. Further, particular actions or outputs via various output devices may also be learned by the machine learning models to affect focus scores for the particular combination. For example, a particular user may generally have higher focus scores upon initiation of ambient nature sounds and floral scents in a slightly humid, warm environment during morning team meetings on rainy days.

Further, although FIG. 2 shows image recognition algorithms 230, speech recognition algorithms 240, machine learning models 250, image augmentation algorithms 255, and speech augmentation algorithms 256 as separate components within the example system architecture 200, each of these algorithms, techniques, or models may be combined in various manners. For example, the image recognition algorithms 230, speech recognition algorithms 240, image augmentation algorithms 255, speech augmentation algorithms 256, and other processing algorithms may provide respective outputs to and/or receive inputs from the machine learning models 250. In other example embodiments, the image recognition algorithms 230, speech recognition algorithms 240, image augmentation algorithms 255, speech augmentation algorithms 256, and other processing algorithms may form a part of or be wholly integrated into the machine learning models 250. In further example embodiments, the image recognition algorithms 230, speech recognition algorithms 240, image augmentation algorithms 255, speech augmentation algorithms 256, and other processing algorithms may form separate processing components within the machine learning models 250. Various other combinations of the image recognition algorithms 230, speech recognition algorithms 240, image augmentation algorithms 255, speech augmentation algorithms 256, other processing algorithms, and machine learning models 250 are also possible within the example system architecture 200. Moreover, the image recognition algorithms 230, speech recognition algorithms 240, image augmentation algorithms 255, speech augmentation algorithms 256, other processing algorithms, and machine learning models 250 may also be distributed and/or replicated on the remote processors 260 in various manners and combinations. Likewise, the memories 220 may also be distributed and/or replicated on the remote processors 260 in various manners and combinations.

FIG. 3A is a schematic diagram of example aspects 300 of an example focus space, according to an implementation.

As shown in FIG. 3A, the example focus space may include a plurality of walls, a floor, and a ceiling or roof to create a substantially closed, dark, and/or quiet space within which one or more users may participate in various types of activities. In addition, as shown in FIG. 3A, the example focus space may include a display device 105, a filter device 107, an imaging device 110, an imaging device adjustment system 112, one or more illumination elements 114, and/or one or more audio input/output devices (not shown), which components or elements may include any and all features described herein with respect to similar features of the example focus space 100 as shown in FIG. 1. During collaborative activities within the example focus space, a user of the example focus space may perceive that s/he is physically present with one or more other users within the space, even if such other users are actually physically remote in different focus spaces and digitally connected to the user in the focus space via a network. The example focus space shown in FIG. 3A may also include any and all the features, components, elements, devices, or other portions described herein with respect to the example focus space 100 shown in FIG. 1, although such features may not be specifically shown or described with respect to FIG. 3A.

As shown in FIG. 3A, the imaging device 110, or another imaging device associated with the example focus space, may comprise optical, depth, infrared, and/or other types of imaging devices or sensors. Based at least in part on optical and/or depth imaging data captured by the imaging device 110 or another imaging device, depth data associated with the user 155 of the example focus space may be determined. The depth data may indicate a depth between the user 155 and the display device 105. In example embodiments in which the imaging device 110 or another imaging device is not directly aligned with the display device 105, the depth data may be adjusted or corrected to indicate an actual depth between the user 155 and the display device 105 based on known positions and/or orientations of the imaging device 110 or another imaging device, the display device 105, the filter device 107, the chair 130 on which the user 155 is seated, or any other relevant components of the example focus space.

For example, the depth data may indicate a depth of the user 155 as a whole from the display device 105. In addition, the depth data may include various different types of depth data, such as depth data between the torso of the user 155 and the display device 105, depth data between the hands of the user 155 and the display device 105, depth data between the head or face of the user 155 and the display device 105, depth data between the eyes of the user 155 and the display device 105, or other types of depth data. Further, the depth data may change over time as the user 155 moves within the focus space during an activity.

In example embodiments, based at least in part on the depth data, the one or more illumination elements 114 and/or audio input/output devices may be adjusted. For example, by determining the current position of the user 155 within the focus space based at least in part on depth data, e.g., depth data associated with the head or face of the user 155, one or more illumination elements may be adjusted to illuminate the head or face of the user, e.g., with portrait lighting. Further, the depth data may include further detailed depth data related to facial structure or topography, and/or optical or infrared data may include detailed data related to skin tone, skin temperature, or other facial aspects, and one or more illumination elements may be adjusted to illuminate the head or face of the user to accentuate or deemphasize one or more facial aspects. Various aspects of the one or more illumination elements may be adjusted, such as illumination direction, intensity or brightness, focus, color, or other aspects related to lighting. In other example embodiments, such changes to aspects related to lighting may be digitally changed or adjusted, e.g., using software processes or techniques on imaging data, to accentuate or deemphasize one or more aspects related to lighting.

In addition, by determining the current position of the user 155 within the focus space based at least in part on depth data, e.g., depth data associated with the head or face of the user 155, one or more audio input/output devices may be adjusted so as to capture and/or emit audio data around the head or face of the user. Further, various other audio effects may be created by adjustment of the one or more audio input/output devices, such as monaural or monophonic sound, stereo sound, or other audio effects, by directing emitted audio data at various positions relative to the head or face of the user, such that audio of a different user 355 displayed via the display device 105 simulates or emulates the different user 355 being physically present within the focus space with the user 155, e.g., to create mutual presence. Various aspects of the one or more audio input/output devices may be adjusted, such as audio capture/emission direction, loudness, pitch, timbre, tone, or other aspects related to sound. In other example embodiments, such changes to aspects related to sound may be digitally changed or adjusted, e.g., using software processes or techniques on audio data, to create or alter one or more audio effects.

In example embodiments, based at least in part on the depth data, the focal length and other aspects of the imaging device 110 may be adjusted to capture clear, focused images of the user 155. For example, by determining the current position of the user 155 within the focus space based on optical and/or depth data, e.g., optical and/or depth data associated with the head or face of the user 155, the imaging device 110 may be adjusted to capture images of the user 155, in which the user 155 is centered, focused, and prominent within the captured images. Various aspects of the imaging device 110 may be adjusted, such as field of view, orientation, focal length, zoom, or other aspects related to the imaging device 110. In other example embodiments, such changes to aspects related to the imaging device 110 may be digitally changed or adjusted, e.g., using software processes or techniques on imaging data, to create or alter one or more aspects of the imaging data.

In further example embodiments, based at least in part on the depth data, imaging data that is to be displayed via the display device 105 may be altered or adjusted. For example, a display of a different user 355 via the display device 105 may be presented with a sizing based at least in part on the determined current position of the different user 355 within the different focus space, such that a sizing of the different user 355 displayed via the display device 105 simulates or emulates the different user 355 being physically present within the focus space with the user 155, e.g., to create mutual presence. Accordingly, the different user 355 may be displayed substantially in life-size such that the user 155 perceives that the different user 355 is physically present in the focus space. In other example embodiments, such changes to aspects related to the display device 105 may be digitally changed or adjusted, e.g., using software processes or techniques on imaging data, to create or alter one or more aspects of the displayed imaging data.

In addition to adjusting a sizing of a different user 355 displayed via the display device 105 to create mutual presence, other aspects of the display device 105 may also be adjusted based at least in part on optical and/or depth imaging data, such as lighting, brightness, contrast, focus, zoom, resolution, color, saturation, background, filter, content, or other visual aspects to create mutual presence. For example, lighting or brightness of the display device 105 may be adjusted to match aspects of the focus space. In addition, a background 306 displayed behind a different user 355 displayed via the display device 105 may be adjusted to match a background of the focus space, e.g., color, texture, pattern, material, lighting, or other aspects of a background. Further, color or saturation of the display device 105 may be adjusted to match aspects of the focus space. In other example embodiments, such changes to aspects related to the display device 105 may be digitally changed or adjusted, e.g., using software processes or techniques on imaging data, to create or alter one or more aspects of the displayed imaging data.

In still further example embodiments, based at least in part on the depth data, capture of images of users via imaging devices 110 and display of users via display devices 105 may be adjusted to achieve mutual eye gaze 360, e.g., to further create mutual presence. For example, by determining the current position of the user 155 within the focus space based on optical and/or depth data, e.g., optical and/or depth data associated with the eyes of the user 155, the imaging device 110 and/or the filter device 107 may be adjusted or oriented, e.g., translated and/or rotated vertically and/or horizontally using imaging device adjustment system 112 or other adjustment systems, to capture images of the user 155 with eyes of the user at a particular position, e.g., horizontally centered and at a particular vertical position. Likewise, the display device 105 may be adjusted to display images of the different user 355 with eyes of the user at a similar or same particular position, e.g., horizontally centered and at the particular vertical position. Further, the particular position may be adjusted based at least in part on a seated height, standing height, or other position of the user 155 or different user 355. For example, if the user 155 is seated on chair 130 in the example focus space, the capture of the different user 355 via an imaging device of the different focus space and display of the different user 355 via the display device 105 may be adjusted to create mutual eye gaze 360 at the current eye level of the seated user 155. Likewise, if the user 355 is standing in the different focus space, the capture of the user 155 via the imaging device 110 and display of the different user 155 via a display device of the different focus space may be adjusted to create mutual eye gaze at the current eye level of the standing user 355. In this manner, the user 155 may perceive that s/he is looking straight into the eyes of the different user 355 displayed via the display device 105, e.g., to create mutual eye gaze 360 and further mutual presence, between the users 155, 355. In other example embodiments, such changes to aspects related to eye gaze may be digitally changed or adjusted, e.g., using software processes or techniques on imaging data, to create mutual eye gaze and mutual presence.

In additional example embodiments, mutual presence may be further created and/or maintained by persistently displaying the different user 355 via the display device 105. For example, the different user 355 may be persistently displayed by not displaying or overlaying other elements or features via the display device 105. By persistently displaying the different user 355 (and only the different user 355) via the display device 105 in combination with the additional aspects described herein to create mutual presence, the user 155 may perceive that the different user 355 is physically present in the focus space together with the user 155, and the user 155 may not notice or may temporarily forget that the different user 355 is actually physically remote but connected via a network and displayed via a display device 105.

In further additional example embodiments, mutual presence may be further created and/or maintained by maintaining a lane of mutual presence 370 between the user 155 and the display device 105 free from other objects or obstructions. For example, the different user 355 displayed via the display device 105 may be maintained completely visible to the user 155 by not placing other objects such as tables, computers, or other objects between the user 155 and the display device 105. By maintaining the lane of mutual presence 370 free from obstructions in combination with the additional aspects described herein to create mutual presence, the user 155 may perceive that the different user 355 is physically present in the focus space together with the user 155, and the user 155 may not notice or may temporarily forget that the different user 355 is actually physically remote but connected via a network and displayed via a display device 105.

Figure 3B:
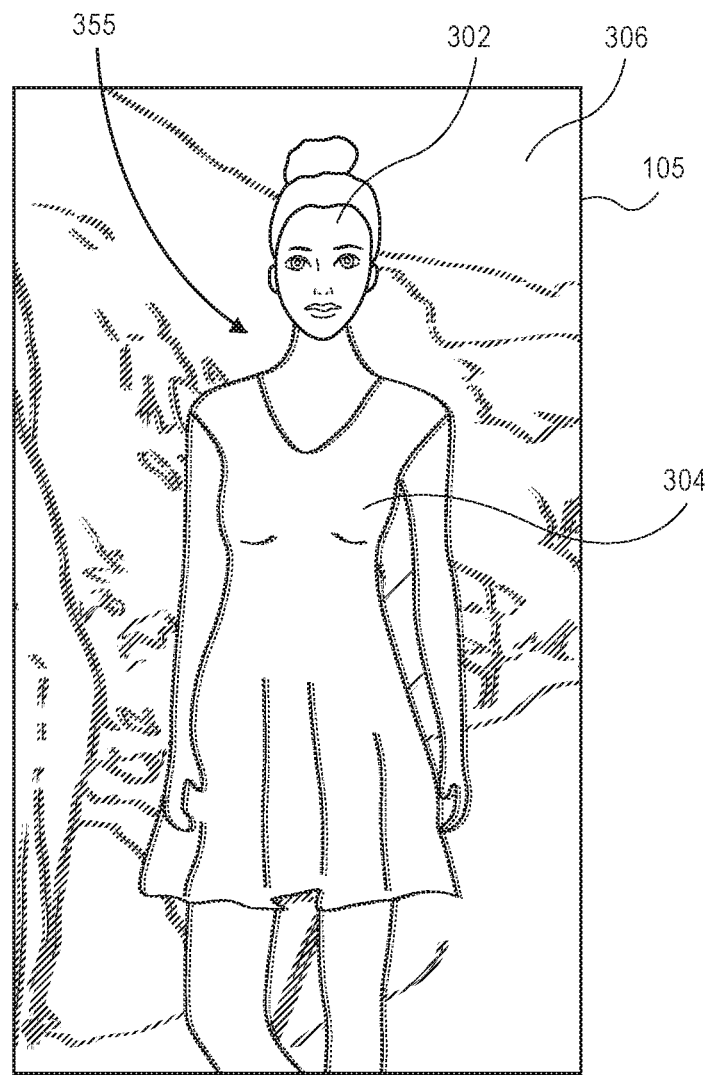
FIG. 3B is a diagram of an example display of a user displayed in a focus space with different portions of the display being deemphasized, according to an implementation.

In still further embodiments, as illustrated in FIG. 3B, different portions of the display of the different user 355 may be deemphasized. For example, one or more primary features 302, such as the face or head region of the different user 355, one or more secondary features 304, such as the body of the different user, and a background 306 may be determined, as discussed above, and different levels of deemphasis applied to those different features. For example, the primary features may not be modified so that a full high-resolution image of the primary features 302 is displayed on the display 105. The secondary features 304, such as the body of the user, may be slightly deemphasized by applying a light blurring filter or other pixelation technique to slightly soften that portion of the imaging data so that when the secondary features 304 are presented on the display 105, potentially distracting elements are removed or reduced. Still further, a further deemphasis of the background 306 may be performed to reduce or eliminate any potential distractions in the background, such as other objects (tables, chairs, people). In some implementations, the background 306 may be completely removed from the imaging data, thereby reducing the size of data transmitted between the focus spaces. Likewise, a baseline background may be stored at the focus space and presented as the background 306 with the presentation of the different user 355.

Not only does deemphasizing different features or portions of the imaging data reduce potential distractions and reduce the potential for unwanted and/or confidential information being shared, it also reduces the size of the imaging data that is transmitted between locations. For example, applying a light blurring filter to portions of the imaging data to produce the augmented imaging data reduces those portions of the imaging data from high-resolution imaging data to a lower resolution imaging data. As such, the bandwidth needed to transmit the resulting augmented imaging data is reduced.

Figure 4:
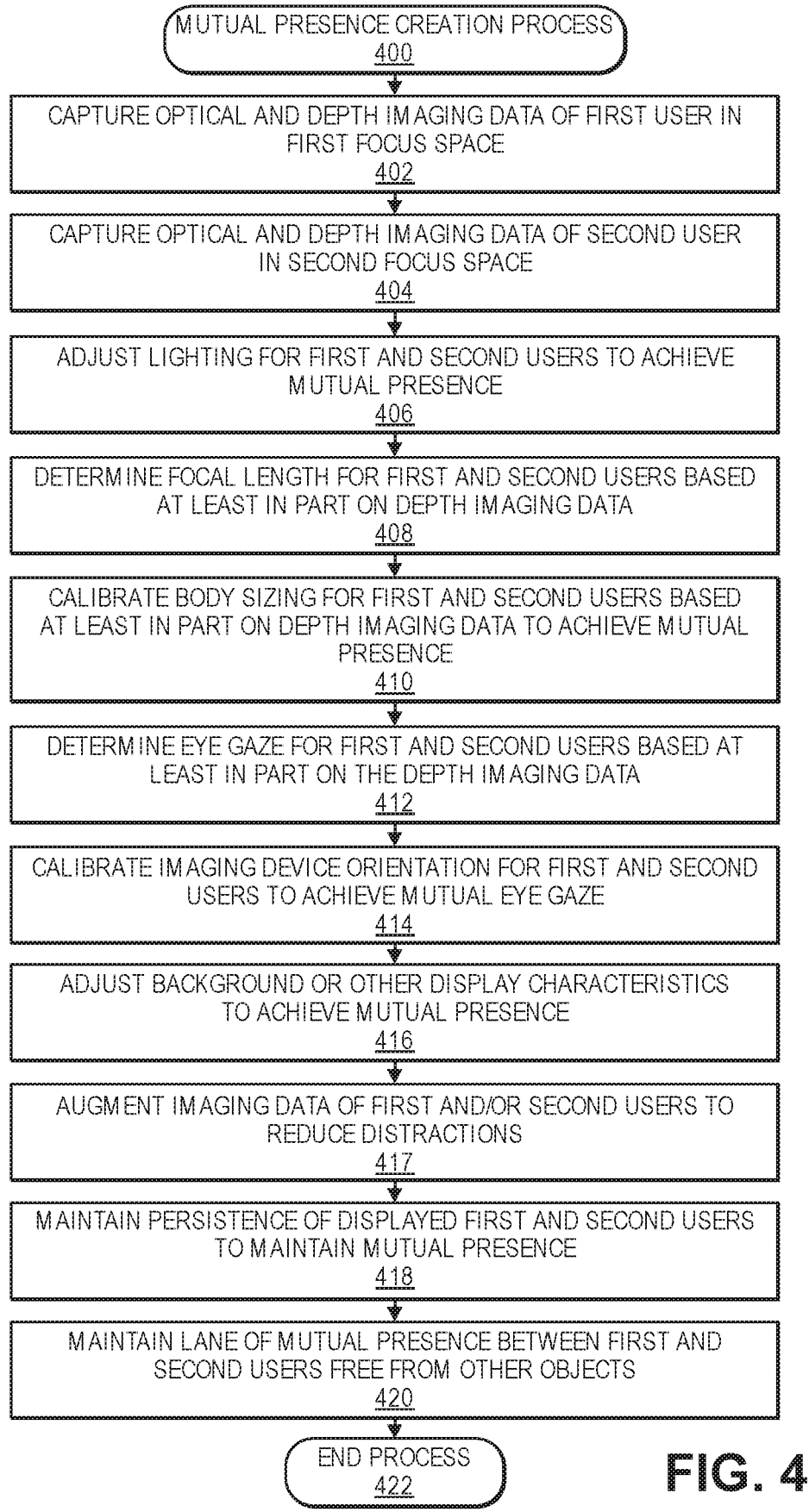
FIG. 4 is a flow diagram illustrating an example mutual presence creation process, according to an implementation.

FIG. 4 is a flow diagram illustrating an example mutual presence creation process 400, according to an implementation.

The process 400 may begin by capturing optical and depth imaging data of a first user in a first focus space, as at 402. For example, the first user may have entered a first focus space to participate in a collaborative activity with a second user. The first user may be seated or may be standing within the first focus space. One or more imaging devices may capture optical, depth, infrared, or other types of imaging data of the first user. In example embodiments, one or more imaging devices may be positioned and/or oriented to capture imaging data of the first user generally from the perspective of a display device that the first user is facing, e.g., using a combination of an imaging device and a filter device such as a partially reflective, partially transmissive surface or a half-silvered mirror. In other example embodiments, one or more imaging devices and/or filter devices may be positioned and/or oriented to capture imaging data of the first user from various other perspectives within the first focus space.

The process 400 may continue by capturing optical and depth imaging data of a second user in a second focus space, as at 404. For example, the second user may have entered a second focus space to participate in a collaborative activity with the first user. The second user may be seated or may be standing within the second focus space. One or more imaging devices may capture optical, depth, infrared, or other types of imaging data of the second user. In example embodiments, one or more imaging devices may be positioned and/or oriented to capture imaging data of the second user generally from the perspective of a display device that the second user is facing, e.g., using a combination of an imaging device and a filter device. In other example embodiments, one or more imaging devices and/or filter devices may be positioned and/or oriented to capture imaging data of the second user from various other perspectives within the second focus space.

The process 400 may proceed to adjust lighting for the first and second users to achieve mutual presence, as at 406. For example, based at least in part on optical and/or depth imaging data of the first and second users, one or more illumination elements within the first and second focus spaces may be adjusted to illuminate the first and second users, respectively, e.g., using portrait lighting. Various aspects of the illumination elements may be adjusted such as illumination direction, brightness, color, focus, or other aspects related to lighting. In other example embodiments, various aspects related to lighting may be digitally adjusted, e.g., within the imaging data and/or via display devices. The adjustment of lighting for the first and second users may accentuate each of the first and second users, e.g., faces of the first and second users, within the imaging data while not drawing attention to other peripheral portions of the imaging data, such as other portions of the first and second users, backgrounds, or other aspects within the focus spaces, e.g., to create mutual presence. In addition, the lighting for each of the first and second users may be adjusted to match the lighting within the respective focus space in which images of the first or second users will be displayed via display devices, e.g., to further create mutual presence.

Further, as described herein, aspects related to speech or sound may also be adjusted based at least in part on the optical and/or depth imaging data of the first and second users to create particular audio effects for each of the first and second users such that mutual presence is created via such audio effects. For example, one or more audio output devices may be adjusted to direct sound to each of the first and second users in their respective focus spaces such that sound associated with a user displayed via the display device simulate or emulates sound from a user who is physically present within the same focus space. Various aspects of the audio output devices may be adjusted such as pitch, timbre, tone, volume, or other aspects related to sound. In other example embodiments, various aspects related to sound may be digitally adjusted, e.g., within the audio data and/or via audio output devices.

The process 400 may then continue to determine a focal length for each of the first and second users based at least in part on the depth imaging data, as at 408. For example, a distance between each of the first and second users and a display device within their respective focus spaces may be determined based at least in part on a position and/or orientation of an imaging device within the focus space. In example embodiments, a user within a focus space may be seated approximately one meter away from the display device. In other example embodiments, a user within a focus space may be seated at various other distances from the display device. In addition, an approximate size of the first and second users may be determined based at least in part on optical and/or depth imaging data.

The process 400 may then proceed to calibrate body sizing for the first and second users based at least in part on the depth imaging data to achieve mutual presence, as at 410. For example, based at least in part on the distance between a first user and a display device within first focus space, body sizing of the first user displayed via the display device within the second focus space may be calibrated. Likewise, based at least in part on the distance between a second user and a display device within second focus space, body sizing of the second user displayed via the display device within the first focus space may be calibrated. Information from optical imaging data associated with approximate sizes of the first and second users may also be used to calibrate body sizing of users displayed via display devices.

For example, if a first user is seated relatively far from the display device (and the imaging device) within a first focus space, the first user represented within the captured imaging data may be relatively smaller than actual or life size due to the large distance between the first user and the display device (and the imaging device). Accordingly, the sizing of the first user may be enlarged or zoomed in when displayed via a display device for a second user within a second focus space, such that the first user appears to be actual or life size. Conversely, if a first user is seated relatively close to the display device (and the imaging device) within a first focus space, the first user represented within the captured imaging data may be relatively larger than actual or life size due to the small distance between the first user and the display device (and the imaging device). Accordingly, the sizing of the first user may be reduced or zoomed out when displayed via a display device for a second user within a second focus space, such that the first user appears to be actual or life size. In this manner, the display of users via display devices may be calibrated so that users are displayed approximately actual or life size, e.g., to create mutual presence. In other example embodiments, various aspects related to body or image sizing may be digitally adjusted, e.g., within the imaging data and/or via display devices.

The process 400 may continue to determine eye gaze for the first and second users based at least in part on the depth imaging data, as at 412. For example, based at least in part on the depth and/or optical imaging data, eyes of each of the first and second users may be identified within imaging data. In addition, positions and/or orientations of the eyes may also be determined.

The process 400 may proceed to calibrate imaging device orientation for the first and second users to achieve mutual eye gaze, as at 414. For example, based at least in part on the positions and/or orientations of the eyes of the first and second users, imaging devices and/or filter devices within the respective focus spaces may be adjusted so that the eye gaze of the first user meets the eye gaze of the second user. The imaging devices and/or filter devices may be translated and/or rotated vertically, horizontally, and/or in other directions in order to capture imaging data with the eyes of each user in a particular position. For example, the imaging devices and/or filter devices may be adjusted to capture imaging data of each user with the eyes approximately horizontally centered in the imaging data and approximately vertically centered within an upper half or upper third of the imaging data. Other particular positions of the eyes of each user may also be used.

In example embodiments, a first user may be standing within a first focus space, and a second user may be seated within a second focus space. An imaging device and/or filter device associated with the first focus space may be translated and/or rotated, e.g., upward, to capture eyes of the first user at a particular position. Likewise, an imaging device and/or filter device associated with the second focus space may be translated and/or rotated, e.g., downward, to capture eyes of the second user at a particular position. In addition, the imaging devices and/or filter devices may be adjusted so that the eye gazes of each of the first and second users within respective focus spaces is maintained substantially vertically aligned. Accordingly, if a first user is standing within a first focus space and a second user is seated within a second focus space, an imaging device and/or filter device associated with the first user may be translated and/or rotated, e.g., upward, so that eyes of the standing first user are captured and displayed at a position that is substantially vertically aligned with eyes of the seated second user within second focus space. Similarly, an imaging device and/or filter device associated with the second user may be translated and/or rotated, e.g., downward, so that eyes of the seated second user are captured and displayed at a position that is substantially vertically aligned with eyes of the standing first user within first focus space. In other example embodiments, various aspects related to eye gaze may be digitally adjusted, e.g., within the imaging data and/or via display devices. In this manner, mutual eye gaze may be created and/or maintained, e.g., to further create mutual presence.

The process 400 may then continue by adjusting background or other display characteristics to achieve mutual presence, as at 416. For example, backgrounds displayed via display devices may be changed or adjusted to match backgrounds within respective focus spaces, e.g., to create mutual presence. For example, if a first user is in a first focus space with a black background and a second user is in a second focus space with a patterned background, the second user may be displayed via the display device within the first focus space with a black background to match the first focus space, and the first user may be displayed via the display device within the second focus space with a patterned background to match the second focus space. In addition, various other aspects associated with display device characteristics may be adjusted such as brightness, color, saturation, or other aspects of display devices to match respective focus spaces. In other example embodiments, various aspects related to display device characteristics may be digitally adjusted, e.g., within the imaging data and/or via display devices.

In some embodiments, imaging data of the first user in the first focus space and/or imaging data of the second user in the second focus space may be augmented to reduce potential distractions, as at 417. For example, based on the identity of one or both of the users, the activity to be performed, etc., different features may be determined, such as a primary feature (e.g., face, head), secondary features (e.g., body, papers, markerboards), and background features, and some or all of those features may be deemphasized, and augmented imaging data produced that is transmitted from the focus space to the other focus space. As discussed, secondary features and/or backgrounds may be deemphasized by slight blurring or pixelation to reduce or eliminate the appearance of any potential distractions (e.g., shirt wrinkles, objects) or information that is not to be shared (e.g., content on a marker board, content on papers/documents). Deemphasizing features is discussed in further detail below with respect to FIG. 11.

The process 400 may then proceed by maintaining persistence of the displayed first and second users to maintain mutual presence, as at 418. For example, the display of a user via a display device within a focus space may not be overlaid or cluttered with other display elements, such as text, symbols, documents, notifications, or other objects that may generally be displayed via display devices. In addition, the display of a user via the display device may not be turned off or switched to view documents or presentations, such as to work collaboratively on shared documents. In this manner, mutual presence may be maintained such that each user may temporarily perceive that a user displayed via the display device is actually physically present in the same focus space.

The process 400 may then continue by maintaining a lane of mutual presence between the first and second users free from other objects, as at 420. For example, a space or lane between each user within a focus space and a user displayed via a display device in the focus space may not be obstructed, filled, or blocked with other objects or elements such as tables, chairs, books, computers, or any other objects that may obscure the display of the user via the display device. In this manner, mutual presence may be maintained by retaining the focus of each user on the displayed user and/or display device as opposed to other objects within the focus space, such that each user may temporarily perceive that a user displayed via the display device is actually physically present in the same focus space.

The process 400 may then end, as at 422. As described herein, by adjusting various aspects related to imaging devices, filter devices, display devices, illumination elements, audio output devices, imaging data, and/or other components or elements of focus spaces, the focus spaces may create the perception of mutual presence and/or mutual eye gaze between users that are physically remote in different focus spaces but digitally connected to each other via a network.

Figure 5:
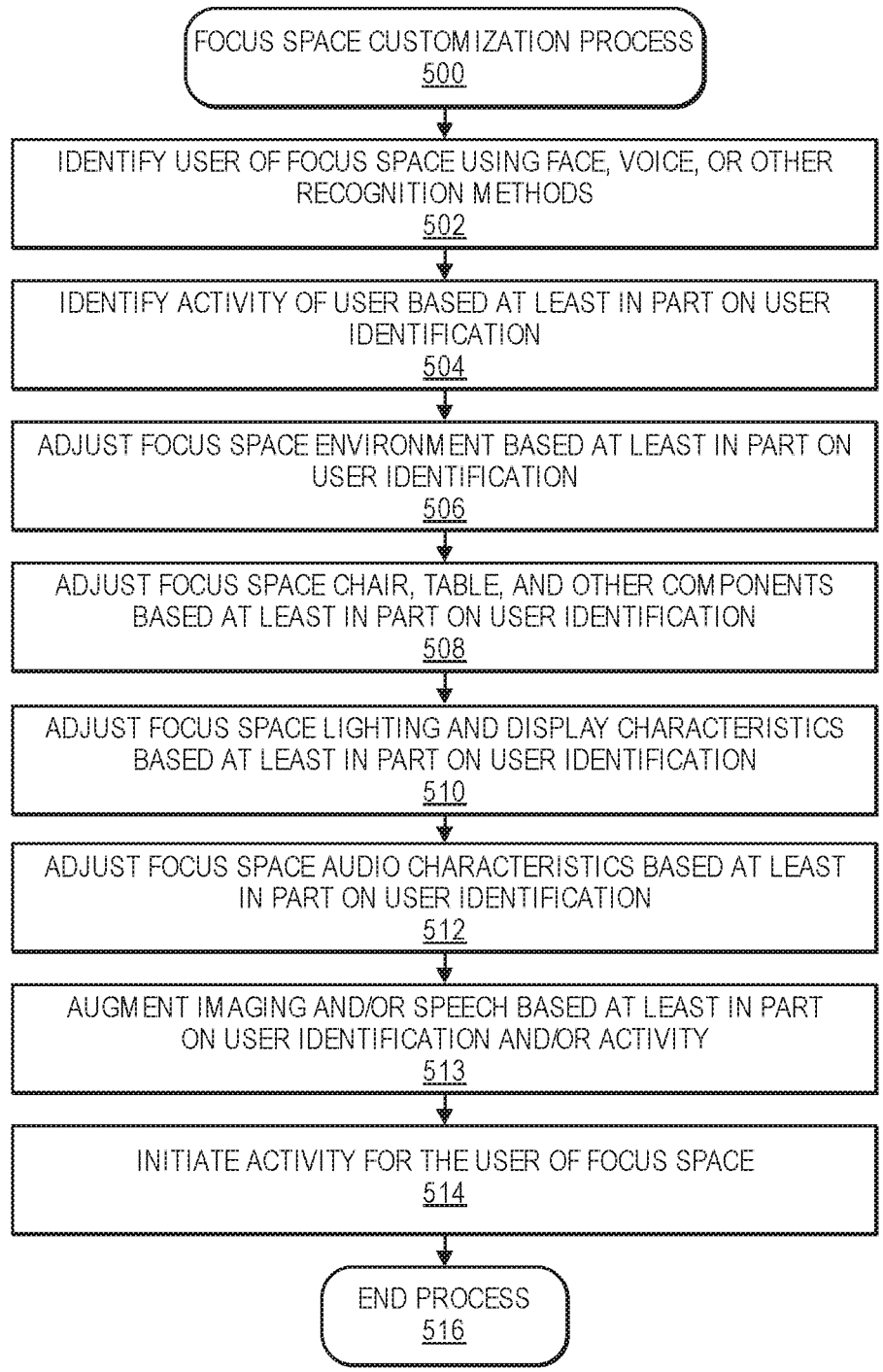
FIG. 5 is a flow diagram illustrating an example focus space customization process, according to an implementation.

FIG. 5 is a flow diagram illustrating an example focus space customization process 500, according to an implementation.

The process 500 may begin by identifying a user of a focus space using face, voice, or other recognition methods, as at 502. For example, using optical, depth, infrared, or other types of imaging data, a user may be identified using facial recognition techniques. In addition, a user may also be identified using voice or speech recognition techniques based on voice and/or speech characteristics of the user. Further, a user may be identified using RFID or NFC sensors that detect an RFID tag or NFC device associated with the user. Furthermore, a user may be identified with reference to a calendar that lists activities scheduled for a focus space. Moreover, a user may be identified by any combination of recognition methods. In addition, aspects associated with a user, such as user calendars, emails, contacts, preferences, characteristics, habits, or other aspects, may be identified with reference to stored or learned information about users.

The process 500 may proceed by identifying an activity of the user based at least in part on the user identification, as at 504. For example, the activity in which the user will participate within the focus space may be determined with reference to stored information associated with the user, e.g., a calendar, emails, contacts, or other information. In addition, the activity may also be identified with reference to a calendar that lists activities scheduled for a focus space. In example embodiments, the activity may comprise various types of activities, including group or collaborative activities or individual activities.

As part of process 500, various aspects of the focus space may be customized for the user and/or the activity. For example, the customization may occur prior to and/or during an activity engaged in by a user. In addition, the customization may be learned over time based on any previous activities of the user, similar users, and/or similar activities in various focus spaces. Based on the learned customization of aspects of focus spaces for particular users and/or activities, any focus space that is in communication with a network or other computing system with access to the learned information may be customized for particular users and/or activities.

For example, the process 500 may continue by adjusting the focus space environment based at least in part on the user identification, as at 506. For example, aspects related to the environment within the focus space may be sensed by various sensors, such as imaging sensors, audio sensors, temperature sensors, environment sensors, or other sensors. In addition, aspects related to the environment may be changed or adjusted by various output devices, such as audio output devices, temperature or environment control devices, olfactory output devices, or other output devices, based at least in part on user preferences, characteristics, habits, or other aspects. Further, aspects related to the environment may also be changed or adjusted based at least in part on an identified activity for the focus space. For example, a temperature of the focus space may be adjusted, a particular scent or fragrance may be emitted into the focus space, or other changes to the environment may be made.

The process 500 may proceed by adjusting the focus space chair, table, or other components based at least in part on the user identification, as at 508. For example, aspects related to the chair, table, collaboration devices, user devices, or other components or devices within the focus space may be sensed by various sensors, such as imaging sensors, audio sensors, pressure or contact sensors, RFID or NFC sensors, or other sensors. In addition, aspects related to the components or devices in the focus space may be changed or adjusted by various output devices, such as visual output devices, audio output devices, actuators associated with components or devices of the focus space, or other output devices, based at least in part on user preferences, characteristics, habits, or other aspects. Further, aspects related to the components or devices in the focus space may also be changed or adjusted based at least in part on an identified activity for the focus space. For example, a height, angle, or position of the chair may be adjusted, a height, angle, or position of the table may be adjusted, functions or configurations of collaboration or user devices may be adjusted, or other changes to the components or devices in the focus space may be made.

The process 500 may then continue to adjust the focus space lighting and display characteristics based at least in part on the user identification, as at 510. For example, aspects related to illumination elements, the imaging device, the filter device, the display device, collaboration or user devices, or other visual output devices within the focus space may be sensed by various sensors, such as imaging sensors, pressure or contact sensors, or other sensors. In addition, aspects related to the lighting and display characteristics in the focus space may be changed or adjusted by various output devices, such as visual output devices, actuators associated with components or devices of the focus space, or other output devices, based at least in part on user preferences, characteristics, habits, or other aspects. Further, aspects related to the lighting and display characteristics in the focus space may also be changed or adjusted based at least in part on an identified activity for the focus space. For example, aspects related to lighting may be adjusted, aspects related to imaging device operation may be adjusted, aspects related to display device characteristics may be adjusted, or other changes to the lighting and display characteristics in the focus space may be made.

The process 500 may then continue to adjust the focus space audio characteristics based at least in part on the user identification, as at 512. For example, aspects related to audio input/output devices, collaboration or user devices, or other audio output devices within the focus space may be sensed by various sensors, such as imaging sensors, audio sensors, pressure or contact sensors, or other sensors. In addition, aspects related to the audio characteristics in the focus space may be changed or adjusted by various output devices, such as audio output devices, actuators associated with components or devices of the focus space, or other output devices, based at least in part on user preferences, characteristics, habits, or other aspects. Further, aspects related to the audio characteristics in the focus space may also be changed or adjusted based at least in part on an identified activity for the focus space. For example, aspects related to speech of a connected user may be adjusted, aspects related to sound within the focus space may be adjusted, aspects related to capture of audio speech and sounds within the focus space may be adjusted, or other changes to the audio characteristics in the focus space may be made.

The process 500 may then proceed to augment or adjust augmentation of imaging data and/or speech data based at least in part on user identification and/or activity, as at 513. For example, during a mutual presence in which portions of the imaging data are being deemphasized, a user may gesture or otherwise indicate that a deemphasis of a portion of the imaging data is to be removed. In one example, if a marker board is being deemphasized, a gesture or indication may be detected that the first user desires to share the content of the marker board with the second user. In such an example, a filtering or other deemphasis technique for the marker board may be removed from that portion of the imaging data so that the transmitted imaging data includes high-resolution data of the marker board.

As another example, based on the determined identity of one or both of the users and the determined language spoken or understood by those users, the speech data of one or both users may be augmented to translate the speech, and optionally augment the corresponding imaging data with CGI to match the translated speech, so that the speech received by a user is understandable to that user. For example, if the first user only speaks and understands Spanish and the second user only speaks and understands German, the speech data of each user may be translated so that when it is output to the other user it is in the language that the receiving user can understand. In this example, the Spanish language spoken by the first user is translated to German and transmitted as augmented audio data to the second focus space and output in the German language, so the second user is able to understand the first user. In a similar manner, the German language spoken by the second user is translated into Spanish and transmitted as augmented audio data to the first focus space and output in the Spanish language, so that the first user is able to understand the second user. In addition, the corresponding imaging data may be augmented using CGI so that the mouth movement of the respective users corresponds with the translated speech. Additional details of audio augmentation are discussed further below with respect to FIG. 13.

The process 500 may then proceed to initiate the activity for the user of the focus space, as at 514. For example, during or after customizing one or more aspects of the focus space for the identified user and/or activity as described herein, the activity may be automatically initiated for the user of the focus space. In example embodiments, the activity may comprise a collaborative activity with a second user of a second focus space, and the focus space may automatically initiate a connection, e.g., including receipt and transmission of imaging and audio data, with the second focus space based at least in part on aspects associated with the user, the second user, and/or the activity. Further, the focus space may provide notifications or alerts, e.g., visual and/or audio messages, indicating to the user and/or the second user that the activity has been initiated, and/or requesting confirmation from the user and/or the second user to initiate the activity.

The process 500 may then end, as at 516. As described herein, by automatically customizing aspects of a focus space for a user and/or activity, as well as by automatically initiating such activities for users, the focus spaces may promote user presence and focus on important activities and participating users while removing distractions related to peripheral aspects, such as room temperature, imaging or display quality, audio quality, meeting or conference room dialing, video connections, or other technical operations, or various other peripheral aspects related to environment, components or devices, lighting or display characteristics, audio characteristics, or others.

FIGS. 6A and 6B are schematic diagrams of another example focus space 600A, 600B, according to an implementation.

As shown in FIGS. 6A and 6B, the example focus space 600A, 600B may include one or more extendible and retractable walls 602 and/or an extendible and retractable ceiling or roof (not shown) to temporarily create a substantially closed, dark, and/or quiet space within which one or more users may participate in various types of activities. In addition, as shown in FIGS. 6A and 6B, the example focus space may include a display device 605, a filter device 607, an imaging device 610, an imaging device adjustment system 612, one or more illumination elements 614, and/or one or more audio input/output devices 616, which components or elements may include any and all features described herein with respect to similar features of the example focus space 100 as shown in FIG. 1. During collaborative activities within the example focus space, a user of the example focus space may perceive that s/he is physically present with one or more other users within the space, even if such other users are actually physically remote in different focus spaces and digitally connected to the user in the focus space via a network. The example focus space shown in FIGS. 6A and 6B may also include any and all the features, components, elements, devices, or other portions described herein with respect to the example focus space 100 shown in FIG. 1, although such features may not be specifically shown or described with respect to FIGS. 6A and 6B.

FIG. 6A shows the example focus space 600A in a retracted configuration. The focus space 600A may be installed or placed within any environment, e.g., a home, business, office, meeting room, or any other environment. In addition, the focus space 600A may be placed against a wall, or in any other position within a space, such as a side or corner of a room. As shown in FIG. 6A, the one or more walls 602 are in a retracted or stowed configuration. In addition, the one or more walls 602 may retract by rolling, folding, or otherwise compressing a material of the walls 602.

The focus space 600A may also include a display device 605, a filter device 607, an imaging device 610, one or more illumination elements 614, and one or more audio input/output devices 616 disposed between the walls 602. For example, the display device 605 and filter device 607 may be attached between the walls 602, and the imaging device 610, illumination elements 614, and audio input/output devices 616 may be attached to the display device 605. Although FIG. 6A shows a particular number, configuration, or arrangement of the various components of the focus space 600A, various other configurations or arrangements of the various components are possible, such as a focus space having only one extendible/retractable wall attached to a display device that is movable or pivotably attached to a side or corner of a room, a focus space with an imaging device, illumination elements, and audio input/output devices attached to a side or underside of the display device, a focus space with different numbers or arrangements of imaging devices, illumination elements, and/or audio input/output devices, a focus space with various components attached to portions of the walls, or other configurations or arrangements.

As shown in FIG. 6A, the filter device 607 may comprise a partially reflective, partially transmissive surface, such as a half-silvered mirror, that may be in a retracted or stowed configuration that is substantially aligned and/or coplanar with a front of the display device 605. In addition, the imaging device 610, illumination elements 614, and/or audio input/output devices 616 may also be in a retracted or stowed configuration that is substantially aligned and/or coplanar with the display device 605 and/or walls 602. In such a retracted or stowed configuration, the focus space 600A may take up little space, may be relatively easily moved or repositioned, and/or may be stored. In addition, even in the retracted or stowed configuration, the display device 605, illumination elements 614, and/or audio input/output devices 616 may continue to be used as a screen or monitor and/or microphone or speakers for various purposes, such as teleconferences, video conferences, meetings, presentations, displays, or other purposes.

FIG. 6B shows the focus space 600B in an extended configuration. The one or more walls 602 may be unrolled, unfolded, pulled out, or otherwise expanded to an extended configuration. Likewise, a ceiling or roof (not shown) may also be unrolled, unfolded, pulled out, or otherwise expanded to an extended configuration. The extended configuration of the walls and ceiling may create a substantially closed, dark, and/or quiet space. In example embodiments, the focus space 600B may utilize one or more walls or ceiling already present within the space, e.g., if the display device is movably or pivotably attached to a side or corner of a room.

In addition, the half-silvered mirror may be moved or angled to an extended configuration. As described herein, the half-silvered mirror may be placed at an angle with respect to the display device 605, in order to capture images of a user of the focus space using an imaging device 610. The half-silvered mirror may pivot or rotate relative to the display device 605, e.g., using a telescoping mechanism, a scissor mechanism, a linear mechanism, a rotary mechanism, a screw mechanism, one or more actuators or motors, or combinations thereof. The imaging device 610 may also be moved or angled to an extended configuration, e.g., via an imaging device adjustment system 612. The imaging device adjustment system 612 may extend and retract the imaging device 610, e.g., using a telescoping mechanism, a scissor mechanism, a linear mechanism, a rotary mechanism, a screw mechanism, one or more actuators or motors, or combinations thereof. For example, the imaging device 610 may be placed at an angle with respect to the display device 605 and the half-silvered mirror, and may have a field of view directed toward the half-silvered mirror in the extended configuration so as to capture images of a user of the focus space via the half-silvered mirror.

Further, the illumination elements 614 and/or the audio input/output devices 616 may also move or rotate to an extended configuration, e.g., using a telescoping mechanism, a scissor mechanism, a linear mechanism, a rotary mechanism, a screw mechanism, one or more actuators or motors, or combinations thereof. For example, the illumination elements 614 and/or the audio input/output devices 616 may move closer to or rotate towards an expected position of a user of the focus space. In addition, as described herein, the illumination elements 614 and/or the audio input/output devices 616 may also include adjustment systems to further move or rotate such devices to change aspects related to lighting and/or sound.

As shown in FIGS. 6A and 6B, the example focus space 600A, 600B may comprise a temporary, or pop-up, embodiment of a focus space that can be placed or installed in various environments. In addition, the example focus space 600A, 600B may also include or incorporate any and all the various features, operations, or other functionality described herein with respect to focus spaces, including but not limited to, creating mutual presence and/or mutual eye gaze, and/or customizing such focus spaces for particular users and/or activities.

Figure 7:
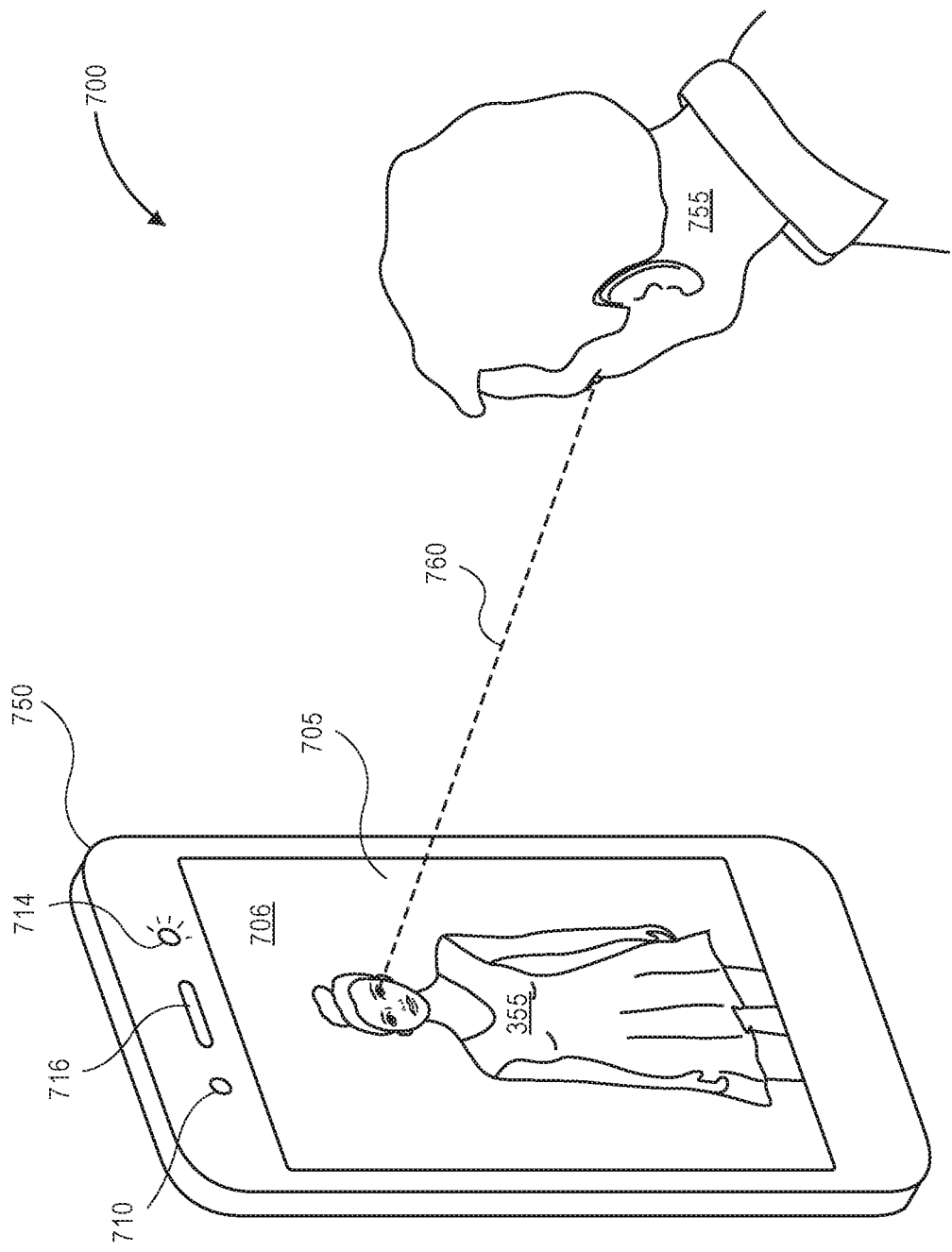
FIG. 7 is a schematic diagram of yet another example focus space, according to an implementation.

FIG. 7 is a schematic diagram of yet another example focus space 700, according to an implementation.

As shown in FIG. 7, the example focus space 700 may comprise a computing device 750, such as a cellular telephone, a smartphone, a connected or smart home device, a tablet computing device, a laptop computing device, or other portable computing device, with which one or more users may participate in various types of activities. In addition, as shown in FIG. 7, the example focus space may include a display 705, an imaging device 710, an imaging device adjustment system (not shown), one or more illumination elements 714, and/or one or more audio input/output devices 716, which components or elements may include any and all features described herein with respect to similar features of the example focus space 100 as shown in FIG. 1. During collaborative activities within the example focus space, a user 755 of the example focus space 700 may perceive that s/he is physically present with one or more other users 355 within the space, even if such other users are actually physically remote in different focus spaces and digitally connected to the user 755 in the focus space via a network. The example focus space shown in FIG. 7 may also include any and all the features, components, elements, devices, or other portions described herein with respect to the example focus space 100 shown in FIG. 1, although such features may not be specifically shown or described with respect to FIG. 7.

As shown in FIG. 7, the example focus space 700 may be a portable and/or handheld computing device, such that a user 755 may use the focus space 700 in any environment, e.g., a home, business, office, meeting room, vehicle passenger area or seat, or any other environment. For example, the focus space 700 may comprise an application, browser, operating system, or software running on a computing device, software running within another application such as a virtual reality or augmented reality application, or any other application or software executable on a computing device.

In addition, the display device 705, the imaging device 710, illumination elements 714, and/or audio input/output devices 716 may be attached to or integrally formed as part of the computing device 750 for the focus space 700. Although FIG. 7 shows a particular number, configuration, or arrangement of the various components of the focus space 700, various other configurations or arrangements of the various components are possible, such as a focus space having multiple display devices, multiple imaging devices, separate audio input devices and audio output devices, multiple illumination elements, as well as different configurations or arrangements of display devices, imaging devices, illumination elements, and/or audio input/output devices.

As shown in FIG. 7, the imaging device 710, the illumination elements 714, and/or the audio input/output devices 716 may include associated adjustment systems to move or rotate the various components, e.g., to adjust aspects related to capture of imaging data, to adjust aspects related to lighting, and/or to adjust aspects related to capture and emission of audio data. In addition, the display device 705 may also include adjustable characteristics with respect to display of the user 355, background 706, and other aspects of imaging data. As described herein, the adjustments to the display device 705, imaging device 710, illumination elements 714, and/or audio input/output devices 716 may be made to create the perception of mutual presence and/or mutual eye gaze between users 755, 355, and/or to customize operation of the computing device 750 for the user 755.

In other example embodiments, one or more aspects related to the display device 705, imaging device 710, illumination elements 714, and/or audio input/output devices 716 may be adjusted digitally within imaging data, audio data, via display characteristics of the display device 705, and/or via audio characteristics of the audio input/output devices 716. For example, aspects related to display of the user 355, aspects related to lighting, and/or aspects related to the background 706 may be digitally adjusted or altered within the imaging data and/or via the display device 705. In addition, aspects related to sound may also be digitally adjusted or altered within the audio data and/or via audio input/output devices 716.

Further, various aspects related to creation of mutual presence, such as lighting, body or image sizing, eye gaze, background or other display characteristics, may be digitally adjusted within imaging data and/or via the display device 705 in order to promote focus and engagement between the user 755 and the displayed user 355. In some example embodiments, as described herein, various image processing software or algorithms may be used to digitally move and/or rotate an image, e.g., a face or head, of a user in order to create mutual eye gaze 760 between users, e.g., based at least in part on optical and/or depth imaging data of users. For example, as shown in FIG. 7, although the eyes of user 755 may be directed towards an upper third of display device 705 and the imaging device 710 is positioned above the upper edge of the display device 705, various image processing software or algorithms may be used digitally move and/or rotate an image of the face or head of user 755, such that an image of the user 755 displayed via a display device for user 355 in a different focus space may appear to have an eye gaze directed toward the eyes of user 355. Similarly, an image of the user 355 displayed via the display device 705 may also be digitally moved and/or rotated so as to create mutual eye gaze 760 with the user 755 of focus space 700.

As shown in FIG. 7, the example focus space 700 may comprise a portable or handheld embodiment of a focus space that can be used in various environments. In addition, the example focus space 700 may also include or incorporate any and all the various features, operations, or other functionality described herein with respect to focus spaces, including but not limited to, creating mutual presence and/or mutual eye gaze, and/or customizing such focus spaces for particular users and/or activities.

In further example embodiments, the example focus spaces may be installed or placed within vehicles, e.g., such as autonomous vehicles, passenger cabins or seats, trailers, or other spaces of such vehicles, that may comprise substantially closed, dark, and/or quiet spaces within which users may participate in activities, with the additional functionality described herein with respect to creating mutual presence and/or mutual eye gaze, and/or customizing such spaces for particular users and/or activities. In addition, the example focus spaces may be standalone or dedicated systems, e.g., such as phone booths, pods with one or more focus spaces, or dedicated buildings or portions of buildings, that may comprise substantially closed, dark, and/or quiet spaces within which users may participate in activities, with the additional functionality described herein with respect to creating mutual presence and/or mutual eye gaze, and/or customizing such spaces for particular users and/or activities.

In still further example embodiments, the various example focus spaces may be utilized to promote focus for individual activities by providing substantially closed, dark, and/or quiet spaces that may further simulate other environments, such as libraries or cafés. For example, the display device and/or other visual output devices may display or present imagery that simulates a particular environment, such as a library, café, park, outdoor area, or any other environment. Likewise, the audio output devices, temperature and environment control devices, and/or olfactory output devices may emit sounds and/or scents, and/or may adjust temperature, humidity, or other aspects of the environment, to correspond with such simulated environments. Further, as described herein, the focus spaces may be customized for such users engaged in individual activities based on learned information about such users and/or activities. In this manner, the various example focus spaces may also promote focus of users engaged in individual activities in such customized environments.

Figure 8:
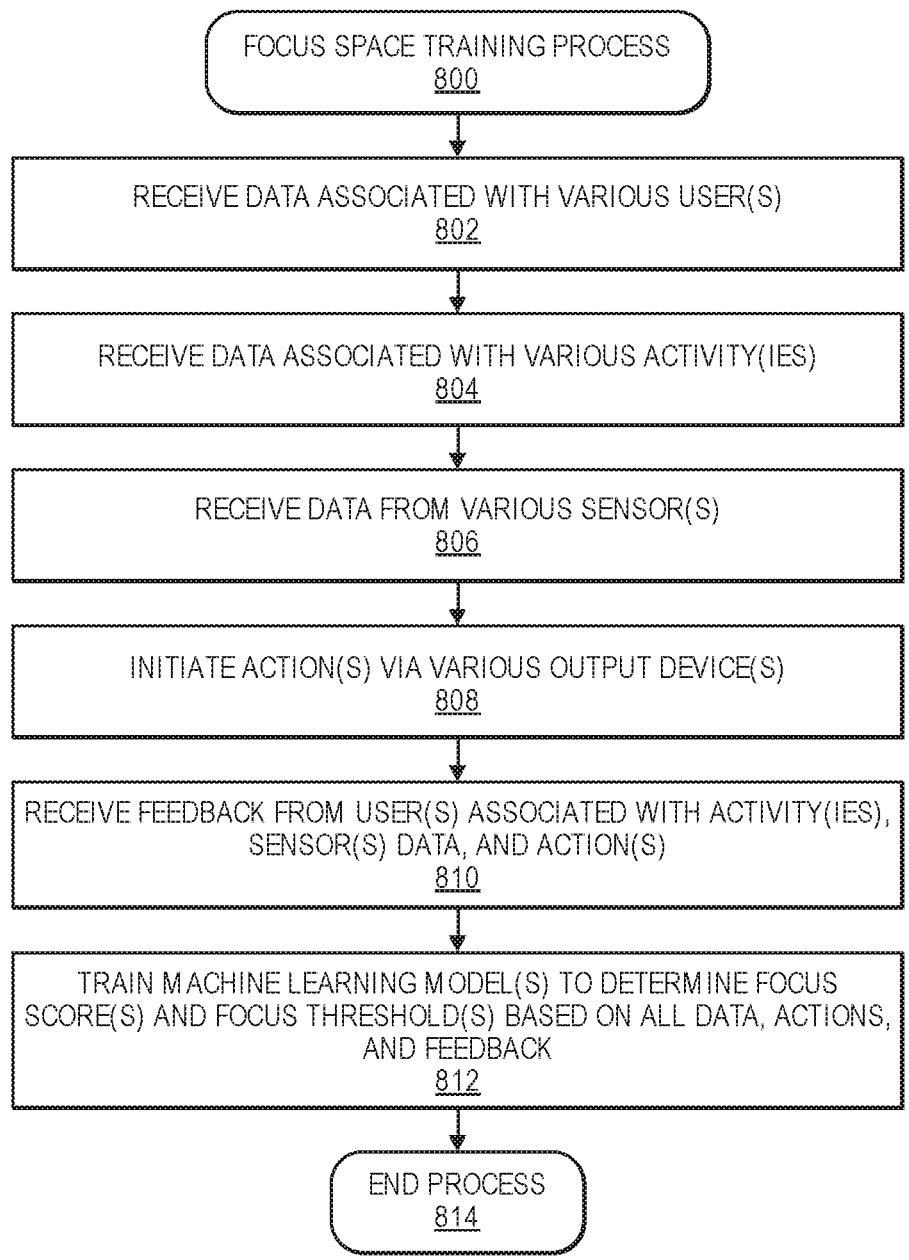
FIG. 8 is a flow diagram illustrating an example focus space training process, according to an implementation.

FIG. 8 is a flow diagram illustrating an example focus space training process 800, according to an implementation.

The process 800 may begin by receiving data associated with various users, as at 802. As described herein, the user data may relate to identities, schedules, user characteristics, user preferences, user habits, or other aspects of users. For example, users may be identified by the RFID or NFC sensors detecting RFID tags or NFC devices associated with users. In other example embodiments, users may be identified by facial recognition, fingerprint identification, voice recognition, or various other biometric identification methods. Then, other aspects related to users may be determined based on stored associations between identities of the users and their schedules, characteristics, preferences, habits, or other aspects. In still further example embodiments, some or all of the user data may be provided directly by the users. Any and all user data may be received and/or stored for processing and learning by the machine learning models.

The process 800 may continue by receiving data associated with various activities, as at 804. As described herein, the activity data may relate to types, purposes, goals, times, durations, numbers of participants, or other aspects of the activities. For example, the activity data may be identified based on schedules of identified users. In other example embodiments, the activity data may be stored in association with the focus space, such that the processors may identify and retrieve the activity data from stored information associated with the current day, time, users, or other related information. In still further example embodiments, some or all of the activity data may be provided directly by the users. Any and all activity data may be received and/or stored for processing and learning by the machine learning models.

The process 800 may proceed by receiving data from various sensors, as at 806. As described herein, the various sensors may detect any of the various aspects of the user, activity, and/or environment during activities within the focus space. For example, the various sensors may include imaging or optical sensors, audio sensors, pressure or contact sensors, temperature sensors, pulse detection sensors, breath analysis sensors, environment sensors, RFID or NFC sensors, or any other sensors associated with portions or devices of the focus space. Any and all detected aspects by the various sensors may be received and/or stored for processing and learning by the machine learning models.

The process 800 may continue to initiate one or more actions via various output devices, as at 808. As described herein, the various output devices may initiate various actions or outputs that may affect focus scores or levels of the user, activity, and/or environment during activities within the focus space. For example, the various output devices may include visual output devices, audio output devices, actuators associated with portions or devices of the focus space, temperature or environment control devices, olfactory output devices, focus or collaboration devices, user devices, or any other output devices associated with portions or devices of the focus space. Any and all actions or outputs initiated by the various output devices may be received and/or stored for processing and learning by the machine learning models. Further, any changes to detected aspects of the user, activity, and/or environment as a result of such actions or outputs initiated by the various output devices may also be received and/or stored for processing and learning by the machine learning models.

The process 800 may then proceed to receive feedback from users associated with the activities, sensor data, and actions, as at 810. As described herein, during or upon completion of activities, users may provide feedback such as ratings, rankings, comments, or other types of feedback related to users, activities, detected aspects, initiated actions, or combinations thereof. The feedback may include explicit indicators of levels of focus of users during activities, and/or the feedback may be processed to identify one or more indicators of levels of focus. Any and all feedback from users may be received and/or stored for processing and learning by the machine learning models.

Based on all the received user data, activity data, detected aspects, initiated actions, and feedback associated with users, activities, and/or environments of focus spaces, the process 800 may train the machine learning models to determine focus scores and focus targets or thresholds, as at 812. As described herein, the machine learning models may be trained to identify, individually and/or in various combinations, aspects of user data, aspects of activity data, detected aspects by various sensors of users, activities, and environments, initiated actions or outputs via various output devices, and/or user feedback to determine focus scores and focus targets or thresholds, as well as difference targets or thresholds for collaborative activities, for particular users, particular activities, particular environments, and combinations thereof. The process 800 may then end, as at 814.

By such training, the machine learning models may be trained to determine focus scores for any combination of users, activities, and environments, which may indicate a current level of focus for any particular combination. In addition, the machine learning models may be trained to determine focus targets or thresholds, and difference targets or thresholds, for any combination of users, activities, and environments, in which a focus target or threshold may indicate a desired and/or minimum focus score for a combination, and in which a difference target or threshold may indicate a desired and/or maximum difference in focus scores between users of a combination. Moreover, the machine learning models may also be trained to identify or select actions or outputs to be initiated via various output devices to affect focus scores for any combination of users, activities, and environments.

Although FIG. 8 describes training machine learning models with data associated with users and activities and related feedback, in other example embodiments, the training data for the machine learning models may be captured synchronously or asynchronously, may be created or curated independently of actual users or activities, and/or may be generated by various other processes. In addition, various training data may be tagged or labeled, using either manual or automatic processes, with appropriate data to train the machine learning models with respect to focus scores and focus targets or thresholds.

Figure 9:
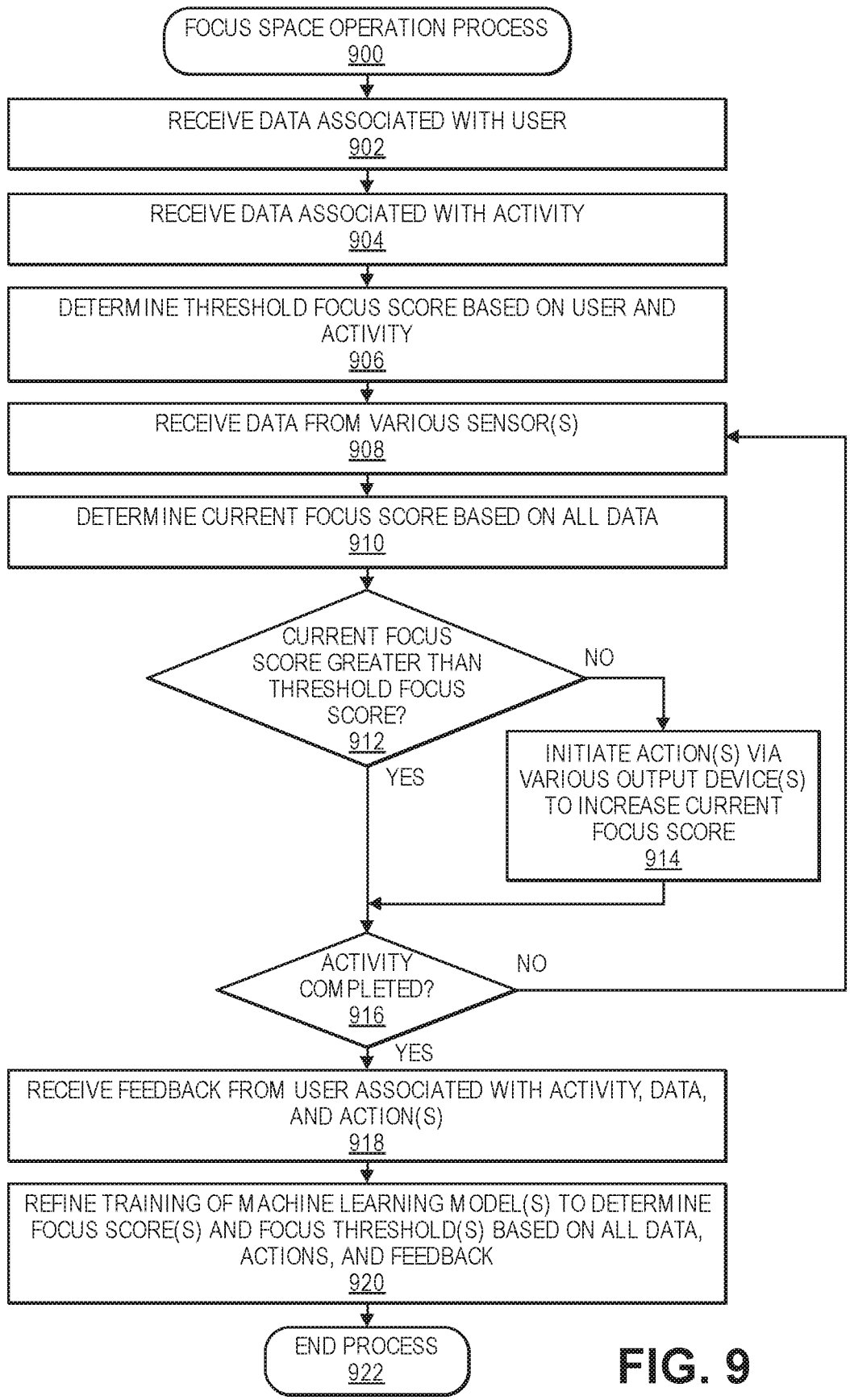
FIG. 9 is a flow diagram illustrating an example focus space operation process, according to an implementation.

FIG. 9 is a flow diagram illustrating an example focus space operation process 900, according to an implementation.

The process 900 may begin by receiving data associated with a user, as at 902. As described herein, the user data may relate to an identity, a schedule, user characteristics, user preferences, user habits, or other aspects of the user. For example, the user may be identified by the RFID or NFC sensors detecting an RFID tag or NFC device associated with the user. In other example embodiments, the user may be identified by facial recognition, fingerprint identification, voice recognition, or various other biometric identification methods. Then, other aspects related to the user may be determined based on stored associations between the identity of the user and a schedule, characteristics, preferences, habits, or other aspects of the user. In still further example embodiments, some or all of the user data may be provided directly by the user.

The process 900 may proceed by receiving data associated with an activity, as at 904. As described herein, the activity data may relate to a type, purpose, goal, time, duration, number of participants, or other aspects of the activity. For example, the activity data may be identified based on a schedule of the identified user. In other example embodiments, the activity data may be stored in association with the focus space, such that the processors may identify and retrieve the activity data from stored information associated with the current day, time, user, or other related information. In still further example embodiments, some or all of the activity data may be provided directly by the user.

The process 900 may then continue to determine a threshold focus score based on the user and the activity, as at 906. As described herein, the user data and activity data may be provided as inputs to the trained machine learning models, and the trained machine learning models may determine a target or threshold focus score associated with the user and activity. In addition, aspects of the environment may also be provided to the trained machine learning models as part of the determination of the target or threshold focus score. Further, as described herein, a target or threshold focus score may indicate a desired and/or minimum focus score for the identified user engaging in the activity.

The process 900 may then proceed to receive data from various sensors, as at 908. As described herein, the various sensors may detect any of the various aspects of the user, activity, and/or environment during the activity within the focus space. For example, the various sensors may include imaging or optical sensors, audio sensors, pressure or contact sensors, temperature sensors, pulse detection sensors, breath analysis sensors, environment sensors, RFID or NFC sensors, or any other sensors associated with portions or devices of the focus space. Any and all detected aspects by the various sensors may be received and/or stored for processing by the machine learning models.

The process 900 may then continue to determine a current focus score based on all the data, as at 910. As described herein, the user data, activity data, and detected aspects of the user, activity, and/or environment may be provided as inputs to the trained machine learning models, and the trained machine learning models may determine a current focus score associated with the user and activity. In addition, aspects of the environment may also be provided to the trained machine learning models as part of the determination of the current focus score.

Then, the process 900 may determine whether the current focus score is greater than the threshold focus score, as at 912. If it is determined that the current focus score is not greater than the threshold focus score, the process 900 may proceed to initiate one or more actions or outputs via various output devices to increase the current focus score, as at 914. In other embodiments, the current focus score may be compared with the target focus score to determine a variation, and if the variation is greater than a threshold variation, one or more actions or outputs may be initiated to change or affect the current focus score and reduce the variation. As described herein, the user data, activity data, and detected aspects of the user, activity, and/or environment may be provided as inputs to the trained machine learning models, and the trained machine learning models may determine one or more actions or outputs via various output devices to change a current focus score associated with the user and activity. For example, the various output devices may include visual output devices, audio output devices, actuators associated with portions or devices of the focus space, temperature or environment control devices, olfactory output devices, focus or collaboration devices, user devices, or any other output devices associated with portions or devices of the focus space. Any and all actions or outputs initiated by the various output devices may be received and/or stored for processing by the machine learning models.

The process 900 may then proceed, from steps 912 and 914, to determine whether the activity is completed, as at 916. If it is determined that the activity is not yet completed, then the process 900 may return to step 908 and continue to receive data from various sensors. From step 908, the process 900 may repeat, as described herein, to determine a current focus score based on all data, as at 910, to determine whether the current focus score is greater than the threshold focus score (or within a threshold variation of the target focus score), as at 912, and if not, to initiate one or more actions or outputs via various output devices to increase the current focus score (or change the current focus score to reduce the variation), as at 914.

If, however, it is determined at step 916 that the activity is completed, the process 900 may proceed to receive feedback from the user associated with the activity, all data, and any actions, as at 918. As described herein, during or upon completion of the activity, the user may provide feedback such as ratings, rankings, comments, or other types of feedback related to the user, activity, detected aspects, initiated actions, or combinations thereof. The feedback may include explicit indicators of levels of focus of the user during the activity, and/or the feedback may be processed to identify one or more indicators of levels of focus. Any and all feedback from users may be received and/or stored for processing by the machine learning models.

Then, the process 900 may proceed to refine the training of the machine learning models to determine focus scores and focus targets or thresholds based on all data, actions, and feedback, as at 920. As described herein, the training of the machine learning models may be continuously refined to identify, individually and/or in various combinations, aspects of user data, aspects of activity data, detected aspects by various sensors of users, activities, and environments, initiated actions or outputs via various output devices, and/or user feedback to determine focus scores and focus targets or thresholds, as well as difference targets or thresholds for collaborative activities, for particular users, particular activities, particular environments, and combinations thereof. The process 900 may then end, as at 922.

By such refinement of training and/or retraining, the machine learning models may be continuously refined to determine focus scores for any combination of users, activities, and environments, which may indicate a current level of focus for a particular combination. In addition, the machine learning models may be continuously refined to determine focus targets or thresholds, and difference targets or thresholds, for any combination of users, activities, and environments, in which a focus target or threshold may indicate a desired and/or minimum focus score for a combination, and in which a difference target or threshold may indicate a desired and/or maximum difference in focus scores between users of a combination. Moreover, the machine learning models may also be continuously refined to identify or select actions or outputs to be initiated via various output devices to affect focus scores for any combination of users, activities, and environments.

Figure 10A:
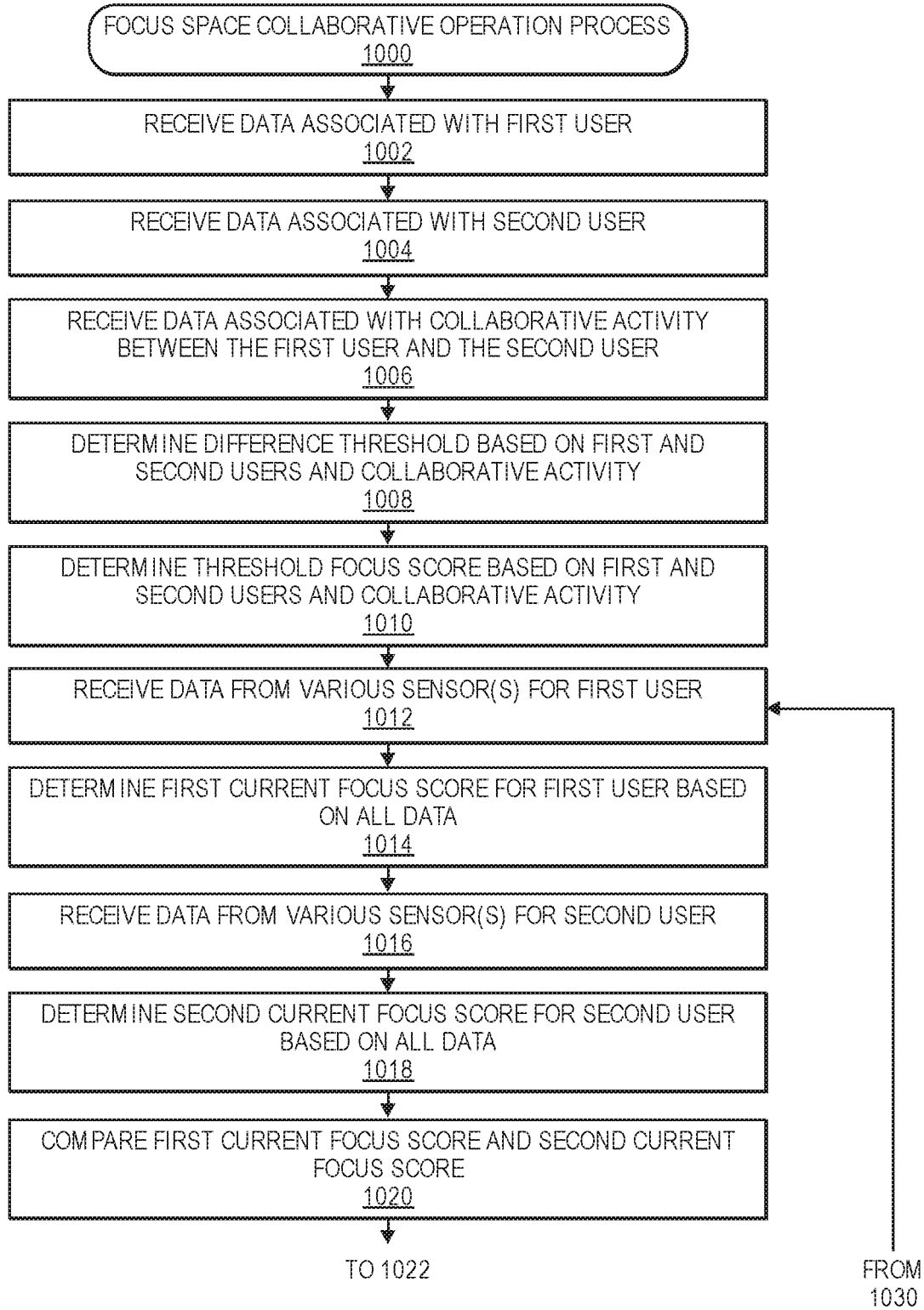
FIGS. 10A to 10B is a flow diagram illustrating an example focus space collaborative operation process, according to an implementation.
Figure 10B:
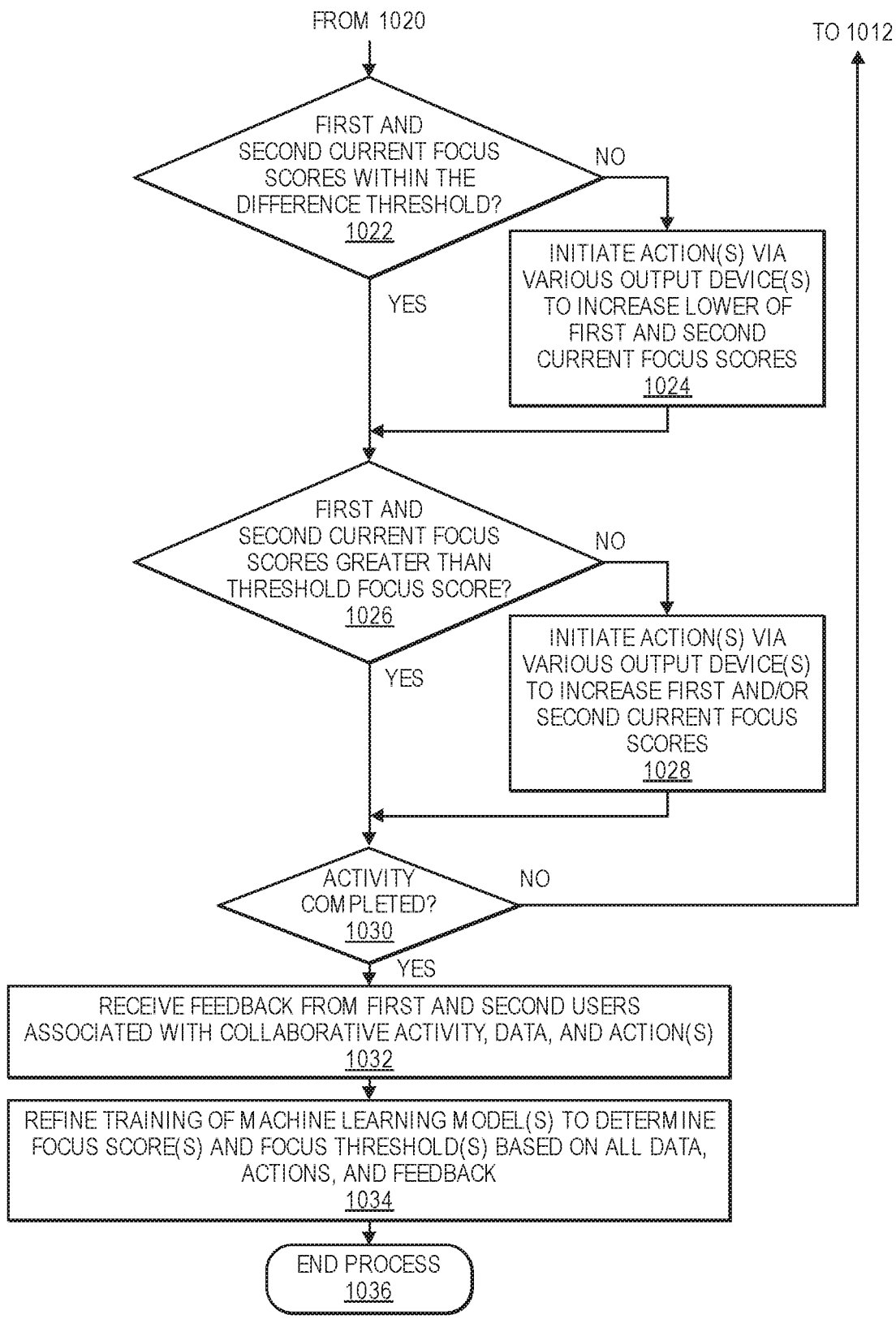

FIGS. 10A to 10B is a flow diagram illustrating an example focus space collaborative operation process 1000, according to an implementation.

The process 1000 may begin by receiving data associated with a first user, as at 1002, and receiving data associated with a second user, as at 1004. In example embodiments, each of the first and second users may be at different locations and may engage in a collaborative activity within different focus spaces that are in communication with each other. As described herein, the user data may relate to identities, schedules, user characteristics, user preferences, user habits, or other aspects of the users. For example, the users may be identified by the RFID or NFC sensors detecting RFID tags or NFC devices associated with the users. In other example embodiments, the users may be identified by facial recognition, fingerprint identification, voice recognition, or various other biometric identification methods. Then, other aspects related to the users may be determined based on stored associations between the identities of the users and their schedules, characteristics, preferences, habits, or other aspects. In still further example embodiments, some or all of the user data may be provided directly by the users.

The process 1000 may proceed by receiving data associated with a collaborative activity between the first user and the second user, as at 1006. In example embodiments, each of the first and second users may be at different locations and may engage in the collaborative activity within different focus spaces that are in communication with each other. As described herein, the activity data may relate to a type, purpose, goal, time, duration, number of participants, or other aspects of the activity. For example, the activity data may be identified based on schedules of the identified users. In other example embodiments, the activity data may be stored in association with the focus spaces, such that the processors may identify and retrieve the activity data from stored information associated with the current day, time, user, or other related information. In still further example embodiments, some or all of the activity data may be provided directly by the users.

The process 1000 may then continue to determine a difference threshold and a threshold focus score based on the first and second users and the collaborative activity, as at 1008 and 1010. As described herein, the user data and activity data may be provided as inputs to the trained machine learning models, and the trained machine learning models may determine a difference target or threshold and a target or threshold focus score associated with the first and second users and the collaborative activity. In addition, aspects of the environment may also be provided to the trained machine learning models as part of the determination of the difference target or threshold and the target or threshold focus score. Further, as described herein, the difference target or threshold may indicate a desired and/or maximum difference in focus scores between the first and second users, and the target or threshold focus score may indicate a desired and/or minimum focus score for each of the first and second users engaging in the collaborative activity.

The process 1000 may then proceed to receive data from various sensors for the first user, as at 1012. As described herein, the various sensors may be associated with a first focus space and may detect any of the various aspects of the first user, the collaborative activity, and/or environment during the collaborative activity within the first focus space. For example, the various sensors may include imaging or optical sensors, audio sensors, pressure or contact sensors, temperature sensors, pulse detection sensors, breath analysis sensors, environment sensors, RFID or NFC sensors, or any other sensors associated with portions or devices of the first focus space. Any and all detected aspects by the various sensors may be received and/or stored for processing by the machine learning models.

The process 1000 may then continue to determine a first current focus score for the first user based on all the data, as at 1014. As described herein, the user data, activity data, and detected aspects of the first and second users, the collaborative activity, and/or environment may be provided as inputs to the trained machine learning models, and the trained machine learning models may determine a first current focus score associated with the first user and collaborative activity. In addition, aspects of the environment may also be provided to the trained machine learning models as part of the determination of the first current focus score.

The process 1000 may then proceed to receive data from various sensors for the second user, as at 1016. As described herein, the various sensors may be associated with a second focus space and may detect any of the various aspects of the second user, the collaborative activity, and/or environment during the collaborative activity within the second focus space. For example, the various sensors may include imaging or optical sensors, audio sensors, pressure or contact sensors, temperature sensors, pulse detection sensors, breath analysis sensors, environment sensors, RFID or NFC sensors, or any other sensors associated with portions or devices of the second focus space. Any and all detected aspects by the various sensors may be received and/or stored for processing by the machine learning models.

The process 1000 may then continue to determine a second current focus score for the second user based on all the data, as at 1018. As described herein, the user data, activity data, and detected aspects of the first and second users, the collaborative activity, and/or environment may be provided as inputs to the trained machine learning models, and the trained machine learning models may determine a second current focus score associated with the second user and collaborative activity. In addition, aspects of the environment may also be provided to the trained machine learning models as part of the determination of the second current focus score.

The process 1000 may then compare the first current focus score and the second current focus score, as at 1020, and may determine whether the first and second current focus scores are within the difference threshold, as at 1022. As described herein, the difference target or threshold may indicate a desired and/or maximum difference in focus scores between the first and second users such that the current focus scores of each of the first user and the second user may be maintained at approximately desired levels relative to each other within a threshold variation or within the difference threshold of each other during the collaborative activity.

If it is determined that the first and second current focus scores are not within the difference threshold of each other, the process 1000 may proceed to initiate one or more actions or outputs via various output devices to increase the lower of the first and second current focus scores, as at 1024. In other embodiments, a difference between the first and second current focus scores may be determined, and if a variation between the difference and a difference target is greater than a threshold variation, one or more actions or outputs may be initiated to change or affect one or both of the first and second current focus scores and reduce the variation. As described herein, the user data, activity data, and detected aspects of the first and second users, the collaborative activity, and/or environment may be provided as inputs to the trained machine learning models, and the trained machine learning models may determine one or more actions or outputs via various output devices to increase the lower current focus score associated with the first or second user and the collaborative activity (or otherwise change one or both current focus scores to be within the difference threshold and/or to reduce the variation). For example, the various output devices may include visual output devices, audio output devices, actuators associated with portions or devices of the first or second focus space, temperature or environment control devices, olfactory output devices, focus or collaboration devices, user devices, or any other output devices associated with portions or devices of the first or second focus space. Any and all actions or outputs initiated by the various output devices may be received and/or stored for processing by the machine learning models.

The process 1000 may then proceed, from steps 1022 and 1024, to determine whether the first and second current focus scores are greater than the threshold focus score, as at 1026. If it is determined that one or both of the first and second current focus scores is not greater than the threshold focus score, the process 1000 may proceed to initiate one or more actions or outputs via various output devices to increase the first and/or second current focus scores, as at 1028. In other embodiments, the first and second current focus scores may be compared with the target focus score to determine variations, and if one or more variations are greater than a threshold variation, one or more actions or outputs may be initiated to change or affect one or both of the first and second current focus scores and reduce the variations. As described herein, the user data, activity data, and detected aspects of the first and second users, the collaborative activity, and/or environment may be provided as inputs to the trained machine learning models, and the trained machine learning models may determine one or more actions or outputs via various output devices to change one or both of the first and second current focus scores associated with the first and second users and the collaborative activity. For example, the various output devices may include visual output devices, audio output devices, actuators associated with portions or devices of the first and/or second focus space, temperature or environment control devices, olfactory output devices, focus or collaboration devices, user devices, or any other output devices associated with portions or devices of the first and/or second focus space. Any and all actions or outputs initiated by the various output devices may be received and/or stored for processing by the machine learning models.

The process 1000 may then proceed, from steps 1026 and 1028, to determine whether the activity is completed, as at 1030. If it is determined that the activity is not yet completed, then the process 1000 may return to step 1012 and continue to receive data from various sensors for the first user. From step 1012, the process 1000 may repeat, as described herein, to determine a first current focus score for the first user based on all data, as at 1014, to receive data from various sensors for the second user, as at 1016, to determine a second current focus score for the second user based on all data, as at 1018, to compare the first and second current focus scores, as at 1020, to determine whether the first and second current focus scores are within the difference threshold (or within a threshold variation of the difference target), as at 1022, if not, to initiate one or more actions or outputs via various output devices to increase the lower of the first and second current focus scores (or otherwise change one or both current focus scores to be within the difference threshold and/or to reduce the variation), as at 1024, to determine whether the first and second current focus scores are greater than the threshold focus score (or within a threshold variation of the target focus score), as at 1026, and if not, to initiate one or more actions or outputs via various output devices to change one or both of the first and/or second current focus scores, as at 1028.

If, however, it is determined at step 1030 that the activity is completed, the process 1000 may proceed to receive feedback from the first and second users associated with the collaborative activity, all data, and any actions, as at 1032. As described herein, during or upon completion of the collaborative activity, the first and second users may provide feedback such as ratings, rankings, comments, or other types of feedback related to the first or second user, the collaborative activity, detected aspects, initiated actions, or combinations thereof. The feedback may include explicit indicators of levels of focus of the first or second user during the collaborative activity, and/or the feedback may be processed to identify one or more indicators of levels of focus. Any and all feedback from users may be received and/or stored for processing by the machine learning models.

Then, the process 1000 may proceed to refine the training of the machine learning models to determine focus scores and focus targets or thresholds based on all data, actions, and feedback, as at 1034. As described herein, the training of the machine learning models may be continuously refined to identify, individually and/or in various combinations, aspects of user data, aspects of activity data, detected aspects by various sensors of first or second users, collaborative activities, and environments, initiated actions or outputs via various output devices, and/or feedback from users to determine focus scores and focus targets or thresholds, as well as difference targets or thresholds for collaborative activities, for particular users, particular activities, particular environments, and combinations thereof. The process 1000 may then end, as at 1036.

By such refinement of training and/or retraining, the machine learning models may be continuously refined to determine focus scores for any combination of users, activities, and environments, which may indicate a current level of focus for a particular combination. In addition, the machine learning models may be continuously refined to determine focus targets or thresholds, and difference targets or thresholds, for any combination of users, activities, and environments, in which a focus target or threshold may indicate a desired and/or minimum focus score for a combination, and in which a difference target or threshold may indicate a desired and/or maximum difference in focus scores between users of a combination. Moreover, the machine learning models may also be continuously refined to identify or select actions or outputs to be initiated via various output devices to affect focus scores for any combination of users, activities, and environments.

Figure 11:
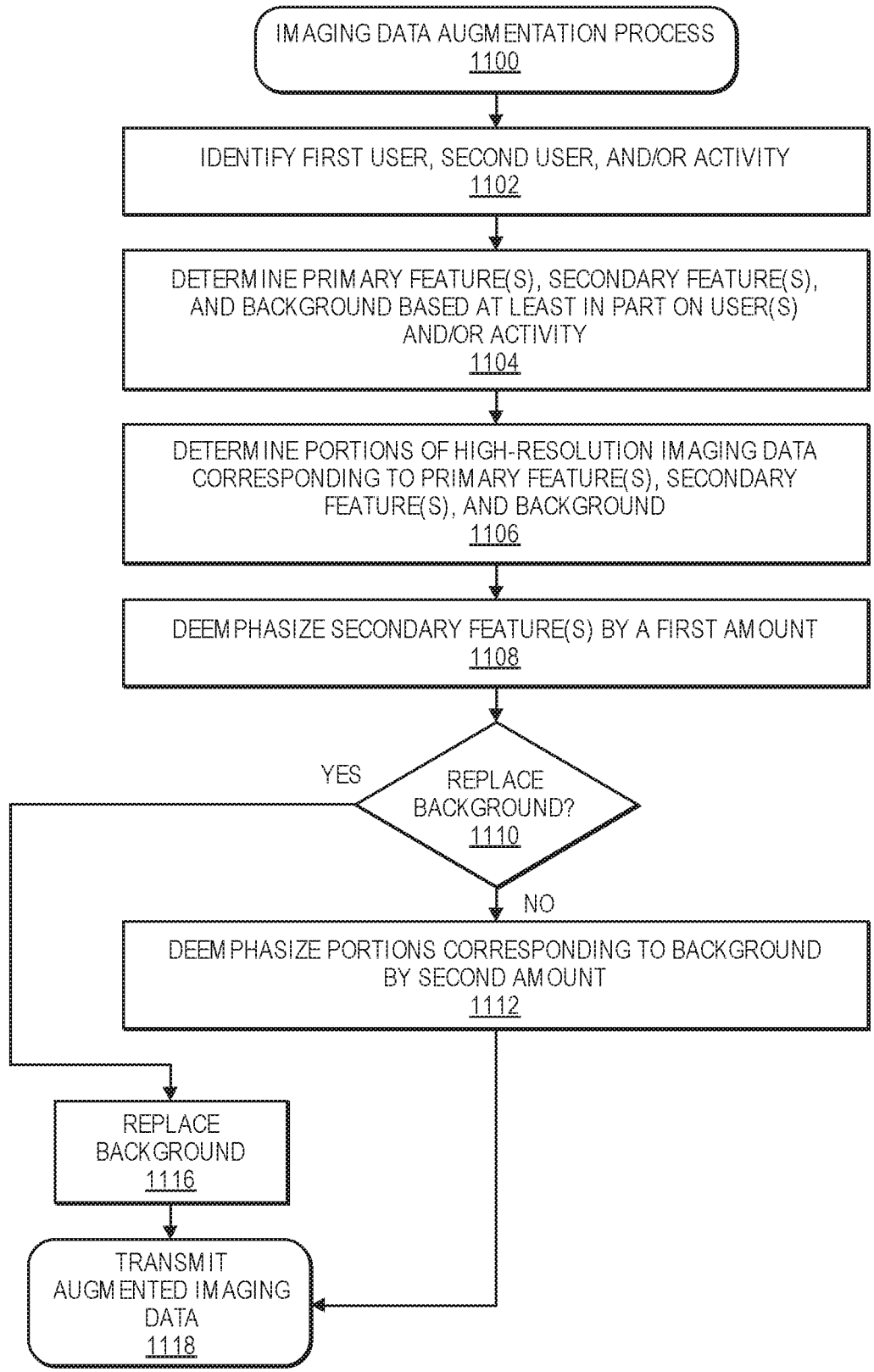
FIG. 11 is a flow diagram illustrating an example imaging data augmentation process, according to an implementation.

FIG. 11 is a flow diagram illustrating an example imaging data augmentation process 1100, according to an implementation. In this example, the example process is discussed with respect to augmenting imaging data of a first user at a first focus space. However, it will be appreciated that the example process 1100 may be performed at each focus space and utilized to augment imaging data at each focus space prior to or during transmission of that imaging data.

The example process 1100 may begin by determining an identity of a first user in a first focus space, determining an identity of a second user in a second focus space, and/or determining an identity of an activity to be performed by the first user or the second user while located in the focus space, as at 1102. As discussed above, any of various techniques may be utilized to determine the identity of the users and/or the activity. For example, image processing using facial and/or feature recognition may be used, biometrics, RFID, NFC, etc., may be used to identify the user(s). Likewise, activities may be scheduled for the users and/or the focus spaces, the user(s) may identify the activity, the activity may be determined based on the actions of the users, etc.

The example process 1100 then proceeds to determine one or more primary features of the first user at the first focus space, one or more secondary features of the first user at the first focus space, and/or a background at the first focus space, as at 1104. Primary features may be specified by a user, based on the activity, and/or otherwise determined. For example, a user may provide preference information indicating primary features and/or secondary features that are to be detected in the imaging data. For example, the first user may specify that the face and/or head region of the first user is a primary feature, the body region of the first user is a secondary feature, and the remainder of the imaging data is background. In another example, the activity may be used to specify the primary features and/or secondary features that are to be determined. For example, if the activity is a business meeting, the primary features may be specified as the face of the user, the secondary features specified as the body of the user and any documents or papers detected in the focus space, and the remainder of the imaging data as background.

The example process 1100 then proceeds to determine portions of the generated high-resolution imaging data corresponding to the primary feature(s), secondary feature(s), and background, as at 1106. For example, the image recognition algorithms may process high-resolution imaging data, depth data, etc., generated by the sensors/cameras to determine the position of the primary features, secondary features, and/or background represented in the imaging data. Position detection may be done on a frame-by-frame basis in the imaging data to detect movement of the user and thus corresponding movement of the primary features and/or secondary features.

Based on the determined positions, the position or portions of the imaging data corresponding to the secondary feature(s) represented in the imaging data is deemphasized a first amount, as at 1108. Deemphasizing by the first amount may be done using a light blurring filter and/or any other pixelation technique that softens or blurs the image data. The first amount may be a specified user preference, a defined amount, determined based on the color or tone of the secondary features, based on the activity, etc. As discussed above, the deemphasizing of the secondary features is performed to reduce or eliminate potential distractions present in the secondary features. In addition, if the secondary feature includes information that is not to be shared (e.g., documents), the deemphasizing obscures the information such that it cannot be discerned from the augmented imaging data.

A determination may also be made as to whether the background portion of the imaging data is to be replaced, as at 1110. In some implementations, the background portion of the imaging data may be removed and not included in the augmented imaging data that is transmitted to the other focus space. By removing the portion of the imaging data corresponding to the background, the size of the augmented imaging data that is transmitted is reduced.

The removed background may then be replaced with a baseline background and/or a background that matches or corresponds to the second focus space at which the augmented imaging data is to be presented, as at 1116. The background may be replaced at the first focus location and included in the augmented imaging data, replaced at a remote location and added to the augmented imaging data, or added to the augmented imaging data at the second focus location.

If it is determined at decision block 1110 that the background is not to be replaced, the background portions of the imaging data are deemphasized by a second amount, as at 1112. The second amount of deemphasis, may be the same or different than the first amount. Like the first amount of deemphasis one or more light blurring filters and/or other pixelation techniques may be utilized to blur or soften the background to reduce or eliminate any potential distractions present therein.

Finally, after replacing or deemphasizing the background, augmented imaging data is formed in which the primary features are not altered, and all other portions of the imaging data are deemphasized. The augmented imaging data is transmitted from the first focus location to the second focus location, as in 1118. As discussed above, the augmented imaging data may, in addition to deemphasizing certain portions of the imaging data, have a reduced size, thereby reducing the amount of transmitted data and the amount of bandwidth necessary to transmit the data. When the augmented imaging data is received at the second focus location, it may be displayed on a display device at the second focus location as part of mutual presence.

Figure 12:
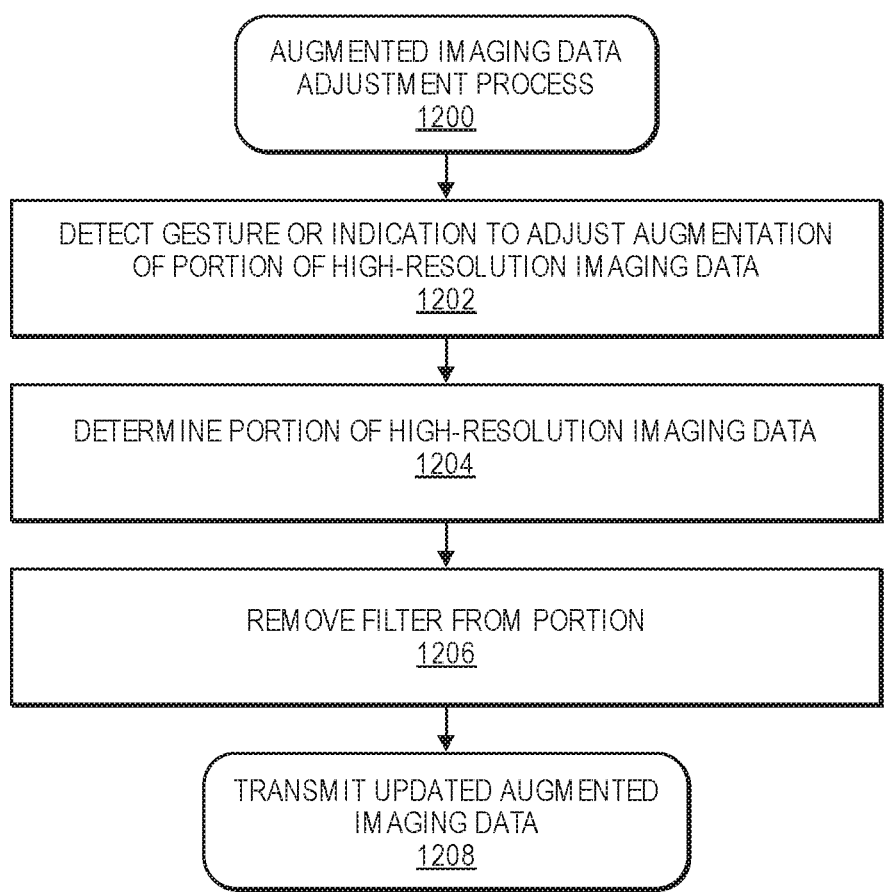
FIG. 12 is a flow diagram illustrating an example augmented imaging data adjustment process, according to an implementation.

FIG. 12 is a flow diagram illustrating an example augmented imaging data adjustment process 1200, according to an implementation. The example process 1200 may be performed at any time during an activity to adjust which portions of the imaging data are augmented.

The example process 1200 may begin by detecting a gesture or other indication to adjust augmentation of a portion of the augmented imaging data, as at 1202. Gestures may be detected by the image recognition algorithms and may include, for example, one or more specifically defined hand gestures, head gestures, body gestures, etc. For example, a hand gesture may include a user placing both hands in a position to form a bounding area for which augmentation of the corresponding imaging data is to be enabled or disabled. As one example, if a first user desires to disable augmentation of imaging data for a whiteboard that is in the focus space, the user may place a first hand in a lower left corner of the whiteboard with their thumb and index forming an L shape around the lower left corner of the whiteboard and place a second hand in an upper right corner of the whiteboard with their thumb and index finger forming an L shape around the upper right corner of the whiteboard. This defined gesture may indicate that augmentation that deemphasizes the area within the bounding box formed by the user's two hands is to be removed.

As another example, one or more predefined actuators (e.g., mechanical buttons, electrical buttons, electro-mechanical buttons) may be selectable to enable/disable augmentation of different portions of the imaging data. For example, a mechanical button positioned off toward the side of the chair in the focus space may be associated with a whiteboard that is in the focus space. Activation of the button is a defined gesture corresponding to the whiteboard.

Returning to FIG. 12, the example process 1200 may continue by determining a high resolution portion of the imaging data corresponding to the gesture or indication, as at 1204. For example, referring again to the whiteboard examples, the portion of the video data between the user's hands when making a gesture may be determined as corresponding to the gesture. Likewise, in the example of a user activating a button corresponding to a whiteboard, again the position of the whiteboard, as represented in the imaging data, is determined.

Upon determination of the portion of the imaging data corresponding to the gesture, the filter applied to that portion of the imaging data to produce the augmented imaging data is removed so that the determined portion is no longer deemphasized to produce updated augmented imaging data, as at 1206. The updated augmented imaging data includes imaging data that is unaltered for the primary feature(s) and the portion of the imaging data indicated by gesture, and imaging data for other portions that are deemphasized. Finally, the updated augmented imaging data is transmitted from the first focus location to a second focus location, as at 1208.

Figure 13:
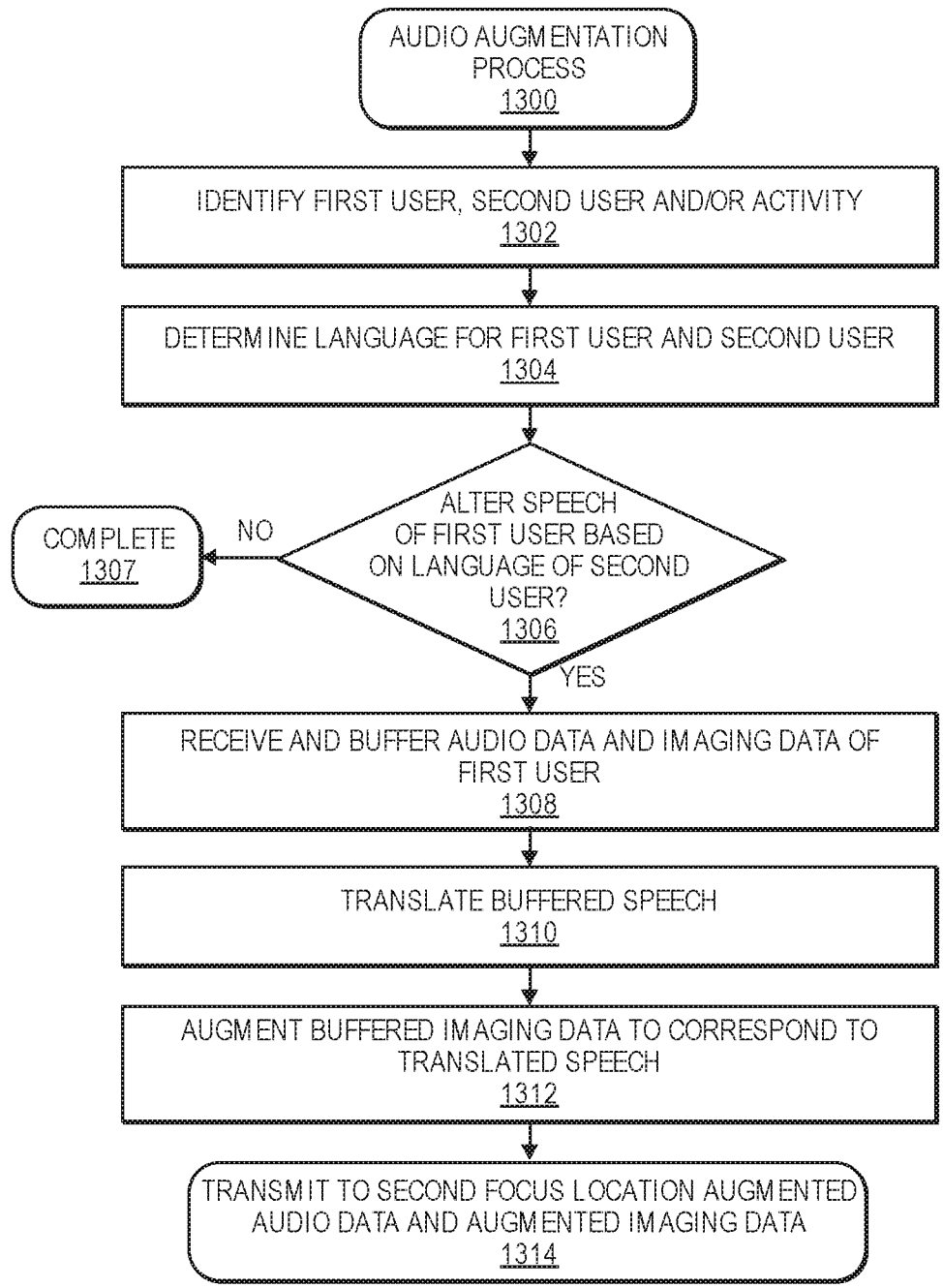
FIG. 13 is a flow diagram illustrating an example audio augmentation process, according to an implementation.

FIG. 13 is a flow diagram illustrating an example audio augmentation process 1300, according to an implementation. In this example, the example process 1300 is discussed with respect to augmenting audio data of a first user at a first focus space. However, it will be appreciated that the example process 1300 may be performed at each focus space and utilized to augment audio data at each focus space prior to or during transmission of that audio data.

The example process 1300 may begin by determining an identity of a first user at a first focus location, determining an identity of a second user at a second focus location, and/or determining an activity to be performed by the first user and/or the second user, as at 1302. As discussed above, any of various techniques may be utilized to determine the identity of the users and/or the activity. For example, image processing using facial and/or feature recognition may be used, biometrics, RFID, NFC, etc., may be used to identify the user(s). Likewise, activities may be scheduled for the users and/or focus space, the user(s) may identify the activity, or the activity may be determined based on the actions of the users.

The example process 1300 may then determine a language(s) that is spoken by the first user and a language(s) that is understood by the second user, as at 1304. For example, user profiles may be maintained for users that identify the language or languages that are spoken or understood by those users. Such information may be provided by the user directly or determined from prior uses of a focus space by the user. In other examples, the language spoken by the first user may be determined by listening to speech of the first user and determining a language of that speech. Likewise, the language understood by the second user may be determined based on input provided by the user, the user profile, and/or based on a language spoken by the second user.

Based on the determined language(s) spoken by the first user and the language(s) understood by the second user, a determination is made as to whether the speech output of the first user is to be altered through translation to a different language that is understood by the second user, as at 1306. It may be determined that the speech of the first user is to be altered if the second user does not understand the language of the first user.

If it is determined that the speech of the first user does not need to be altered through translation, the example process 1300 completes, as at 1307. However, if it is determined that speech from the first user is to be augmented by translation, the audio that includes the speech and the corresponding imaging data of the first user is received and buffered in memory, as at 1308. The speech recognition algorithms discussed above may then process the audio data to determine the speech and the content of the speech. The content of the buffered speech is then translated into a language that is understandable by the second user, as at 1310. As discussed above, the speech may be buffered in time segments or blocks. The speech recognition engine can then process the blocks of speech to determine both content and context of the speech so that translation is accurate. Any of a variety of machine translation engines may be used to translate the speech from a first language of the first user to a second language that is understood by the second user.

The example process 1300 may then augment the buffered imaging data using CGI to modify the movement of the first user's mouth so that the movement of the mouth as represented in the imaging data corresponds with the augmented audio data that includes the translated speech, as at 1312. For example, stored mouth positions for different words, sounds or phrases in the destination language used for the translated speech may be generated as mouth positions in the augmented imaging data so that the imaging data of the first user corresponds to the output translated speech.

Finally, the augmented audio data that includes the translated speech and the augmented imaging data are synchronized and transmitted from the first focus space to the second focus space for presentation to the second user, as at 1314.

While the above discussion with respect to FIG. 13 describes augmenting audio data to include translated speech being done at the first focus space, the implementations corresponding to the example process 800 may be equally done at the second focus space. For example, the imaging data and audio data may be transmitted from the first focus space to the second focus space and the speech included in the received audio data may be translated at the second location prior to output to the second user. Likewise, the received imaging data may also be augmented at the second location to correspond with the augmented audio data.

Referring again to FIG. 2, the schematic block diagram may be illustrative of one or more aspects of the example system architecture 200 that may be used to implement the various systems and processes discussed above. In the illustrated implementation, the example system architecture 200 includes one or more processors 160, one or more remote processors 260, one or more memories 220 including various data items 222, 223, 224, 225, 226, one or more processing algorithms or models including image recognition algorithms 230, speech recognition algorithms 240, and machine learning models 250, and various sensors, data, and output devices, as described herein.

The example system architecture 200 may be included as part of a computing device or system, a networked computing device or system, other input/output devices or systems, and/or other computing systems, or combinations thereof. In various implementations, the example system architecture 200 may be a uniprocessor system including one processor 160, or a multiprocessor system including several processors 160 (e.g., two, four, eight, or another suitable number). The processor(s) 160 may be any suitable processor capable of executing the processes, methods, operations, and functionality described herein, including but not limited to GPUs, CPUs, or combinations thereof. For example, in various implementations, the processor(s) 160 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 160 may commonly, but not necessarily, implement the same ISA.

The one or more memories 220 may be configured to store mutual presence data 222, focus scores 223, user customization data 224, focus targets or thresholds 225, other data 226, and/or other data items accessible by the processor(s) 160. In various implementations, the memories 220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the memories 220 as program instructions, data, and other information or data items. In other implementations, program instructions, data, and/or other information or data may be received, sent or stored upon different types of computer-accessible media, such as non-transitory, computer readable storage media, or on similar media separate from the memories 220 or the example system architecture 200.

Generally speaking, a non-transitory, computer readable storage medium may include storage media or memory media such as magnetic or optical media, e.g., disk or CD/DVD-ROM, coupled to the example system architecture 200 via an I/O interface. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via a network interface.

In one implementation, an I/O interface may be configured to coordinate I/O traffic between the processor(s) 160, the memories 220, any peripheral devices, such as various sensors and/or input/output devices, and a network interface or other peripheral interfaces. In some implementations, the I/O interface may perform any necessary protocol, timing or other data transformations to convert data signals from one component (e.g., memories 220) into a format suitable for use by another component (e.g., processor(s) 160). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the memories 220, may be incorporated directly into the processor(s) 160.

A network interface may be configured to allow data to be exchanged between the example system architecture 200, other devices attached to a network, such as other computer devices or systems, other input/output elements, and/or other computing resources such as remote processors 260. For example, the network interface may enable wireless communication between the example system architecture 200 and one or more other system architectures associated with other focus spaces or other computing devices or systems of other focus spaces. In various implementations, the network interface may support communication via wireless general data networks, such as a Wi-Fi network. For example, the network interface may support communication via telecommunications networks such as cellular communication networks, satellite networks, the Internet, and the like.

Various sensors and/or input/output devices, as described herein, may, in some implementations, include one or more visual input/output devices, audio input/output devices, pressure or contact sensors, temperature sensors, pulse detection sensors, breath analysis sensors, environment sensors, RFID or NFC sensors, actuators associated with portions or devices of focus spaces, temperature or environment control devices, olfactory output devices, focus or collaboration devices, user devices, other input/output devices such as touchscreens, keyboards, mice, or other controllers, or other sensors, actuators, or input/output devices. Multiple sensors, actuators, and/or input/output devices may be present and controlled by the example system architecture 200.

As shown in FIG. 2, the memory may include program instructions which may be configured to implement the example processes, methods, operations, and functionality described above. The data storage and other information and data may include various data stores for maintaining data items that may be provided for receiving, storing, and/or processing user data, activity data, detected aspects by sensors of users, activities, and environments, actions or outputs initiated via output devices, user feedback, focus scores, focus targets or thresholds, difference targets or thresholds, variations from targets or thresholds, threshold variations, data related to creating mutual presence and/or mutual eye gaze, data related to customizing focus spaces, and any other functions, operations, or processes described herein.

In various implementations, the information or data described herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the processes. Additionally, one or more of the operations may be considered optional and/or not utilized with other operations.

Those skilled in the art will appreciate that the example system architecture 200 is merely illustrative and is not intended to limit the scope of the present disclosure. In particular, the example system architecture may include any combination of hardware or software that can perform the indicated functions, including computers, network devices, internet appliances, PDAs, wireless phones, pagers, etc. The example system architecture 200 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the example system architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the example system architecture 200 may be transmitted to the example system architecture 200 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other example system architecture configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed, and various elements may be added, reordered, combined, omitted, modified, etc., in other implementations.

Implementations described herein may include a computer-implemented method to affect focus, comprising receiving data associated with a first user in a first focus space; receiving data associated with a second user in a second focus space; receiving data associated with an activity between the first user and the second user; determining a difference target based at least in part on the first user, the second user, and the activity; receiving data related to the first user from a first plurality of sensors associated with the first focus space; determining a first focus score for the first user based at least in part on the data from the first plurality of sensors; receiving data related to the second user from a second plurality of sensors associated with the second focus space; determining a second focus score for the second user based at least in part on the data from the second plurality of sensors; determining a difference between the first focus score and the second focus score; determining a variation between the difference and the difference target; and initiating at least one action via at least one of a plurality of output devices associated with one of the first focus space or the second focus space based at least in part on the variation.

Optionally, the computer-implemented method may further comprise subsequent to initiating the at least one action, determining a second difference between the first focus score and the second focus score; and determining a second variation between the second difference and the difference target; and stopping the at least one action via the at least one of the plurality of output devices based at least in part on the second variation.

Optionally, the computer-implemented method may further comprise determining a target focus score based at least in part on the first user, the second user, and the activity; determining a first variation between the first focus score and the target focus score; and initiating at least one first action via at least one of a first plurality of output devices associated with the first focus space based at least in part on the first variation.

Implementations described herein may include a computer-implemented method, comprising receiving data associated with a user; receiving data associated with an activity of the user; receiving data related to the user from at least one of a plurality of sensors; determining a focus score for the user based at least in part on the data from the at least one of the plurality of sensors; and initiating at least one action via at least one of a plurality of output devices based at least in part on the focus score.

Optionally, the data associated with the user may comprise at least one of an identity, a schedule, a user characteristic, a user preference, or a user habit.

Optionally, the data associated with the activity may comprise at least one of a type, a purpose, a goal, a time, a duration, or a number of participants.

Optionally, the focus score for the user may be determined based at least in part on at least one machine learning model trained with data from the at least one of the plurality of sensors.

Optionally, the computer-implemented method may further comprise determining a target focus score based at least in part on the user and the activity; wherein the target focus score may be determined based at least in part on at least one machine learning model trained with data associated with at least one of the user or the activity.

Optionally, the computer-implemented method may further comprise determining a variation between the focus score and the target focus score; and selecting the at least one action to be initiated via the at least one of the plurality of output devices based at least in part on at least one machine learning model trained with data associated with actions initiated via the at least one of the plurality of output devices; and wherein the at least one action may be initiated further based at least in part on the variation.

Optionally, the at least one of the plurality of sensors may comprise at least one of an imaging sensor, an audio sensor, a pressure sensor, a temperature sensor, a pulse detection sensor, a breath analysis sensor, an environment sensor, or an RFID sensor.

Optionally, the data related to the user from the at least one of the plurality of sensors may comprise at least one of a body position of the user, a hand movement of the user, a facial expression of the user, an eye movement of the user, a breathing pattern of the user, a pulse of the user, a body temperature of the user, or a breath composition of the user.

Optionally, the data related to the user from the at least one of the plurality of sensors may comprise at least one of speed, cadence, tone, tenor, timbre, pitch, volume, inflection, choice of language or words, or content associated with speech of the user.

Optionally, the at least one of the plurality of sensors may be comprised in at least one of a chair, a table, a controller, a floor, a wall, a collaboration device, or a user device.

Optionally, the at least one of the plurality of output devices may comprise at least one of a visual output device, an audio output device, an actuator, a temperature or environment control device, an olfactory output device, a collaboration device, or a user device.

Optionally, the at least one action initiated via the at least one of the plurality of output devices may comprise at least one of visual output via a display, light output via an illumination element, audio output via a speaker, environment output via a temperature or environment control device, olfactory output via an olfactory output device, haptic output via an actuator, or information output via a collaboration device or a user device.

Implementations described herein may include a system to affect focus, comprising a plurality of sensors; a plurality of output devices; and a processor in communication with the plurality of sensors, the plurality of output devices, and a memory, the processor configured to at least: receive data associated with a user; receive data associated with an activity of the user; determine a target focus score based at least in part on the user and the activity; receive data related to the user from at least one of the plurality of sensors; determine a focus score for the user based at least in part on the data from the at least one of the plurality of sensors; determine a variation between the focus score and the target focus score; and initiate at least one action via at least one of the plurality of output devices based at least in part on the variation.

Optionally, the plurality of sensors may comprise at least one of an imaging sensor, an audio sensor, a pressure sensor, a temperature sensor, a pulse detection sensor, a breath analysis sensor, an environment sensor, or an RFID sensor.

Optionally, the at least one of the plurality of sensors may be comprised in at least one of a chair, a table, a controller, a floor, a wall, a collaboration device, or a user device.

Optionally, the plurality of output devices may comprise at least one of a visual output device, an audio output device, an actuator, a temperature or environment control device, an olfactory output device, a collaboration device, or a user device.

Optionally, at least one of the target focus score, the focus score, or the at least one action may be determined based at least in part on at least one machine learning model trained with data associated with at least one of the user, the activity, the at least one of the plurality of sensors, or the at least one of the plurality of output devices.

Implementations described herein may include an apparatus to promote focus, comprising a focus space enclosed by a plurality of walls, a floor, and a ceiling; at least one illumination element associated with the focus space; at least one sensor configured to detect at least one aspect of the focus space; at least one output device configured to adjust at least one aspect of the focus space; a display device; an imaging device; and a partially reflective, partially transmissive surface disposed at an angle with respect to the display device and the imaging device; wherein the display device and the partially reflective, partially transmissive surface are configured to display an image of a second user for viewing by a first user within the focus space; wherein the imaging device and the partially reflective, partially transmissive surface are configured to capture an image of the first user within the focus space for viewing by the second user; and a processor in communication with the at least one sensor and the at least one output device, the processor configured to at least: detect, via the at least one sensor, an identity of the first user within the focus space; and adjust, via the at least one output device, at least one aspect associated with the first user or an environment of the focus space based at least in part on the identity of the first user.

Optionally, at least one of the plurality of walls, the floor, or the ceiling may be comprised of a dark, sound-dampening material.

Optionally, the at least one illumination element may be configured to illuminate the first user of the focus space with portrait lighting.

Optionally, the at least one sensor may comprise at least one of an imaging sensor, an audio sensor, a pressure sensor, a temperature sensor, an environment sensor, or an RFID sensor; and wherein the at least one output device comprises at least one of a visual output device, an audio output device, an actuator or device associated with the focus space, a temperature or environment control device, an olfactory output device, a collaboration device, or a user device.

Implementations described herein may include an apparatus, comprising a focus space enclosed by a plurality of walls, a floor, and a ceiling; at least one sensor configured to detect at least one aspect of the focus space; at least one output device configured to adjust at least one aspect of the focus space; and a processor in communication with the at least one sensor and the at least one output device, the processor configured to at least: detect, via the at least one sensor, an identity of a user of the focus space; and adjust, via the at least one output device, at least one aspect associated with the user of the focus space, an activity within the focus space, or an environment within the focus space based at least in part on the identity of the user.

Optionally, the at least one sensor may comprise at least one of an imaging sensor, an audio sensor, a contact sensor, an RFID sensor, or an NFC sensor; and wherein the identity of the user of the focus space may be detected based at least in part on at least one of facial recognition, voice recognition, fingerprint identification, or an RFID tag or an NFC device associated with the user.

Optionally, the processor may be further configured to at least: determine at least one of a preference, characteristic, or habit associated with the user of the focus space based at least in part on the identity of the user; and wherein the adjusted at least one aspect may be adjusted based at least in part on the at least one of the preference, characteristic, or habit associated with the user.

Optionally, the processor may be further configured to at least: detect, via the at least one sensor, at least one aspect associated with the environment within the focus space; wherein the at least one sensor comprises at least one of a temperature sensor or an environment sensor; and wherein the detected at least one aspect associated with the environment comprises at least one of a temperature or an environment characteristic of the environment within the focus space.

Optionally, the processor may be further configured to at least: determine at least one aspect associated with the activity within the focus space based at least in part on at least one of the identity of the user of the focus space, or a calendar of activities associated with the focus space.

Optionally, the apparatus may further comprise a chair within the focus space; and a table within the focus space; wherein the at least one output device comprises an actuator associated with at least one of the chair or the table within the focus space; and wherein the adjusted at least one aspect comprises at least one of a seat height, a seat angle, a seat position, a table height, a table angle, or a table position.

Optionally, the at least one output device may comprise at least one of an environment control device or an olfactory output device; and wherein the adjusted at least one aspect comprises at least one of temperature, humidity, pressure, air quality, air composition, or scent of the environment within the focus space.

Optionally, the at least one output device may comprise an illumination element within the focus space; and wherein the adjusted at least one aspect comprises at least one of brightness, intensity, focus, color, filter, illumination direction, or illumination frequency of light emitted by the illumination element within the focus space.

Optionally, the at least one output device may comprise a visual output device within the focus space; and wherein the adjusted at least one aspect comprises at least one of brightness, contrast, focus, zoom, resolution, color, saturation, background, filter, or content of an image displayed by the visual output device within the focus space.

Optionally, the at least one output device may comprise an audio output device within the focus space; and wherein the adjusted at least one aspect comprises at least one of speed, cadence, tone, tenor, timbre, pitch, volume, inflection, or content of audio output by the audio output device within the focus space.

Optionally, the apparatus may further comprise a display device; an imaging device; and a filter device; and wherein the display device and the filter device may be configured to display an image of a second user for viewing by the user within the focus space; and wherein the imaging device and the filter device may be configured to capture an image of the user within the focus space for viewing by the second user.

Optionally, at least one of the plurality of walls or the ceiling may be extendible or retractable to create the focus space.

Implementations described herein may include a system, comprising a first focus space comprising a first plurality of walls, a first floor, and a first ceiling; and at least one first sensor and at least one first output device associated with the first focus space; and a second focus space comprising a second plurality of walls, a second floor, and a second ceiling; and at least one second sensor and at least one second output device associated with the second focus space; and a processor in communication with the first focus space and the second focus space, the processor configured to at least: receive, via the at least one first sensor, first video data and first audio data associated with a first user of the first focus space; detect a first identity of the first user based at least in part on at least one of the first video data or the first audio data; receive, via the at least one second sensor, second video data and second audio data associated with a second user of the second focus space; detect a second identity of the second user based at least in part on at least one of the second video data or the second audio data; adjust, via the at least one first output device, at least one aspect of at least one of the second video data or the second audio data presented to the first user based at least in part on the first identity of the first user; and adjust, via the at least one second output device, at least one aspect of at least one of the first video data or the first audio data presented to the second user based at least in part on the second identity of the second user.

Optionally, the at least one first output device may comprise a first display device within the first focus space; wherein the at least one second output device comprises a second display device within the second focus space; wherein the adjusted at least one aspect of the second video data presented to the first user comprises at least one of brightness, contrast, focus, zoom, resolution, color, saturation, background, filter, or content of the second video data displayed by the at least one first display device within the first focus space; and wherein the adjusted at least one aspect of the first video data presented to the second user comprises at least one of brightness, contrast, focus, zoom, resolution, color, saturation, background, filter, or content of the first video data displayed by the at least one second display device within the second focus space.

Optionally, the system may further comprise a first imaging device and a first filter device associated with the first focus space; and a second imaging device and a second filter device associated with the second focus space; and wherein the first imaging device and the first filter device may be configured to capture the first video data within the first focus space for display via the second display device; wherein the second imaging device and the second filter device may be configured to capture the second video data within the second focus space for display via the first display device; wherein the first display device and the first filter device may be configured to display the second video data for viewing by the first user within the first focus space; and wherein the second display device and the second filter device may be configured to display the first video data for viewing by the second user within the second focus space.

Optionally, the system may further comprise at least one of a first chair or a first table within the first focus space; and at least one of a second chair or a second table within the second focus space; wherein the at least one first output device comprises a first actuator associated with at least one of the first chair or the first table; wherein the at least one second output device comprises a second actuator associated with at least one of the second chair or the second table; wherein the processor may be further configured to at least: adjust, via the first actuator, at least one aspect of the at least one of the first chair or the first table based at least in part on the first identity of the first user; and adjust, via the second actuator, at least one aspect of the at least one of the second chair or the second table based at least in part on the second identity of the second user.

Implementations described herein may include an apparatus to promote focus, comprising a focus space enclosed by a plurality of walls, a floor, and a ceiling; at least one illumination element associated with the focus space; a display device; an imaging device; and a partially reflective, partially transmissive surface disposed at an angle with respect to the display device and the imaging device; wherein the imaging device and the partially reflective, partially transmissive surface are configured to capture an image of a first user within the focus space; wherein the display device and the partially reflective, partially transmissive surface are configured to display, for viewing by the first user, an image of a second user located outside the focus space; and a processor in communication with at least one of the display device, the imaging device, or the partially reflective, partially transmissive surface, the processor configured to at least: process imaging data associated with at least one of the first user or the second user; and adjust at least one aspect of the at least one of the display device, the imaging device, or the partially reflective, partially transmissive surface to create mutual eye gaze between the first user and the second user based at least in part on the imaging data.

Optionally, at least one of the plurality of walls, the floor, or the ceiling may be comprised of a dark, sound-dampening material.

Optionally, the processor may be further configured to at least: adjust at least one of a position or an orientation of at least one of the imaging device or the partially reflective, partially transmissive surface based at least in part on the imaging data to create mutual eye gaze between the first user and the second user.

Optionally, the processor may be further configured to at least adjust at least one of a background or a display characteristic of the display device based at least in part on the imaging data to create at least one of mutual eye gaze or mutual presence between the first user and the second user.

Implementations described herein may include an apparatus, comprising a display device; an imaging device; and a filter device; wherein the imaging device and the filter device are configured to capture an image of a first user in proximity to the apparatus; wherein the display device and the filter device are configured to display, for viewing by the first user, an image of a second user remote from the apparatus; and a processor in communication with at least one of the display device, the imaging device, or the filter device, the processor configured to at least: process imaging data associated with at least one of the first user or the second user; and adjust at least one aspect of the at least one of the display device, the imaging device, or the filter device to create mutual eye gaze between the first user and the second user based at least in part on the imaging data.

Optionally, the imaging data may comprise at least one of optical imaging data, depth imaging data, or infrared imaging data.

Optionally, the imaging device may comprise an imaging sensor, and the apparatus may further comprise at least one adjustment system associated with the imaging device; wherein the processor may be further configured to at least: process depth imaging data associated with at least one of the first user or the second user; and adjust, via the at least one adjustment system, at least one of a position or an orientation of the imaging device to create mutual eye gaze between the first user and the second user based at least in part on the depth imaging data.

Optionally, the display device may comprise a high definition display screen with a size of at least approximately 45 inches; and wherein the processor may be further configured to at least: process depth imaging data associated with at least one of the first user or the second user; and adjust at least one of a position or an orientation of the image of the second user displayed via the display device to create mutual eye gaze between the first user and the second user based at least in part on the depth imaging data.

Optionally, the filter device may comprise at least one of a partially reflective, partially transmissive surface, a polarized screen, or an active filter device; at least one adjustment system associated with the filter device; wherein the processor may be further configured to at least: process depth imaging data associated with at least one of the first user or the second user; and adjust, via the at least one adjustment system, at least one of a position or an orientation of the filter device to create mutual eye gaze between the first user and the second user based at least in part on the depth imaging data.

Optionally, the processor may be further configured to at least: process depth imaging data associated with the second user; and adjust, via the display device, at least a size of the image of the second user to approximately actual size to create mutual presence between the first user and second user based at least in part on the depth imaging data.

Optionally, the apparatus may further comprise at least one illumination element configured to illuminate the first user; wherein the processor may be further configured to at least: process optical imaging data and depth imaging data associated with the first user; and adjust, via the at least one illumination element, illumination of the first user with portrait lighting to create mutual presence between the first user and the second user based at least in part on the optical and depth imaging data.

Optionally, the processor may be further configured to at least: process optical imaging data associated with a first environment associated with the first user; and adjust, via the display device, a display of a second environment associated with the image of the second user to match the first environment associated with the first user to create mutual presence between the first user and the second user based at least in part on the optical imaging data.

Optionally, the apparatus may further comprise an audio output device configured to emit audio associated with the second user for the first user; wherein the processor may be further configured to at least: process depth imaging data associated with at least one of the first user or the second user; and adjust, via the audio output device, the audio associated with the second user emitted for the first user to create mutual presence between the first user and the second user based at least in part on the depth imaging data.

Optionally, the processor may be further configured to at least: persistently display, via the display device, the image of the second user to create mutual presence between the first user and the second user.

Optionally, a lane between the first user and the image of the second user displayed via the display device may be maintained free of obstructions to create mutual presence between the first user and the second user.

Implementations described herein may include a system, comprising a first focus space comprising a first display device; a first imaging device; and a first filter device; and a second focus space comprising a second display device; a second imaging device; and a second filter device; and a processor in communication with the first focus space and the second focus space, the processor configured to at least: receive, via at least the first imaging device, first imaging data associated with a first user of the first focus space; receive, via at least the second imaging device, second imaging data associated with a second user of the second focus space; process the first and second imaging data; adjust at least one aspect of at least one of the first display device, the first imaging device, or the first filter device to create mutual eye gaze between the first user and the second user based at least in part on the first and second imaging data; and adjust at least one aspect of at least one of the second display device, the second imaging device, or the second filter device to create mutual eye gaze between the first user and the second user based at least in part on the first and second imaging data.

Optionally, the adjusted at least one aspect of the at least one of the first display device, the first imaging device, or the first filter device to create mutual eye gaze may comprise an adjustment of at least one of a position or an orientation of at least one of the first imaging device or the first filter device, or an adjustment of at least one of a position or an orientation of the second imaging data displayed via the first display device; and wherein the adjusted at least one aspect of the at least one of the second display device, the second imaging device, or the second filter device to create mutual eye gaze comprises an adjustment of at least one of a position or an orientation of at least one of the second imaging device or the second filter device, or an adjustment of at least one of a position or an orientation of the first imaging data displayed via the second display device.

Optionally, the processor may be further configured to at least: process first depth imaging data associated with the first user; process second depth imaging data associated with the second user; adjust, via at least the first display device, at least a second size of the second imaging data associated with the second user to approximately actual size based at least in part on the second depth imaging data to create mutual presence between the first user and second user; and adjust, via at least the second display device, at least a first size of the first imaging data associated with the first user to approximately actual size based at least in part on the first depth imaging data to create mutual presence between the first user and second user.

Optionally, the processor may be further configured to at least: process first optical imaging data within a first environment of the first focus space associated with the first user; process second optical imaging data within a second environment of the second focus space associated with the second user; adjust, via at least the first display device, at least one of a second background or second display characteristic of the second environment associated with the second user to match the first environment associated with the first user based at least in part on the first and second optical imaging data to create mutual presence between the first user and the second user; and adjust, via at least the second display device, at least one of a first background or first display characteristic of the first environment associated with the first user to match the second environment associated with the second user based at least in part on the first and second optical imaging data to create mutual presence between the first user and the second user.

Optionally, the system may further comprise a first illumination element within the first focus space configured to illuminate the first user; a second illumination element within the second focus space configured to illuminate the second user; wherein the processor may be further configured to at least: process first optical imaging data and first depth imaging data associated with the first user; process second optical imaging data and second depth imaging data associated with the second user; adjust, via the first illumination element, illumination of the first user with portrait lighting based at least in part on the first optical and depth imaging data to create mutual presence between the first user and the second user; and adjust, via the second illumination element, illumination of the second user with portrait lighting based at least in part on the second optical and depth imaging data to create mutual presence between the first user and the second user.

Implementations described herein may include a system, comprising a first focus space comprising a first plurality of walls, a first floor, and a first ceiling; and at least one first sensor and at least one first output device associated with the first focus space; and a second focus space comprising a second plurality of walls, a second floor, and a second ceiling; and at least one second sensor and at least one second output device associated with the second focus space; and a processor in communication with the first focus space and the second focus space, the processor configured to at least: receive, via the at least one first sensor, imaging data and first audio data associated with a first user of the first focus space; determine a first portion of the imaging data corresponding to a primary feature; process the imaging data to produce augmented imaging data in which the first portion is unchanged, and a remainder of the imaging data is deemphasized by at least a first amount; and transmit the augmented imaging data to the second focus space for presentation to a second user via the second output device.

Optionally, the processor may be further configured to at least: determine at least one of a first identity of the first user, a second identity of a second user, or an activity to be performed by the first user and the second user while in the first focus space and the second focus space; and wherein the primary feature may be determined based at least in part on one or more of the first identity, the second identity, or the activity.

Optionally, the processor may be further configured to at least: determine, based at least in part on one or more of the first identity, the second identity, or the activity, a secondary feature; determine a second portion of the imaging data corresponding to the secondary feature; and process the imaging data to produce augmented imaging data in which the first portion is unchanged, the second portion is deemphasized a second amount that is different than the first amount, and the remainder of the imaging data is deemphasized the second amount.

Optionally, the first amount may deemphasize the remainder of the imaging data such that at least one of information, an object, or a third user included in the remainder of the imaging data is obscured.

Implementations described herein may include a computer-implemented method, comprising determining at least one of an identity of a user or an activity to be performed by the user; determining, based at least in part on one or more of the identity of the user or the activity, a primary feature and a secondary feature; processing imaging data received from a camera to determine a first position corresponding to the primary feature, a second position corresponding to the secondary feature, and a background having a third position in the imaging data that is different than the first position and the second position; generating, as the imaging data is received, augmented imaging data in which a first portion of the imaging data corresponding to the first position is unchanged, a second portion of the imaging data corresponding to the second position is deemphasized a first amount, and a third portion of the imaging data corresponding to the third position is deemphasized a second amount that is different than the first amount; and transmitting the augmented imaging data.

Optionally, generating the augmented imaging data may include reducing a size of the augmented imaging data compared to the imaging data, prior to the augmented imaging data being transmitted.

Optionally, the primary feature may correspond to a face of the user and the secondary feature may correspond to a body of the user.

Optionally, generating may include applying a light blurring filter to the second portion of the imaging data to deemphasize the second portion by the first amount.

Optionally, generating may include replacing the third portion of the imaging data with a stored background.

Optionally, the first amount may be such that information contained in the first portion of the imaging data cannot be discerned from the augmented imaging data.

Optionally, the computer-implemented method may further comprise determining an identity of a second user to which the augmented imaging data is presented; and wherein at least one of the primary feature or the secondary feature may be determined based at least in part on the identity of the second user.

Optionally, the computer-implemented method may further comprise determining an identity of a second user to which the augmented imaging data is presented; and wherein at least one of the first amount or the second amount may be determined based at least in part on the identity of the second user.

Optionally, at least one of the first amount or the second amount may be determined based at least in part on one or more of the identity of the user or the activity.

Optionally, the computer-implemented method may further comprise detecting a gesture from the user to adjust augmentation of the secondary feature; in response to detecting the gesture, generating updated augmented imaging data in which the first portion of the imaging data corresponding to the first position is unchanged, the second portion of the imaging data corresponding to the second position is unchanged, and a third portion of the imaging data corresponding to the third position is deemphasized the second amount; and transmitting the updated augmented imaging data.

Optionally, the computer-implemented method may further comprise detecting a gesture from the user to adjust augmentation of at least a portion of the augmented imaging data; in response to detecting the gesture: processing the imaging data to determine a fourth position of the imaging data corresponding to the at least a portion for which augmentation is to be adjusted; generating updated augmented imaging data in which the first position is unchanged, the second position is deemphasized the first amount, the third position is deemphasized the second amount that is different than the first amount, and the fourth position is unchanged; and transmitting the updated augmented imaging data.

Optionally, the gesture may be at least one of a hand gesture, a facial gesture, or an audible gesture.

Implementations described herein may include an apparatus for enhanced communication, comprising a focus space comprising by a plurality of walls, a floor, and a ceiling; an imaging device; and one or more processors; and a memory storing program instructions that when executed by the one or more processors cause the one or more processors to at least: receive imaging data of a user located in the focus space; process the imaging data to determine a first portion of the imaging data that is representative of a face of the user; apply, as the imaging data is received, a first blurring filter to a second portion of the imaging data that is different than the first portion to form augmented imaging data in which only the first portion of the augmented imaging data remains unaltered; and transmit the augmented imaging data.

Optionally, the program instructions, when executed by the one or more processors, may further cause the one or more processors to at least: process the imaging data to determine a third portion of the imaging data that is representative of a secondary feature and that is different than the first portion; and apply, as the imaging data is received, a second blurring filter to the third portion of the imaging data to form the augmented imaging data in which only the first portion of the augmented imaging data remains unaltered and the third portion of the augmented imaging data is blurred less than the second portion.

Optionally, the program instructions, when executed by the one or more processors, may further cause the one or more processors to at least: detect a gesture from the user to adjust augmentation for a secondary feature; process the imaging data to determine a third portion of the imaging data corresponding to the secondary feature; remove, from the third portion, the first blurring filter to form updated augmented imaging data in which only the first portion and the third portion of the augmented imaging data remain unaltered; and transmit the updated augmented imaging data.

Optionally, the program instructions, when executed by the one or more processors, may further cause the one or more processors to at least: determine an identity of the user and an activity to be performed by the user; determine based at least in part on the identity or the activity, a secondary feature; process the imaging data to determine a third portion of the imaging data corresponding to the secondary feature; and apply, as the imaging data is received, a second blurring filter to the third portion, wherein: the second blurring filter produces a different level of blurring than the first blurring filter; and the second blurring filter results in information included on the secondary feature not being discernable from the augmented imaging data.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system to affect focus, comprising:
a first focus space comprising a substantially closed space including a plurality of walls, a floor, and a ceiling;
a display device associated with a first wall of the plurality of walls within the first focus space;
a filter device positioned at an angle relative to and in front of the display device, the filter device comprising a partially reflective, partially transmissive surface such that imaging data presented by the display device is viewable by a first user through the filter device in front of the display device;
an imaging device positioned at a lateral side of the display device and having a field of view directed toward the filter device in front of the display device such that the imaging device is configured to capture imaging data of the first user in front of the display device via the filter device; and
a processor in communication with the display device, the filter device, the imaging device, and a memory, the processor configured to at least:
receive data associated with the first user in the first focus space;
receive data associated with a second user in a second focus space;
receive data associated with an activity between the first user and the second user;
determine a difference target based at least in part on the first user, the second user, and the activity;
receive data related to the first user from a first plurality of sensors associated with the first focus space, wherein the data comprises imaging data of the first user captured by the imaging device via the filter device;
determine a first focus score for the first user based at least in part on the data from the first plurality of sensors;
receive data related to the second user from a second plurality of sensors associated with the second focus space;
determine a second focus score for the second user based at least in part on the data from the second plurality of sensors;
determine a difference between the first focus score and the second focus score;
determine a variation between the difference and the difference target; and
instruct, via at least one of a plurality of output devices associated with one of the first focus space or the second focus space, initiation of at least one action based at least in part on the variation, wherein the plurality of output devices comprises the display device.

2. The system of claim 1, wherein the processor is further configured to:
subsequent to instructing initiation of the at least one action,
determine a second difference between the first focus score and the second focus score; and
determine a second variation between the second difference and the difference target; and
instruct, via the at least one of the plurality of output devices, stopping of the at least one action based at least in part on the second variation.

3. The system of claim 1, wherein the processor is further configured to:
determine a target focus score based at least in part on the first user, the second user, and the activity;
determine a first variation between the first focus score and the target focus score; and
instruct, via at least one of a first plurality of output devices associated with the first focus space, initiation of at least one first action based at least in part on the first variation.

4. A system, comprising:
a display device associated with a focus space;
a filter device positioned at an angle relative to and in front of the display device, the filter device comprising a partially reflective, partially transmissive surface such that imaging data presented by the display device is viewable by a user within the focus space through the filter device in front of the display device;
an imaging device positioned at a side of the display device and having a field of view directed toward the filter device in front of the display device such that the imaging device is configured to capture imaging data of the user within the focus space in front of the display device via the filter device; and
a processor in communication with the display device, the filter device, the imaging device, and a memory, the processor configured to at least:
receive, from at least one of a plurality of sensors, data associated with the user and an activity in which the user is participating, wherein the data comprises imaging data of the user captured by the imaging device via the filter device;
determine a focus score for the user based at least in part on the data from the at least one of the plurality of sensors;
determine a target focus score based at least in part on the user and the activity;
determine a variation between the focus score and the target focus score; and
instruct, via at least one of a plurality of output devices, initiation of at least one action based at least in part on at least one of the focus score or the variation, wherein the plurality of output devices comprises the display device.

5. The system of claim 4, wherein the data associated with the user comprises at least one of an identity, a schedule, a user characteristic, a user preference, or a user habit; and
wherein the data associated with the activity comprises at least one of a type, a purpose, a goal, a time, a duration, or a number of participants.

6. The system of claim 4, wherein the processor is configured to determine the focus score for the user by processing, using at least one machine learning model, the data from the at least one of the plurality of sensors.

7. The system of claim 4, wherein the processor is configured to determine the target focus score by processing, using at least one machine learning model, the data associated with at least one of the user or the activity.

8. The system of claim 4, wherein the processor is further configured to:
   select the at least one action to be initiated via the at least one of the plurality of output devices by processing, using at least one machine learning model, the data associated with at least one of the user or the activity.

9. The system of claim 4, wherein the at least one of the plurality of sensors further comprises at least one of an imaging sensor, an audio sensor, a pressure sensor, a temperature sensor, a pulse detection sensor, a breath analysis sensor, an environment sensor, or an RFID sensor.

10. The system of claim 4, wherein the data related to the user from the at least one of the plurality of sensors comprises at least one of a body position of the user, a hand movement of the user, a facial expression of the user, an eye movement of the user, a breathing pattern of the user, a pulse of the user, a body temperature of the user, or a breath composition of the user.

11. The system of claim 4, wherein the data related to the user from the at least one of the plurality of sensors comprises at least one of speed, cadence, tone, tenor, timbre, pitch, volume, inflection, choice of language or words, or content associated with speech of the user.

12. The system of claim 4, wherein the at least one of the plurality of sensors is comprised in at least one of a chair, a table, a controller, a floor, a wall, a collaboration device, or a user device.

13. The system of claim 4, wherein the at least one of the plurality of output devices further comprises at least one of a visual output device, an audio output device, an actuator, a temperature or environment control device, an olfactory output device, a collaboration device, or a user device.

14. The system of claim 4, wherein the at least one action initiated via the at least one of the plurality of output devices comprises at least one of visual output via a display, light output via an illumination element, audio output via a speaker, environment output via a temperature or environment control device, olfactory output via an olfactory output device, haptic output via an actuator, or information output via a collaboration device or a user device.

15. The system of claim 4, wherein the processor is further configured to:
   determine, based at least in part on one or more of an identity of the user or the activity, a primary feature and a secondary feature;
   process the imaging data received from the imaging device to determine a first position corresponding to the primary feature, a second position corresponding to the secondary feature, and a background having a third position in the imaging data that is different than the first position and the second position;
   generate, as the imaging data is received, augmented imaging data in which a first portion of the imaging data corresponding to the first position is unchanged, a second portion of the imaging data corresponding to the second position is deemphasized a first amount, and a third portion of the imaging data corresponding to the third position is deemphasized a second amount that is different than the first amount; and
   transmit the augmented imaging data.

16. A system to affect focus, comprising:
   a display device associated with a focus space;
   a filter device positioned at an angle relative to and in front of the display device, the filter device comprising a partially reflective, partially transmissive surface such that imaging data presented by the display device is viewable by a user within the focus space through the filter device in front of the display device;
   an imaging device positioned at a side of the display device and having a field of view directed toward the filter device in front of the display device such that the imaging device is configured to capture imaging data of the user within the focus space in front of the display device via the filter device;
   a plurality of sensors associated with the focus space, wherein the plurality of sensors comprises the imaging device;
   a plurality of output devices associated with the focus space, wherein the plurality of output devices comprises the display device; and
   a processor in communication with the display device, the filter device, the imaging device, the plurality of sensors, the plurality of output devices, and a memory, the processor configured to at least:
      receive, from at least one of the plurality of sensors, data associated with the user and an activity in which the user is participating, wherein the data comprises imaging data of the user captured by the imaging device via the filter device;
      determine a target focus score based at least in part on the user and the activity;
      determine a focus score for the user based at least in part on the data from the at least one of the plurality of sensors;
      determine a variation between the focus score and the target focus score; and
      instruct initiation, via at least one of the plurality of output devices, of at least one action based at least in part on the variation.

17. The system of claim 16, wherein the display device is sized or configured to display imaging data of a remote user substantially in actual size.

18. The system of claim 16, wherein the filter device comprises at least one of a half-silvered mirror or a polarized screen.

19. The system of claim 16, wherein the filter device is positioned at a 45 degree angle relative to and in front of the display device; and
   wherein the field of view of the imaging device is oriented at a 90 degree angle relative to a viewing direction directly in front of the display device.

20. The system of claim 16, wherein the imaging device is positioned one of at a lateral side, above, or below the display device.

21. The system of claim 16, further comprising:
   an imaging device adjustment system to which the imaging device is coupled, the imaging device adjustment system configured to adjust at least one of a height, position, or angle of the imaging device relative to the display device and the filter device.

* * * * *